US012375673B2

(12) United States Patent
Kim et al.

(10) Patent No.: US 12,375,673 B2
(45) Date of Patent: Jul. 29, 2025

(54) IMAGE PROCESSING APPARATUS AND METHOD

(71) Applicant: Sony Group Corporation, Tokyo (JP)

(72) Inventors: Jongdae Kim, Tokyo (JP); Tomoaki Kudo, Kanagawa (JP); Masaru Ikeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 250 days.

(21) Appl. No.: 18/167,903

(22) Filed: Feb. 13, 2023

(65) Prior Publication Data
US 2023/0199187 A1 Jun. 22, 2023

Related U.S. Application Data

(63) Continuation of application No. 17/290,777, filed as application No. PCT/JP2019/043380 on Nov. 6, 2019, now abandoned.

(30) Foreign Application Priority Data

Nov. 16, 2018 (JP) .................. 2018-215827

(51) Int. Cl.
*H04N 19/129* (2014.01)
*H04N 19/136* (2014.01)
(Continued)

(52) U.S. Cl.
CPC ......... *H04N 19/129* (2014.11); *H04N 19/136* (2014.11); *H04N 19/176* (2014.11); *H04N 19/60* (2014.11); *H04N 19/70* (2014.11)

(58) Field of Classification Search
CPC ...... H04N 19/176; H04N 19/61; H04N 19/70; H04N 19/105; H04N 19/46; H04N 19/18;
(Continued)

(56) References Cited

U.S. PATENT DOCUMENTS

2006/0098881 A1   5/2006   Kim
2007/0120711 A1   5/2007   Hu
(Continued)

FOREIGN PATENT DOCUMENTS

AU   2014268181 A   12/2014
CN      1874517 A   12/2006
(Continued)

OTHER PUBLICATIONS

"Advanced Video Coding for Generic Audiovisual Services," Telecommunication Standardization Sector of International Telecommunication Union, H.264, Apr. 13, 2017, 812 Pages.
(Continued)

*Primary Examiner* — Farhan Mahmud
(74) *Attorney, Agent, or Firm* — XSENSUS LLP

(57) ABSTRACT

An image processing apparatus (encoder, decoder or the like) and method suppress reduction in encoding efficiency. Encoding of coefficient data is skipped in an invalid transform coefficient region, and the coefficient data is encoded in a valid transform coefficient region. Further, for example, the coefficient data in the valid transform coefficient region is encoded in a scan order corresponding to a block shape of a block to be processed. In addition, decoding of encoded data including encoded coefficient data related to an image is skipped in an invalid transform coefficient region, and the encoded data is decoded in a valid transform coefficient region. Further, for example, the encoded data in the valid transform coefficient region is decoded in a scan order corresponding to the block shape of the block to be processed.

16 Claims, 49 Drawing Sheets

(51) Int. Cl.
*H04N 19/176* (2014.01)
*H04N 19/60* (2014.01)
*H04N 19/70* (2014.01)

(58) Field of Classification Search
CPC .. H04N 19/157; H04N 19/463; H04N 19/136; H04N 19/60
See application file for complete search history.

(56) References Cited

U.S. PATENT DOCUMENTS

| | | | |
|---|---|---|---|
| 2009/0003716 A1* | 1/2009 | Sekiguchi | H04N 19/147 |
| | | | 382/238 |
| 2011/0194767 A1 | 8/2011 | Kishi | |
| 2013/0114730 A1 | 5/2013 | Joshi | |
| 2013/0329807 A1 | 12/2013 | Lim | |
| 2015/0103917 A1 | 4/2015 | Wang | |
| 2015/0139304 A1 | 5/2015 | Sato | |
| 2015/0181237 A1 | 6/2015 | Tsukuba | |
| 2015/0358621 A1 | 12/2015 | He | |
| 2018/0205958 A1 | 7/2018 | Piao | |
| 2020/0280740 A1* | 9/2020 | Tsukuba | H04N 19/426 |

FOREIGN PATENT DOCUMENTS

| | | |
|---|---|---|
| CN | 102187674 A | 9/2011 |
| CN | 102197651 A | 9/2011 |
| CN | 104335582 A | 2/2015 |
| CN | 105847802 A | 8/2016 |
| CN | 106803959 A | 6/2017 |
| CN | 107087179 A | 8/2017 |
| CN | 108293139 A | 7/2018 |
| CN | 109661819 A | 4/2019 |
| JP | 7-050837 A | 2/1995 |
| JP | H09214971 A | 8/1997 |
| JP | 11-88884 A | 3/1999 |
| JP | 2002-016922 A | 1/2002 |
| JP | 2004-228964 A | 8/2004 |
| JP | 2009170992 A | 7/2009 |
| JP | 2013187869 A | 9/2013 |
| JP | 2017-188768 A | 10/2017 |
| KR | 20130045807 A | 5/2013 |
| KR | 20150022299 A | 3/2015 |
| WO | 2017/137312 A1 | 8/2017 |
| WO | 2018/173798 A1 | 9/2018 |
| WO | 2018/173862 A1 | 9/2018 |
| WO | WO-2018159526 A1 | 9/2018 |

OTHER PUBLICATIONS

"High Efficiency Video Coding," Telecommunication Standardization Sector of International Telecommunication Union, H.265, Dec. 22, 2016, 664 Pages.

Bross et al., "Versatile Video Coding (Draft 2)", 11th Joint Video Experts Team JVET-K1001-v1 with ITU-T SG 16 WP 3 and ISO/IEC JTC 1/SC 29/WG 11, Jul. 10, 2018, 42 Pages.

Chen et al., "Algorithm Description of Joint Exploration Test Model 4," Joint Video Exploration Team (JVET) of ITU-T SG 16 WP 3 and ISO/IEC JTC 1/SC 29/WG 11 7th Meeting, Jul. 13, 2017, 51 Pages.

International Search Report and Written Opinion mailed on Feb. 4, 2020, received for PCT Application PCT/JP2019/043380, Filed on Nov. 6, 2019, 11 pages including English Translation.

Zhao et al., "CE6: Block size dependent zeroout transform (Test 1.14)", Joint Video Coding Team Meeting JVET-K0083.docx, Available Online At: http://phenix.it-sudparis.eu/jvet/doc_end_user/current_document.php?id=3586, Jul. 3, 2018, pp. 1-4.

Jing Ye et al, "CE15-related:palette index map scan order constraints", Joint Video Experts Team (JVET) of ITU-T SG 16 WP 3 and ISO/IEC JTC 1/SC 29/WG 11 12th Meeting Oct. 3-12, 2018, JVET-L0307.

* cited by examiner

F I G. 6

```
for(i = lastSubBlock; i >= 0; i--){
    startQStateSb = QState
    xS = DiagScanOrder[log2TbWidth-log2SbSize][log2TbHeight-log2SbSize]
                     [lastSubBlock][0]
    yS = DiagScanOrder[log2TbWidth-log2SbSize][log2TbHeight-log2SbSize]
                     [lastSubBlock][1]
    inferSbDcSigCoeffFlag = 0
    if((i<lastSubBlock) && (i>0)){
        coded_sub_block_flag[xS][yS]
        inferSbDcSigCoeffFlag = 1
    }
}
```

FIG. 13

| | | | |
|---|---|---|---|
| 1 | | | CONTROL SCAN TO SKIP INVALID TRANSFORM COEFFICIENT REGION |
| 1-1 | | | CONTROL SCAN IN VALID TRANSFORM COEFFICIENT REGION |
| | 1-1-1 | | SET SCAN DIRECTION OF VALID TRANSFORM COEFFICIENT REGION TO VERTICAL OR HORIZONTAL DIRECTION |
| | 1-1-2 | | SET SCAN DIRECTION OF VALID TRANSFORM COEFFICIENT REGION TO DIRECTION CORRESPONDING TO BLOCK SHAPE |
| | 1-1-3 | | GROUP SUB-BLOCKS IN VALID TRANSFORM COEFFICIENT REGION TO CONTROL SCAN |
| 1-2 | | | CHROMA ALSO CONTROLS SCAN SIMILARLY TO LUMINANCE |

FIG. 21

```
for( i = lastSubBlock; i >= 0; i-- ) {
    startQStateSb = QState
    xS = DiagScanOrder[ log2TbWidth - log2SbSize ][ log2TbHeight - log2SbSize ]
                     [ lastSubBlock ][ 0 ]
    yS = DiagScanOrder[ log2TbWidth - log2SbSize ][ log2TbHeight - log2SbSize ]
                     [ lastSubBlock ][ 1 ]
    inferSbDcSigCoeffFlag = 0
    if( ( i < lastSubBlock ) && ( i > 0 ) && ( ( xS <= 32 ) && ( yS <= 32 ) ) ) {
        coded_sub_block_flag[ xS ][ yS ]
        inferSbDcSigCoeffFlag = 1
    }
}
```

FIG. 47

| | Descriptor |
|---|---|
| transform_unit(x0, y0, tbWidth, tbHeight, treeType) { | |
| if(treeType == SINGLE_TREE \|\| treeType == DUAL_TREE_LUMA) | |
| tu_cbf_luma[x0][y0] | ae(v) |
| if(treeType == SINGLE_TREE \|\| treeType == DUAL_TREE_CHROMA) { | |
| tu_cbf_cb[x0][y0] | ae(v) |
| tu_cbf_cr[x0][y0] | ae(v) |
| } | |
| if(((((CuPredMode[x0][y0] == MODE_INTRA) && sps_mts_intra_enabled_flag) \|\| ((CuPredMode[x0][y0] == MODE_INTER) && sps_mts_inter_enabled_flag)) && tu_cbf_luma[x0][y0] && treeType != DUAL_TREE_CHROMA && (tbWidth <= 32) && (tbHeight <= 32)) | |
| cu_mts_flag[x0][y0] | ae(v) |
| if(tu_cbf_luma[x0][y0]) | |
| residual_coding(x0, y0, log2(tbWidth), log2(tbHeight), 0) | |
| if(tu_cbf_cb[x0][y0]) | |
| residual_coding(x0, y0, log2(tbWidth/2), log2(tbHeight/2), 1) | |
| if(tu_cbf_cr[x0][y0]) | |
| residual_coding(x0, y0, log2(tbWidth/2), log2(tbHeight/2), 2) | |
| } | |

FIG.48

| | Descriptor |
|---|---|
| residual_coding(x0, y0, log2TbWidth, log2TbHeight, cIdx) { | |
|   if(transform_skip_enabled_flag && (cIdx != 0 \|\| cu_mts_flag[x0][y0] == 0) && (log2TbWidth <= 2 ) && (log2TbHeight <= 2)) | |
|     transform_skip_flag[x0][y0][cIdx] | ae(v) |
|   last_sig_coeff_x_prefix | ae(v) |
|   last_sig_coeff_y_prefix | ae(v) |
|   if(last_sig_coeff_x_prefix > 3) | |
|     last_sig_coeff_x_suffix | ae(v) |
|   if(last_sig_coeff_y_prefix > 3) | |
|     last_sig_coeff_y_suffix | ae(v) |
|   log2SbSize = (Min(log2TbWidth, log2TbHeight)< 2 ? 1 : 2) | |
|   numSbCoeff = 1 << (log2SbSize << 1) | |
|   lastScanPos = numSbCoeff | |
|   lastSubBlock = (1 << (log2TbWidth + log2TbHeight - 2 * log2SbSize)) - 1 | |
|   do { | |
|     if(lastScanPos == 0) { | |
|       lastScanPos = numSbCoeff | |
|       lastSubBlock-- | |
|     } | |
|     lastScanPos-- | |
|     xS = DiagScanOrder[log2TbWidth - log2SbSize][log2TbHeight - log2SbSize][lastSubBlock][0] | |
|     yS = DiagScanOrder[log2TbWidth - log2SbSize][log2TbHeight - log2SbSize][lastSubBlock][1] | |
|     xC = (xS << log2SbSize) + DiagScanOrder[log2SbSize][log2SbSize][lastScanPos][0] | |
|     yC = (yS << log2SbSize) + DiagScanOrder[log2SbSize][log2SbSize][lastScanPos][1] | |
|   } while((xC != LastSignificantCoeffX) \|\| (yC != LastSignificantCoeffY)) | |
|   numSigCoeff = 0 | |
|   QState = 0 | |
|   for (i = lastSubBlock; i >= 0; i--) { | |
|     startQStateSb = QState | |
|     xS = DiagScanOrder[log2TbWidth - log2SbSize][log2TbHeight - log2SbSize][lastSubBlock][0] | |
|     yS = DiagScanOrder[log2TbWidth - log2SbSize][log2TbHeight - log2SbSize][lastSubBlock][1] | |
|     inferSbDcSigCoeffFlag = 0 | |
|     if((i < lastSubBlock) && (i > 0) && (xS <=32)&&(yS<=32)) { | |
|       coded_sub_block_flag[xS][yS] | ae(v) |
|       inferSbDcSigCoeffFlag = 1 | |
|     } | |
|     firstSigScanPosSb = numSbCoeff | |
|     lastSigScanPosSb = -1 | |
|     for (n = (i == lastSubBlock)? lastScanPos - 1:numSbCoeff - 1; n >= 0; n--) { | |

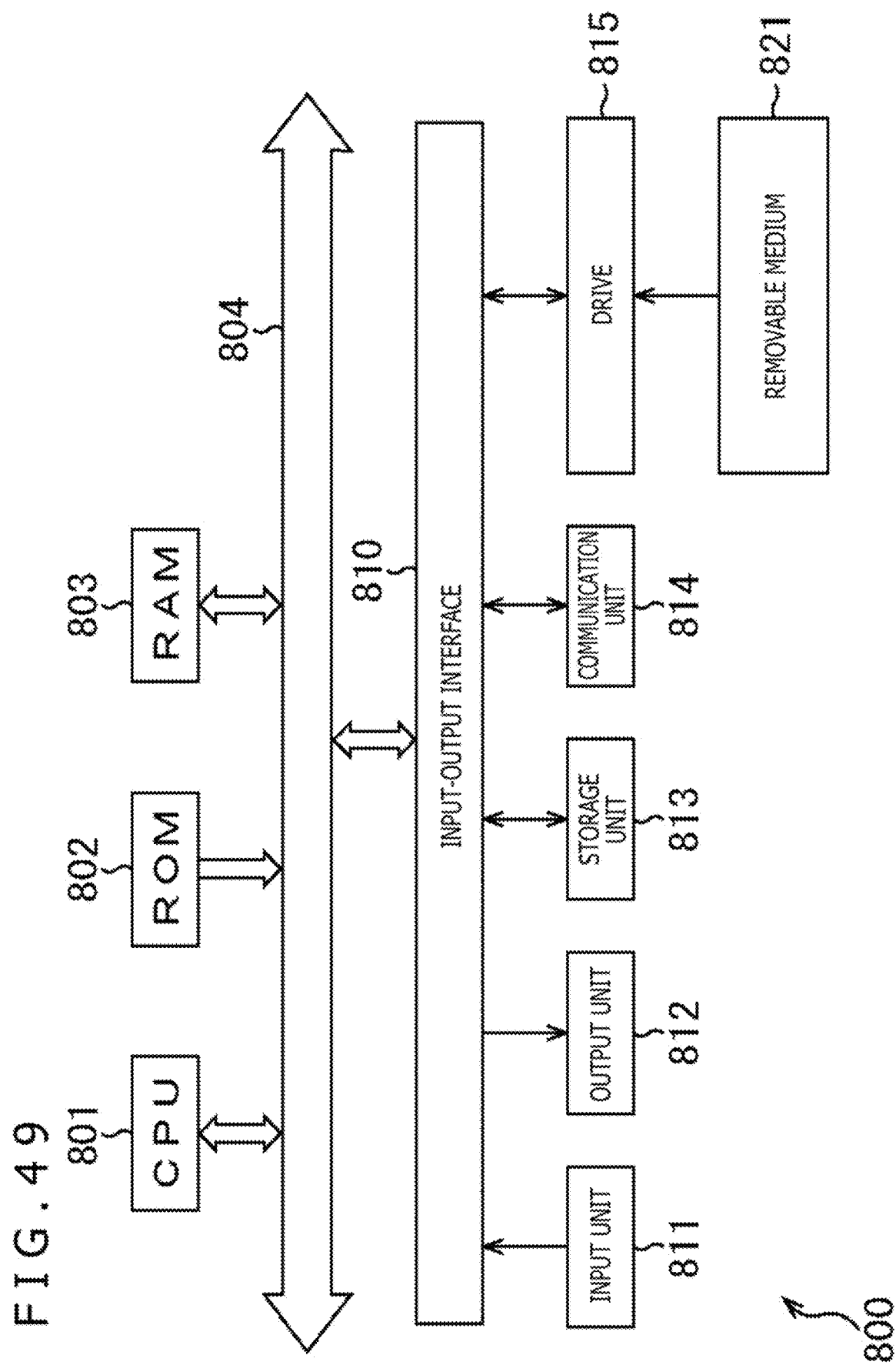

IMAGE PROCESSING APPARATUS AND METHOD

CROSS-REFERENCE TO RELATED APPLICATIONS

The present application is a continuation of U.S. application Ser. No. 17/290,777, filed May 3, 2021, which is based on PCT filing PCT/JP2019/043380, filed Nov. 6, 2019, which claims priority to JP 2018-215827, filed Nov. 16, 2018, the entire contents of each are incorporated herein by reference.

TECHNICAL FIELD

The present disclosure relates to image processing apparatus and method, and particularly, to image processing apparatus and method that can suppress a reduction in encoding efficiency.

BACKGROUND ART

In the past, a process (Zero Out) of setting high-frequency region coefficients of a block in a size larger than 32×32 to 0 has been proposed in encoding and decoding of image data. For example, in a case where the block size is equal to or greater than 64, the abovementioned process is executed to transform and encode the image data of the block into valid coefficient data in a region of 32×32 on the upper left of the block and into coefficient data with a value of "0" in other regions (for example, see NPL 1).

CITATION LIST

Non Patent Literature

[NPL1]
Benjamin Bross, Jianle Chen, Shan Liu, "Versatile Video Coding (Draft 2)," JVET-K1001-v7, Joint Video Experts Team (JVET) of ITU-T SG 16 WP 3 and ISO/IEC JTC 1/SC 29/WG 11 11th Meeting: Ljubljana, SI, 10-18 Jul. 2018

SUMMARY

Technical Problems

However, when the abovementioned process is executed to perform encoding in an existing order of scan, there is a risk of encoding coefficient data in an invalid transform coefficient region not including valid coefficient data. Therefore, the encoding efficiency may be reduced by unnecessary information.

The present disclosure has been made in view of the circumstances, and the present disclosure can suppress a reduction in encoding efficiency.

Solution to Problems

An aspect of the present technique provides an image processing apparatus including an encoding unit that skips encoding of coefficient data related to an image in an invalid transform coefficient region and that encodes the coefficient data in a valid transform coefficient region.

The aspect of the present technique provides an image processing method including skipping encoding of coefficient data related to an image in an invalid transform coefficient region and encoding the coefficient data in a valid transform coefficient region.

Another aspect of the present technique provides an image processing apparatus including a decoding unit that skips, in an invalid transform coefficient region, decoding of encoded data including encoded coefficient data related to an image and that decodes the encoded data in a valid transform coefficient region.

The other aspect of the present invention provides an image processing method including skipping decoding of encoded data including encoded coefficient data related to an image in an invalid transform coefficient region and decoding the encoded data in a valid transform coefficient region.

In the image processing apparatus and method according to the aspect of the present technique, the encoding of the coefficient data related to the image is skipped in the invalid transform coefficient region, and the coefficient data is encoded in the valid transform coefficient region.

In the image processing apparatus and method according to the other aspect of the present technique, the decoding of the encoded data including the encoded coefficient data related to the image is skipped in the invalid transform coefficient region, and the encoded data is decoded in the valid transform coefficient region.

BRIEF DESCRIPTION OF DRAWINGS

FIG. 6 is a diagram describing an example of syntax.

FIG. 13 is a diagram describing an example of scan control.

FIG. 21 is another diagram describing an example of the syntax.

FIG. 47 is still another diagram describing an example of the syntax.

FIG. 48 is yet another diagram describing an example of the syntax.

FIG. 49 is a block diagram illustrating a main configuration example of a computer.

DESCRIPTION OF EMBODIMENTS

Figure 1:
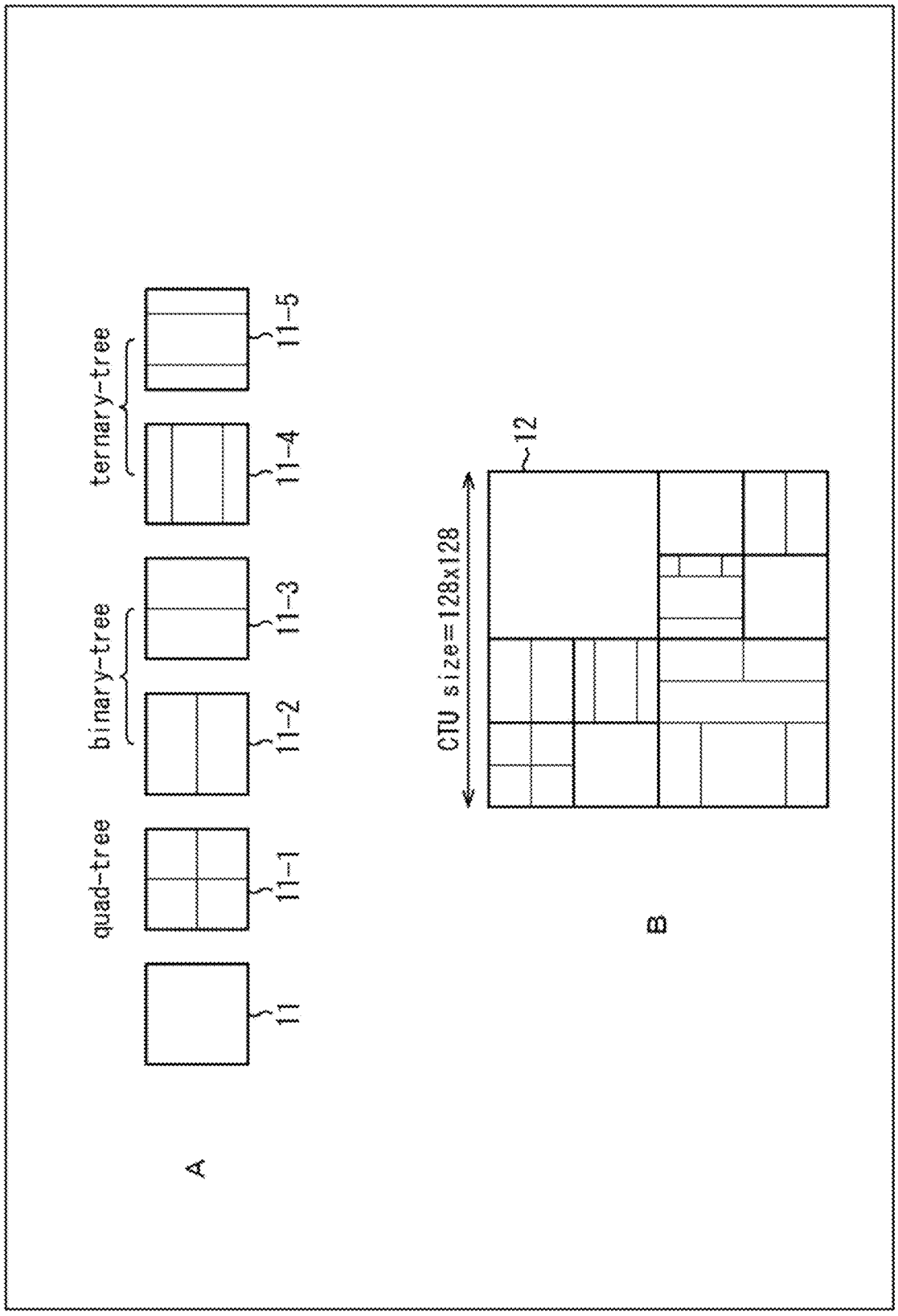
FIG. 1 illustrates diagrams describing an example of a block structure.

Hereinafter, modes for carrying out the present disclosure (hereinafter, referred to as embodiments) will be described. Note that the embodiments will be described in the following order.

1. Literature and the Like Supporting Technical Content and Technical Terms
2. Zero Out
3. Concept
4. First Embodiment (Method 1)
5. Second Embodiment (Method 1-1)
6. Third Embodiment (Method 1-2)
7. Fourth Embodiment (Image Encoding Apparatus and Image Decoding Apparatus)
8. Note

1. Literature and the Like Supporting Technical Content and Technical Terms

The scope disclosed in the present technique includes not only the content described in the embodiments, but also the content described in the following pieces of Non Patent Literature publicly known at the time of the application.

NPL 1: (described above)
NPL 2: TELECOMMUNICATION STANDARDIZATION SECTOR OF ITU (International Telecommunication Union), "Advanced video coding for generic audiovisual services," H.264, April 2017
NPL 3: TELECOMMUNICATION STANDARDIZATION SECTOR OF ITU (International Telecommunication Union), "High efficiency video coding," H. 265, December 2016
NPL 4: Jianle Chen, Elena Alshina, Gary J. Sullivan, Jens-Rainer, Jill Boyce, "Algorithm Description of Joint Exploration Test Model 4," JVET-G1001 v1, Joint Video Exploration Team (JVET) of ITU-T SG 16 WP 3 and ISO/IEC JTC 1/SC 29/WG 11 7th Meeting: Torino, IT, 13-21 Jul. 2017

That is, the content described in the abovementioned pieces of Non Patent Literature is also a basis for determining the support requirements. For example, even in a case where the Quad-Tree Block Structure described in NPL 3 or the QTBT (Quad Tree Plus Binary Tree) Block Structure described in NPL 4 is not directly described in the embodiments, they are within the disclosed scope of the present technique, and the support requirements of the claims are satisfied. Further, even in a case where, for example, technical terms, such as parse (Parsing), syntax (Syntax), and semantics (Semantics), are not directly described in the embodiments, they are similarly within the disclosed scope of the present technique, and the support requirements of the claims are satisfied.

Further, in the present specification, a "block" (not a block indicating a processing unit) used for describing a partial region or a unit of processing of an image (picture) indicates any partial region in the picture unless otherwise stated, and the dimension, the shape, the characteristics, and the like of the "block" are not limited. For example, the "block" includes any partial region (unit of processing), such as TB (Transform Block), TU (Transform Unit), PB (Prediction Block), PU (Prediction Unit), SCU (Smallest Coding Unit), CU (Coding Unit), LCU (Largest Coding Unit), CTB (Coding Tree Block), CTU (Coding Tree Unit), transform block, sub-block, macroblock, tile, and slice described in NPL 2 to NPL 4.

Further, in designating the size of the block, the block size may not only directly be designated, but may also indirectly be designated. For example, identification information for identifying the size may be used to designate the block size. In addition, for example, the ratio or difference from the size of a reference block (for example, LCU, SCU, or the like) may be used to designate the block size. For example, in a case where information for designating the block size is transmitted in a syntax element or the like, the information for indirectly designating the size may be used as such information. In such a way, the amount of information can be reduced, and the encoding efficiency may be improved. In addition, the designation of the block size also includes designation of a range of the block size (for example, designation of allowed range of block size or the like).

In addition, encoding in the present specification includes not only the entire process of transforming an image into a bitstream, but also part of the process. For example, the encoding includes not only a process including a prediction process, an orthogonal transform, quantization, arithmetic coding, and the like, but also a process representing the quantization and the arithmetic coding as a whole, a process including the prediction process, the quantization, and the arithmetic coding, and the like. Similarly, decoding includes not only the entire process of transforming a bitstream into an image, but also part of the process. For example, the decoding includes not only a process including inverse arithmetic decoding, inverse quantization, an inverse orthogonal transform, a prediction process, and the like, but also a process including the inverse arithmetic decoding and the inverse quantization, a process including the inverse arithmetic decoding, the inverse quantization, and the prediction process, and the like.

2. Zero Out

<Block Structure of Encoding and Decoding>

In the test model (JEM4 (Joint Exploration Test Model 4)) described in NPL 4, the concept of CTUS (coding tree units) is adopted as in HEVC (High Efficiency Video Coding) described in NPL 3. That is, in the case of the method, the picture (Picture) is divided into CTUs, and the CTUs are set as the highest block units in encoding. In NPL 4, the maximum size of the CTU is defined as 128×128. However, the maximum size of Luma transform block (TB) is 64×64.

In HEVC, a quad-tree (quadtree) structure is used to further divide the CTU into CUs (coding units). A PU (prediction unit) and a TU (Transform Unit) are provided in the CU, and the PU size and the TU size can independently be selected according to the features of the input image. The quaternary-tree structure can be used to divide the TU, similarly to the CU.

On the other hand, in the test model described in NPL 4, a multi-type tree (binary-tree, ternary-tree)+quad-tree structure is adopted in place of the concept of CU/PU/TU in HEVC. That is, as illustrated in A of FIG. 1, a block 11 can be divided into four pieces based on the quad-tree as in a block 11-1, can be divided into two pieces based on the binary-tree as in a block 11-2 and a block 11-3, or can be divided into three pieces based on the ternary-tree as in a block 11-4 and a block 11-5. Therefore, a CTU 12 can be divided into various blocks as illustrated in B of FIG. 1.

Figure 2:
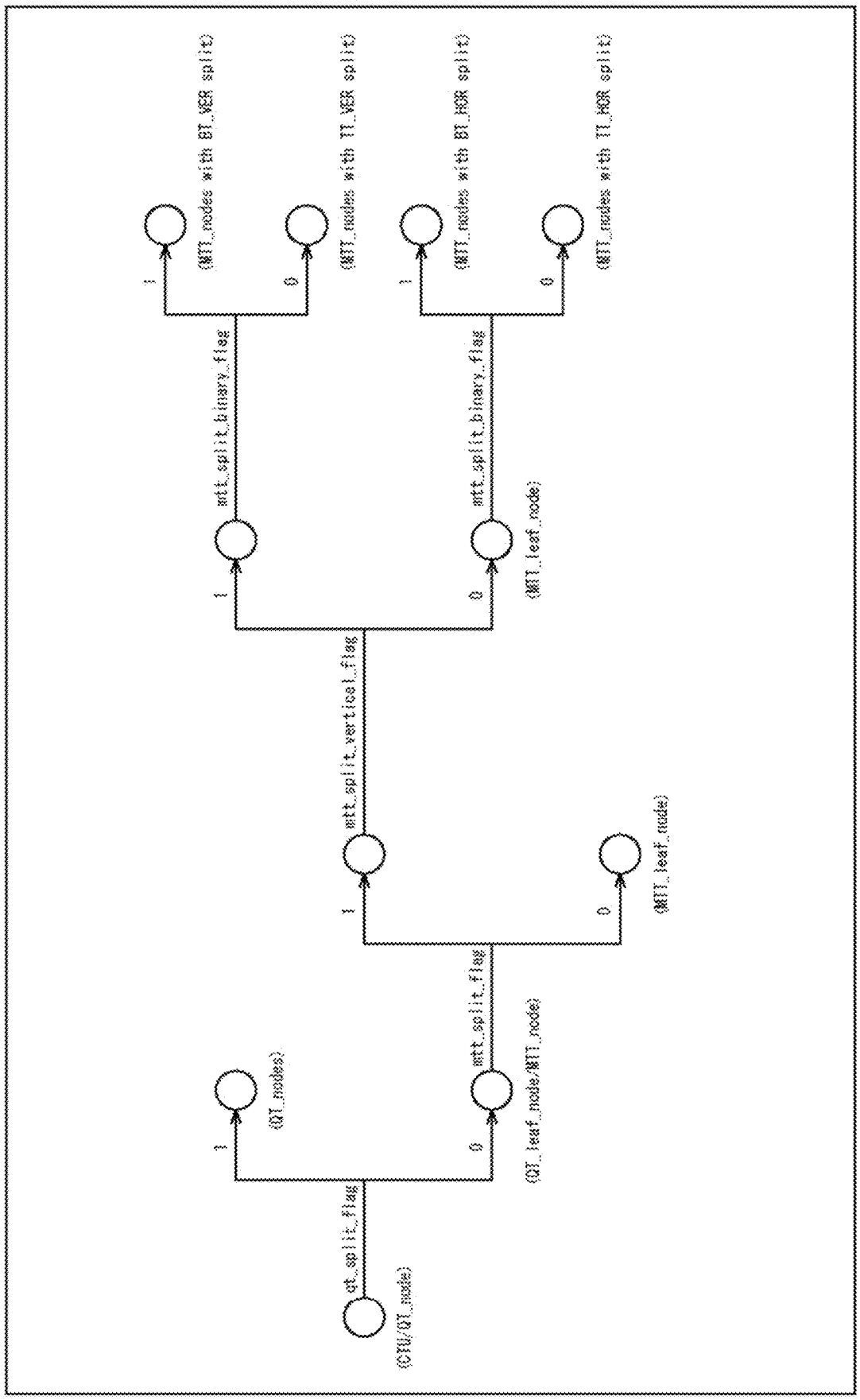
FIG. 2 is another diagram describing an example of the block structure.

FIG. 2 illustrates an example of the multi-type tree. In the case of the structure, the CTU is first divided based on the quad-tree. The quad-tree leaf is further divided into multi-type tree structures. Further, more flexible block division can also be performed based on the binary-tree structure or the ternary-tree structure. Therefore, as in the example of B in FIG. 1, the CTU 12 can also be divided into rectangular CUs.

The multi-type tree leaf corresponds to the CU size. The size of CU is the same as the size of PU and the size of TU unless the size of CU exceeds the maximum size of the Transform size. In a case where the CU size exceeds the Transform size, the TU is automatically divided up to the upper limit. The block size in this case is CU=PU!=TU.

<Large Block Size Transform>

Figure 3:
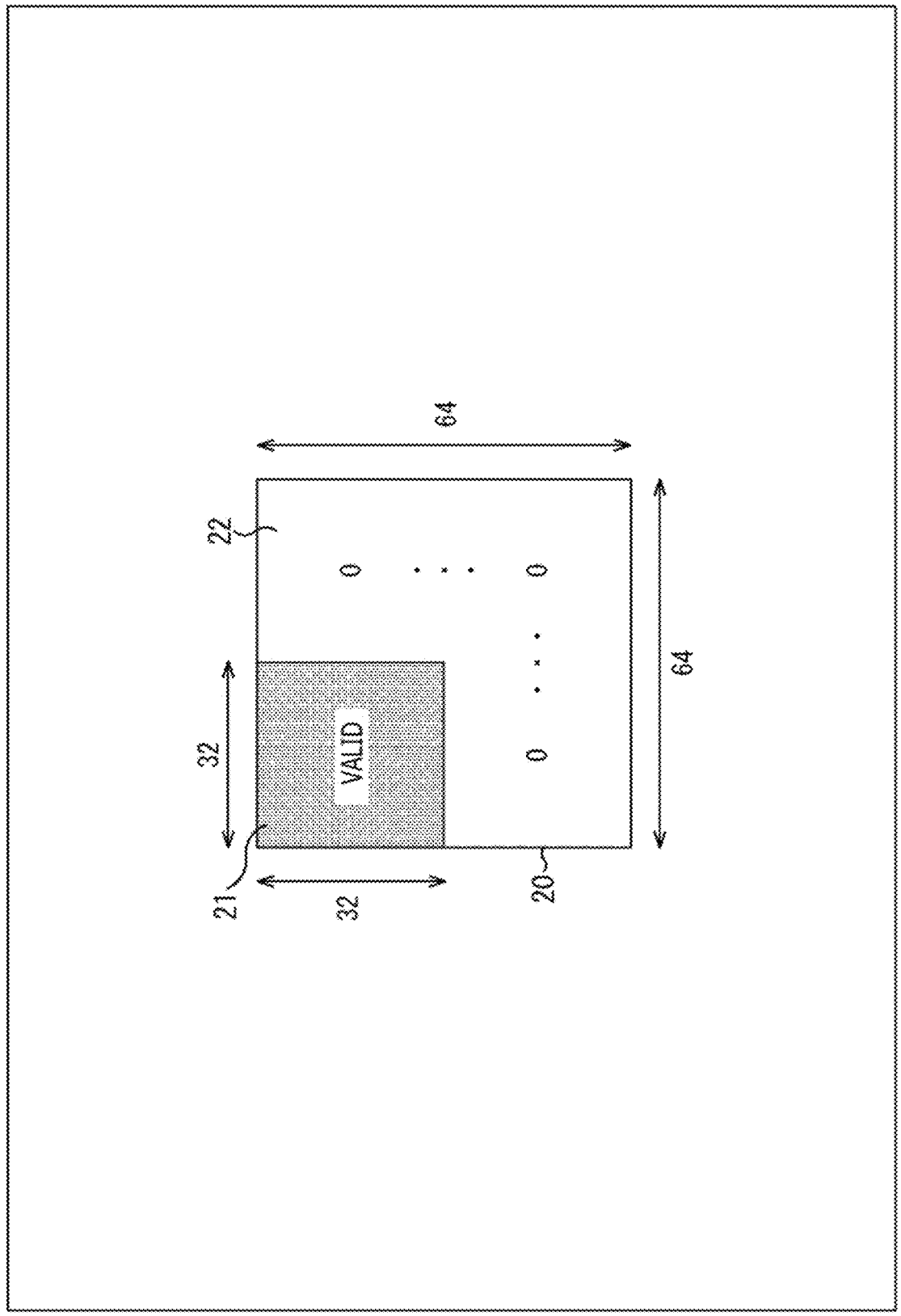
FIG. 3 is a diagram describing an example of Zero Out.

While the block size of the orthogonal transform of HEVC is 32×32 at most, the block size of the orthogonal transform is extended to 64×64 at most in the case of the test model described in NPL 4. In NPL 1, proposed is a process (Zero Out), in which a high-frequency region coefficient of a block in a size larger than 32×32 is set to 0. For example, in a case where the block size is equal to or greater than 64 like a block 20 illustrated in FIG. 3, the abovementioned process is executed to transform and encode the image data into valid coefficient data (also referred to as a valid transform coefficient) in a region of 32×32 on the upper left of the block 20 and into coefficient data with a value of "0" in other regions. The region including the valid transform coefficient will also be referred to as a valid transform coefficient region. That is, a valid transform coefficient region 21 of the block 20 in FIG. 3 is a region including valid transform coefficients.

In addition, a region other than the valid transform coefficient region in the block will also be referred to as an invalid transform coefficient region. The invalid transform coefficient region (in the case of the example in FIG. 3, invalid transform coefficient region 22) is a region including coefficient data that is not valid (also referred to as invalid transform coefficients). The invalid transform coefficient is, for example, coefficient data with a value of "0."

Figure 4:
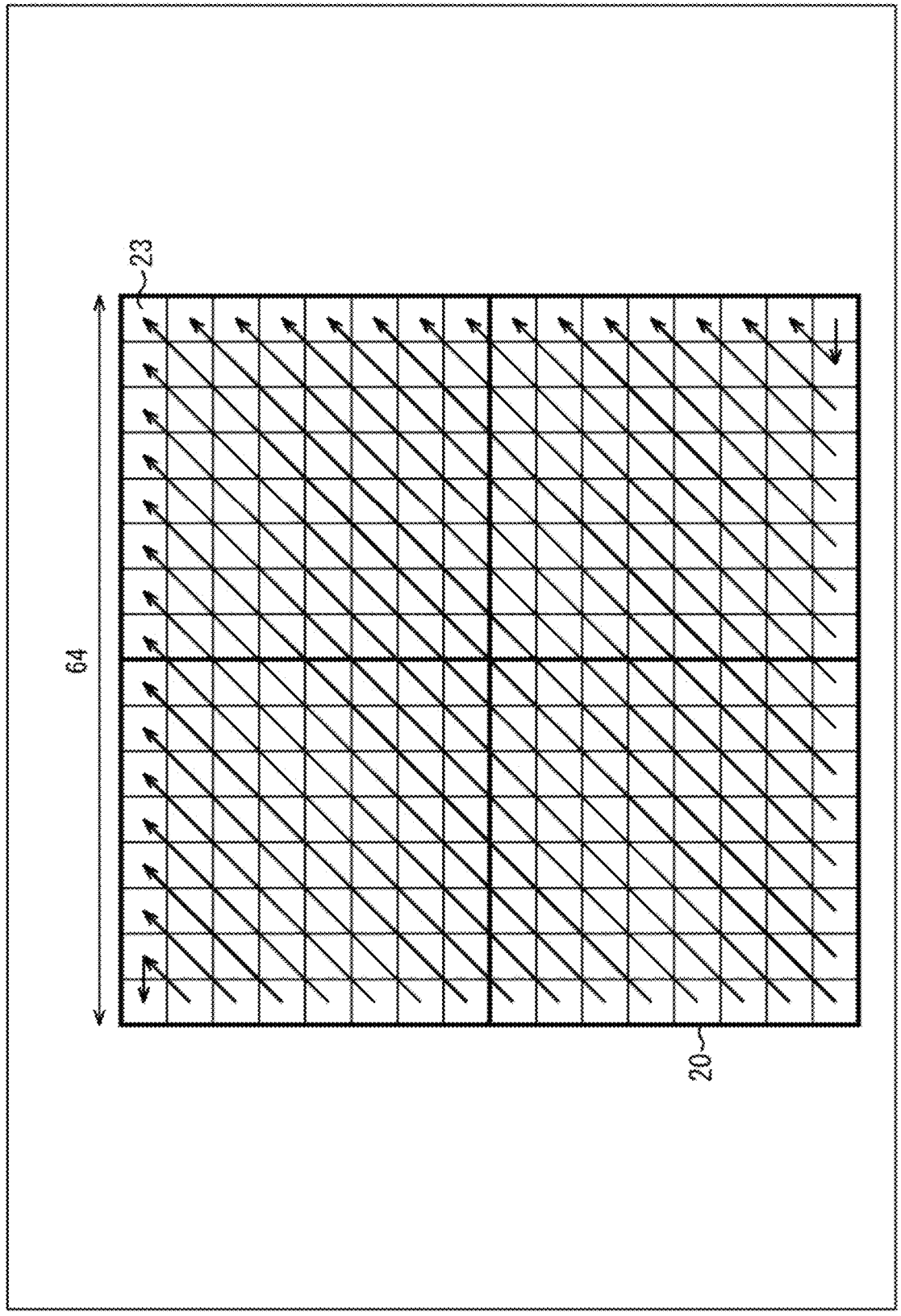
FIG. 4 is a diagram describing an example of an order of scan.

The pieces of coefficient data (transform coefficients) of the block 20 are encoded in the order of scan (scan order) as in an example illustrated in FIG. 4. The pieces of coefficient data are processed on the basis of 4×4 sub-blocks, and the sub-blocks are processed in order from sub-blocks of components in higher ranges to sub-blocks of components in lower ranges. In the case of the example in FIG. 4, sub-blocks 23 are formed in the block, and the sub-blocks 23 are scanned in the order indicated by arrows from the sub-block on the lower right edge in FIG. 4 to the sub-block on the upper left edge in FIG. 4 (diagonal order from lower left to upper right is repeated from lower right to upper left). Note that scan in the reverse order of the arrows in the example is also possible (diagonal order from upper right to lower left is repeated from lower right to upper left).

In each sub-block 23, valid transform coefficient flag information (coded_sub_block_flag) included in the coefficient data and indicating the presence/absence of the valid transform coefficient for each sub-block is encoded by context-based binary arithmetic coding (context adaptive binary arithmetic coding). Further, validity flag information (sig_coeff_flag), which is included in the coefficient data and which indicates, for each sub-block, the presence/absence of the valid transform coefficient with a value that is not 0, is encoded. Further, for the sub-block in which the validity flag information (sig_coeff_flag) is true (value indicating that the sub-block includes a valid transform coefficient with a value that is not 0, such as a value of "1"), a sign (coeff_sign_flag) and an absolute value (abs) of each valid transform coefficient are encoded.

However, in a case where last_pos indicating the position of the sub-block including valid coefficient data in the highest range of the block is set, the scan is started from the sub-block at the position indicated by last_pos. For example, in a case where last_pos indicates the position of a sub-block 41 including valid coefficient data in the highest range of the block 20 as in an example of FIG. 5, the scan is started from the sub-block 41 based on the information. That is, of the scan in the block illustrated in FIG. 4, scan indicated by arrows of solid lines in the block 20 illustrated in FIG. 5 (that is, scan from a sub-block 41 to a sub-block on the upper left edge of the block 20) is executed. In other words, the scan indicated by arrows of dotted lines in FIG. 5 (that is, scan from the sub-block on the lower right edge of the block 20 to the sub-block 41) is skipped.

Figure 5:
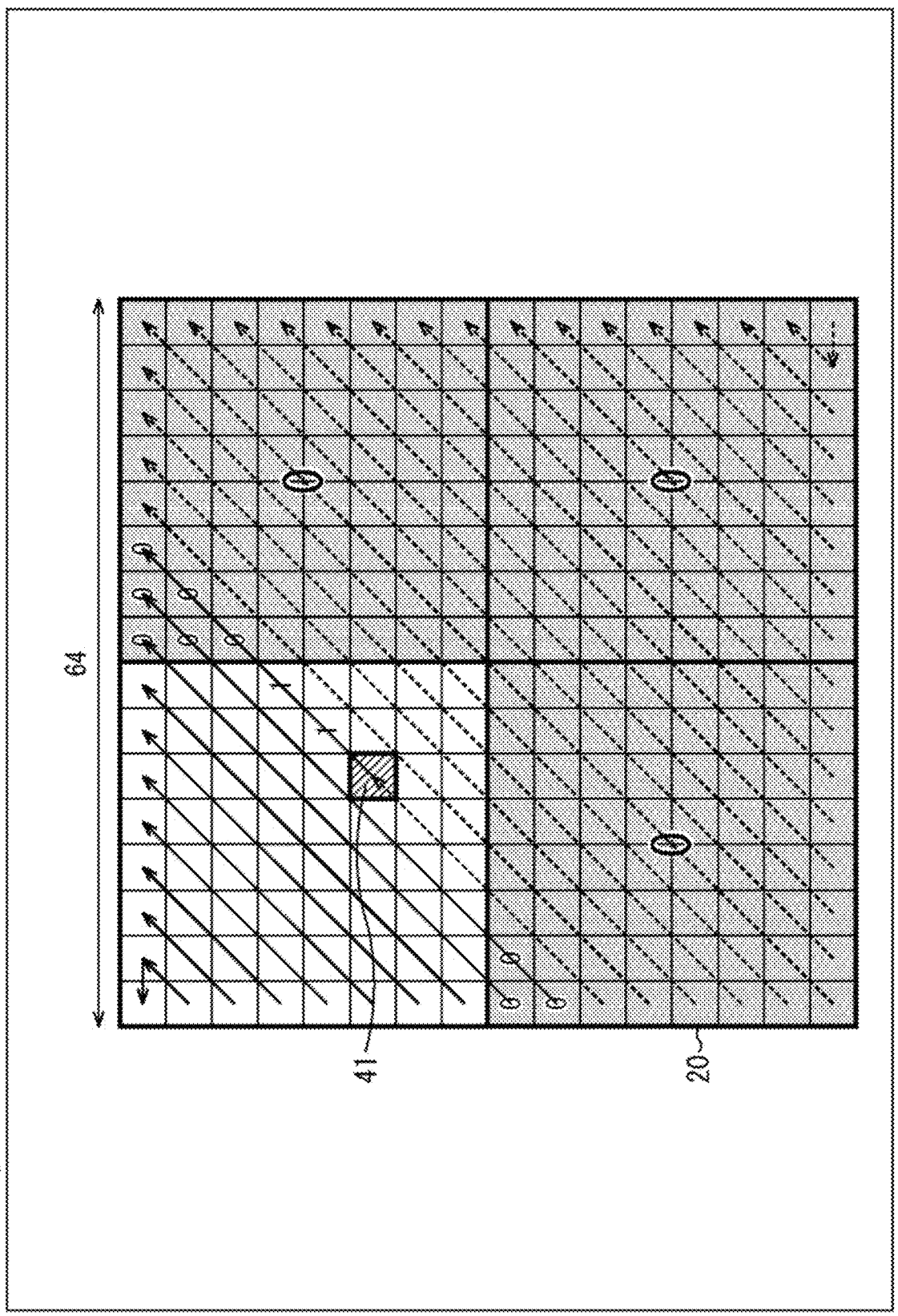
FIG. 5 is another diagram describing an example of the order of scan.

In this case, there is a case in which the range of the scan includes an invalid transform coefficient region as in the example of FIG. 5 (gray sub-blocks in FIG. 5). In that case, the sub-blocks in the invalid transform coefficient region are also scanned. Note that the invalid transform coefficient region does not include a valid transform coefficient, and therefore, the valid transform coefficient flag information (codec_sub_block_flag) of the sub-block in the invalid transform coefficient region is false (value indicating that the sub-block does not include a valid transform coefficient, such as a value of "0").

<Syntax>

FIG. 6 illustrates an example of syntax. In the example, processing is repeated from the sub-block (lastSubBlock) including the valid coefficient data of the highest range to the sub-block at the top of the block (sub-block on the upper left edge) in the for statement in the first stage from the top. In addition, the position in the x-axis direction and the y-axis direction is updated in the third stage and the fourth stage from the top, and the valid transform coefficient flag information (coded_sub_block_flag) is set for the sub-block at each position in the third row from the bottom. That is, the coefficient data (for example, valid transform coefficient flag information (coded_sub_block_flag)) is encoded for each sub-block from the sub-block (lastSubBlock) including the valid coefficient data in the highest range to the sub-block (sub-block on the upper left edge) at the top of the block.

<Encoding of Invalid Transform Coefficient Region>

However, in the case of the scan method as described above, the coefficient data in the invalid transform coefficient region is also scanned and encoded as illustrated in FIG. 5. However, it is apparent that the coefficient data in the invalid transform coefficient region has a value of "0," and the transmission is not necessary. That is, the coefficient data in the invalid transform coefficient region can be derived on the decoding side without the transmission from the encoding side.

That is, the encoding efficiency may be reduced by the unnecessary information in the scan method described above. In addition, the encoding and the decoding of the unnecessary information may also increase the load of the encoding process and the decoding process.

Figure 7:
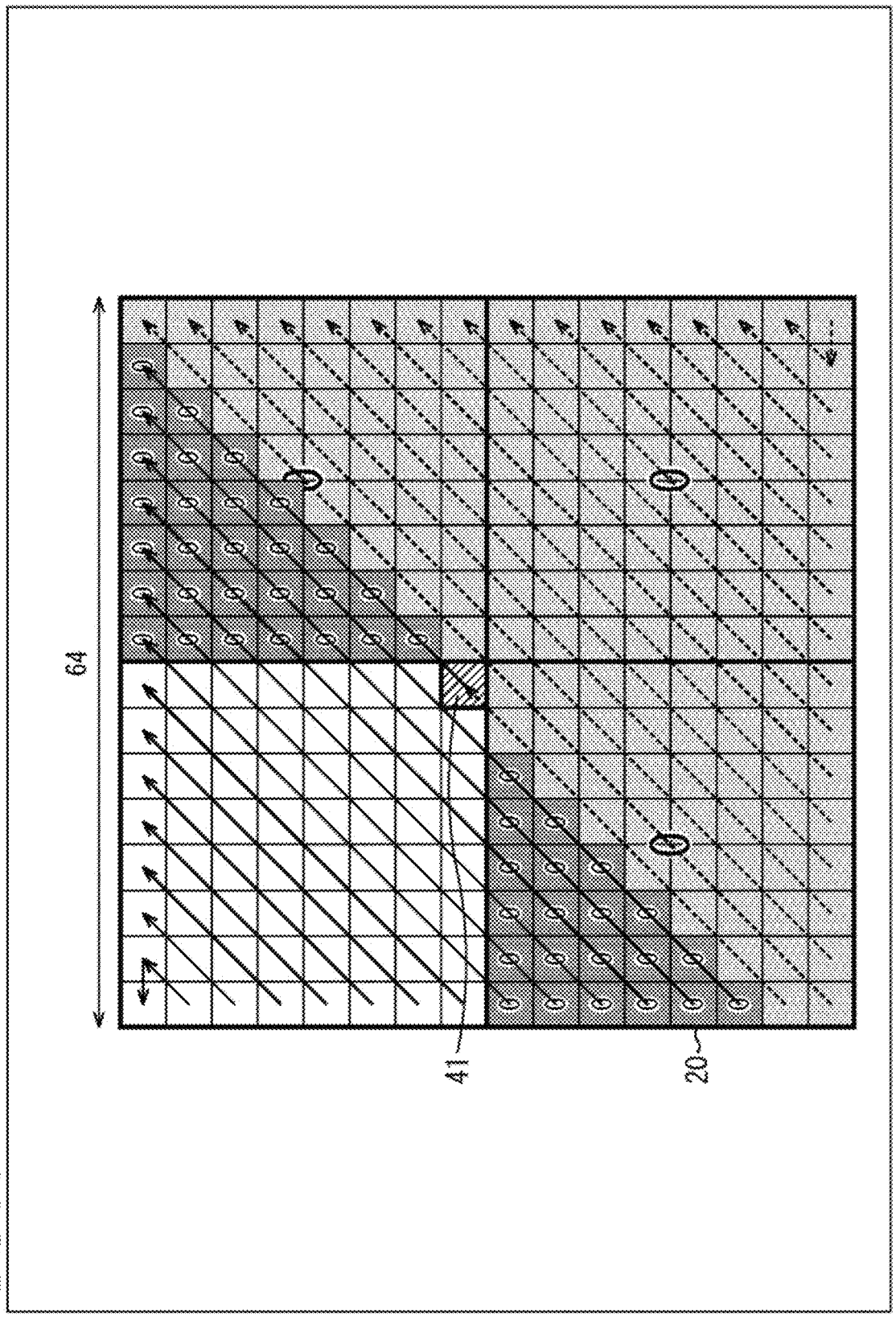
FIG. 7 is a diagram describing an example of encoding.

For example, in a case where the scan is started from the sub-block 41 at the lower right corner in the 32×32 valid transform coefficient region (white part in FIG. 7) on the upper left in the 64×64 block 20 as in an example of FIG. 7, dark gray sub-blocks in the invalid transform coefficient region (gray sub-blocks) are scanned.

Figure 8:
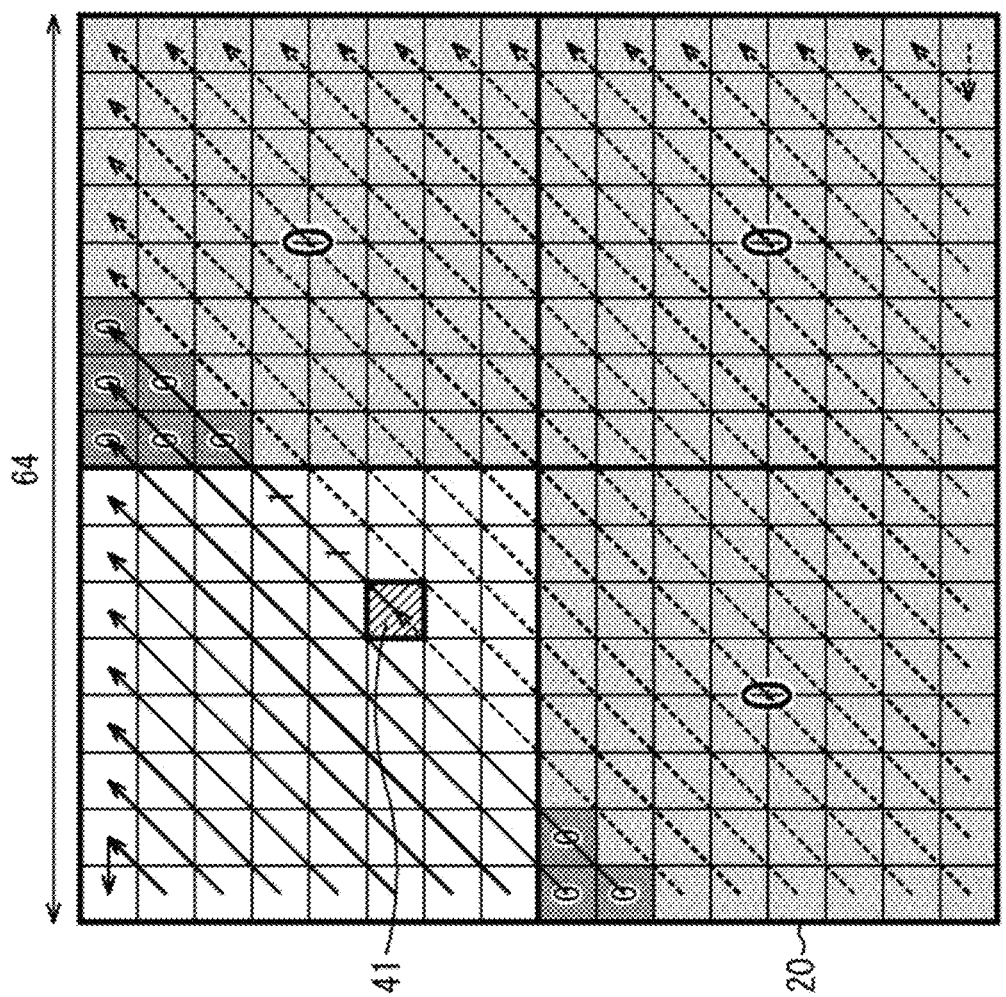
FIG. 8 is another diagram describing an example of the encoding.

In addition, this is similar in a case where, for example, the scan is started from the sub-block 41 (in the valid transform coefficient region) at the position of 5×5 from the upper left corner of the 64×64 block 20 as in an example of FIG. 8, and dark gray sub-blocks in the invalid transform coefficient region (gray sub-blocks) are scanned.

Figure 9:
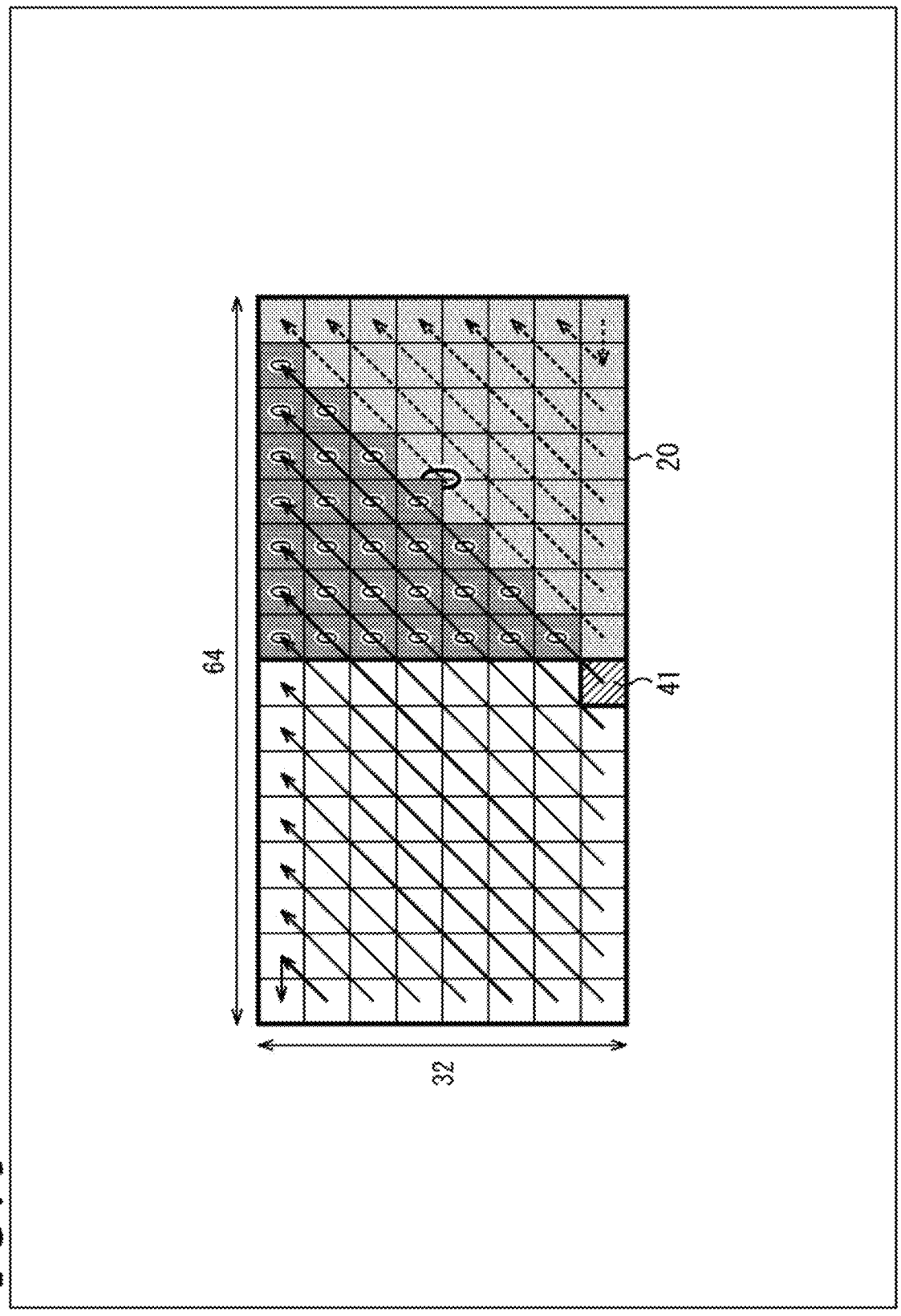
FIG. 9 is still another diagram describing an example of the encoding.

This is similar in a case where the block 20 is horizontally long. For example, as in FIG. 9, it is assumed that 32×32 on the left is a valid transform coefficient region (white part in FIG. 9) and 32×32 on the right is an invalid transform coefficient region in the 64×32 block 20. In a case where the scan is started from the sub-block 41 at the lower right corner of the valid transform coefficient region (white part in FIG. 9) in such a block 20, dark gray sub-blocks in the invalid transform coefficient region (gray sub-blocks) are scanned.

Figure 10:
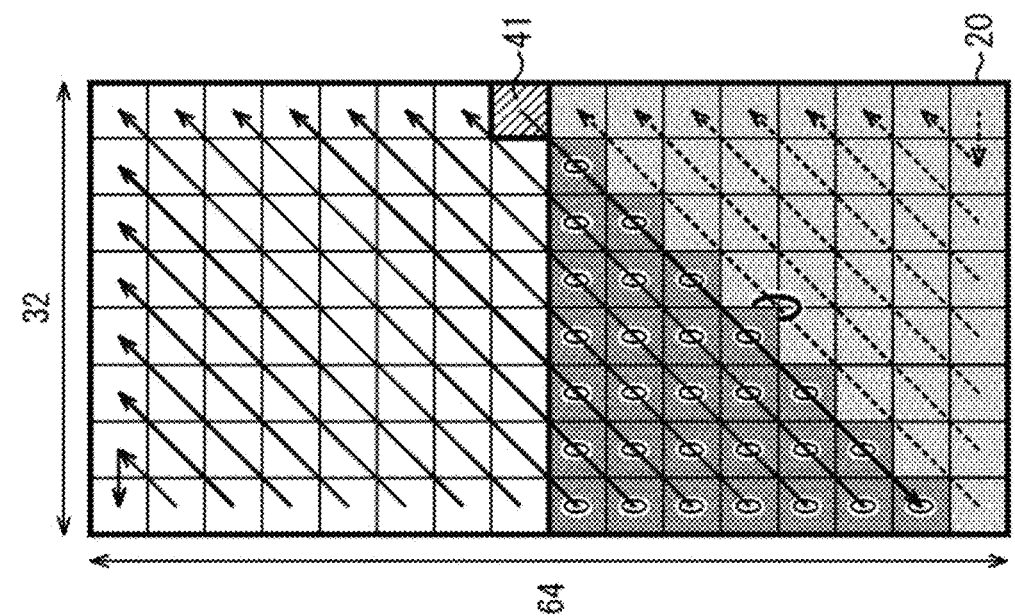
FIG. 10 is yet another diagram describing an example of the encoding.

This is similar in a case where the block 20 is vertically long. For example, as in FIG. 10, it is assumed that upper 32×32 is a valid transform coefficient region (white part in FIG. 10) and lower 32×32 is an invalid transform coefficient region in the 32×64 block 20. In a case where the scan is started from the sub-block 41 at the lower right corner of the valid transform coefficient region (white part in FIG. 10) in such a block 20, dark gray sub-blocks in the invalid transform coefficient region (gray sub-blocks) are scanned.

Figure 11:
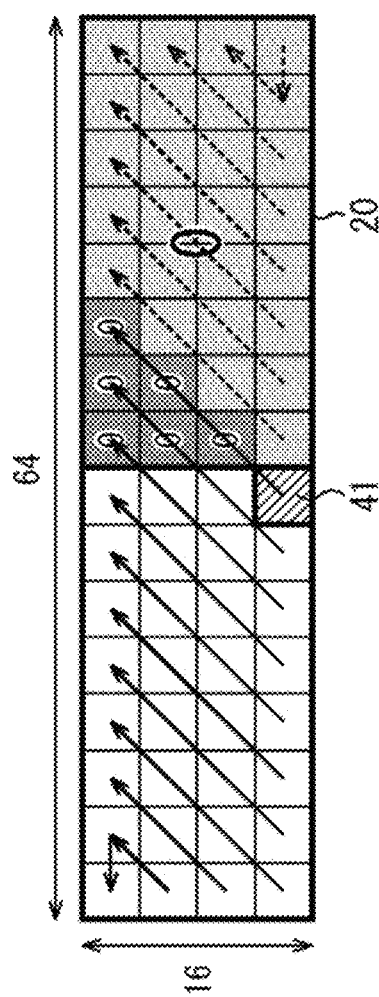
FIG. 11 is a further diagram describing an example of the encoding.

This is similar in a case where the block 20 is horizontally long. For example, as in FIG. 11, it is assumed that 32×16 on the left is a valid transform coefficient region (white part in FIG. 11) and 32×16 on the right is an invalid transform coefficient region in the 64×16 block 20. In a case where the scan is started from the sub-block 41 at the lower right corner of the valid transform coefficient region (white part in FIG. 11) in such a block 20, dark gray sub-blocks in the invalid transform coefficient region (gray sub-blocks) are scanned.

Figure 12:
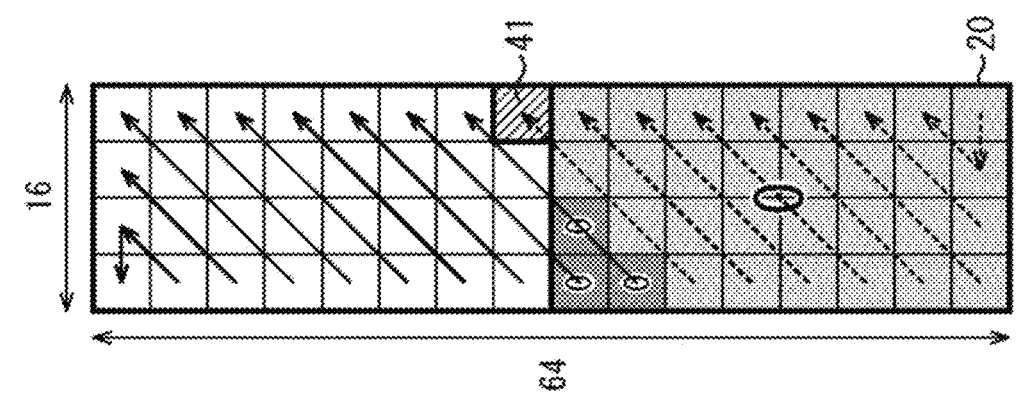
FIG. 12 is a still further diagram describing an example of the encoding.

This is similar in a case where the block 20 is vertically long. For example, as in FIG. 12, it is assumed that upper 16×32 is a valid transform coefficient region (white part in FIG. 12) and lower 16×32 is an invalid transform coefficient region in the 16×64 block 20. In a case where the scan is started from the sub-block 41 at the lower right corner of the valid transform coefficient region (white part in FIG. 12) in such a block 20, dark gray sub-blocks in the invalid transform coefficient region (gray sub-blocks) are scanned.

In such a way, unnecessary information is encoded and decoded regardless of the shape of the block in the scan method described above, and this may lead to a reduction in the encoding efficiency, an increase in the load of the encoding process and the decoding process, or the like.

3. Concept

<Method 1>

Therefore, as indicated in the first stage from the top of a table in FIG. 13, the abovementioned scan is controlled to skip the invalid transform coefficient region.

For example, encoding of coefficient data related to an image is skipped in the invalid transform coefficient region, and the coefficient data is encoded in the valid transform coefficient region. In addition, for example, the image processing apparatus includes an encoding unit that skips encoding of coefficient data related to an image in the invalid transform coefficient region and that encodes the coefficient data in the valid transform coefficient region. In such a way, encoding and decoding of the coefficient data in the invalid transform coefficient region can be suppressed, that is, encoding and decoding of unnecessary information can be suppressed. This can suppress the reduction in the encoding efficiency. In addition, for a similar reason, an increase in the load of the encoding process can be suppressed, and an increase in the cost, the circuit scale, the processing time, and the like can be suppressed (typically, the device can be more inexpensively developed and manufactured, the device can be more easily downsized, and the encoding can be performed faster).

In addition, for example, decoding of encoded data including encoded coefficient data related to an image is skipped in the invalid transform coefficient region, and the encoded data is decoded in the valid transform coefficient region. In addition, for example, the image processing apparatus includes a decoding unit that skips decoding of encoded data including encoded coefficient data related to an image in the invalid transform coefficient region and that decodes the encoded data in the valid transform coefficient region. In such a way, encoding and decoding of the coefficient data in the invalid transform coefficient region can be suppressed, that is, encoding and decoding of unnecessary information can be suppressed. This can suppress the reduction in the encoding efficiency (typically, the encoding efficiency can be improved). In addition, for a similar reason, an increase in the load of the decoding process can be suppressed, and an increase in the cost, the circuit scale, the processing time, and the like can be suppressed (typically, the device can be more inexpensively developed and manufactured, the device can be more easily downsized, and the decoding can be performed faster).

<Method 1-1>

In addition, although the sub-blocks are scanned in the diagonal direction in the block in the description above, the scan direction of the sub-block units is optional, and the scan direction may be a direction other than the diagonal direction. For example, in addition to the method 1 described above, the order of scan in the valid transform coefficient region of the block to be processed may be controlled as indicated in the second stage from the top of the table in FIG. 13, for example.

For example, the coefficient data of the valid transform coefficient region may be encoded in a scan order corresponding to the tendency of the distribution (features of distribution) of the values of the coefficient data in the block to be processed. In addition, for example, the encoded data of the valid transform coefficient region may be decoded in a scan order corresponding to the tendency of the distribution of the values of the coefficient data in the block to be processed. Although the details will be described later, the distribution of the values of the coefficient data varies according to the block shape, the prediction method, and the like. Therefore, the order of scan can be controlled in such a way to encode and decode the coefficient data by using the order of scan more suitable for the tendency of the distribution of the values of the coefficient data. Therefore, the reduction in the encoding efficiency can be suppressed (typically, encoding efficiency can be improved).

<Method 1-1-1>

For example, the scan direction in the valid transform coefficient region may be vertical or horizontal as indicated in the third stage from the top of the table in FIG. 13. That is, for example, the coefficient data of the valid transform coefficient region may be scanned and encoded in the vertical direction or the horizontal direction for each sub-block. In addition, for example, the encoded data of the valid transform coefficient region may be scanned and decoded in the vertical direction or the horizontal direction for each sub-block.

<Method 1-1-2>

In addition, for example, the scan direction in the valid transform coefficient region may be a direction corresponding to the block shape as indicated in the fourth stage from the top of the table in FIG. 13. That is, for example, the coefficient data of the valid transform coefficient region may be encoded for each sub-block in the scan order corresponding to the shape of the block to be processed. In addition, for example, the encoded data of the valid transform coefficient region may be decoded for each sub-block in the scan order corresponding to the shape of the block to be processed. Note that the scan direction of the sub-block units is not limited to the straight line direction (single direction). For example, the scan direction may be a curve direction or may include plural scan directions.

<Method 1-1-3>

In addition, for example, the sub-blocks of the valid transform coefficient region may be grouped to control the scan as indicated in the fifth stage from the top of the table in FIG. 13. That is, for example, the coefficient data of the valid transform coefficient region may be scanned and encoded for each group of sub-blocks. In addition, for example, the encoded data of the valid transform coefficient region may be scanned and decoded for each group of sub-blocks.

<Method 1-2>

Further, in addition to the method 1 described above, the chroma components of the block to be processed may also control the scan similarly to the luminance components, as indicated in the sixth stage from the top of the table in FIG. 13, for example. For example, for the luminance components and the chroma components of the image, encoding of the coefficient data may be skipped in the invalid transform coefficient region, and the coefficient data may be encoded in the valid transform coefficient region. In addition, for example, for the luminance components and the chroma components of the image, decoding of the encoded data may be skipped in the invalid transform coefficient region, and the encoded data may be decoded in the valid transform coefficient region.

In such a way, encoding and decoding of unnecessary information can be suppressed not only for the luminance components, but also for the chroma components. Therefore, the reduction in the encoding efficiency can be suppressed (typically, the encoding efficiency can be improved). In addition, for a similar reason, the increase in the load of the decoding process can be suppressed, and the increase in the cost, the circuit scale, the processing time, and the like can be suppressed (typically, the device can be more inexpensively developed and manufactured, the device can be more easily downsized, and decoding can be performed faster).

4. First Embodiment

<4-1: Scan Example of Method 1>

Next, each method in FIG. 13 will specifically be described. In the present embodiment, the "method 1" will be described. As described above, encoding and decoding are skipped in the invalid transform coefficient region, and encoding and decoding are performed in the valid transform coefficient region in the method 1. That is, only the coefficient data in the valid transform coefficient region is encoded and decoded as in an example of FIG. 14.

Figure 14:
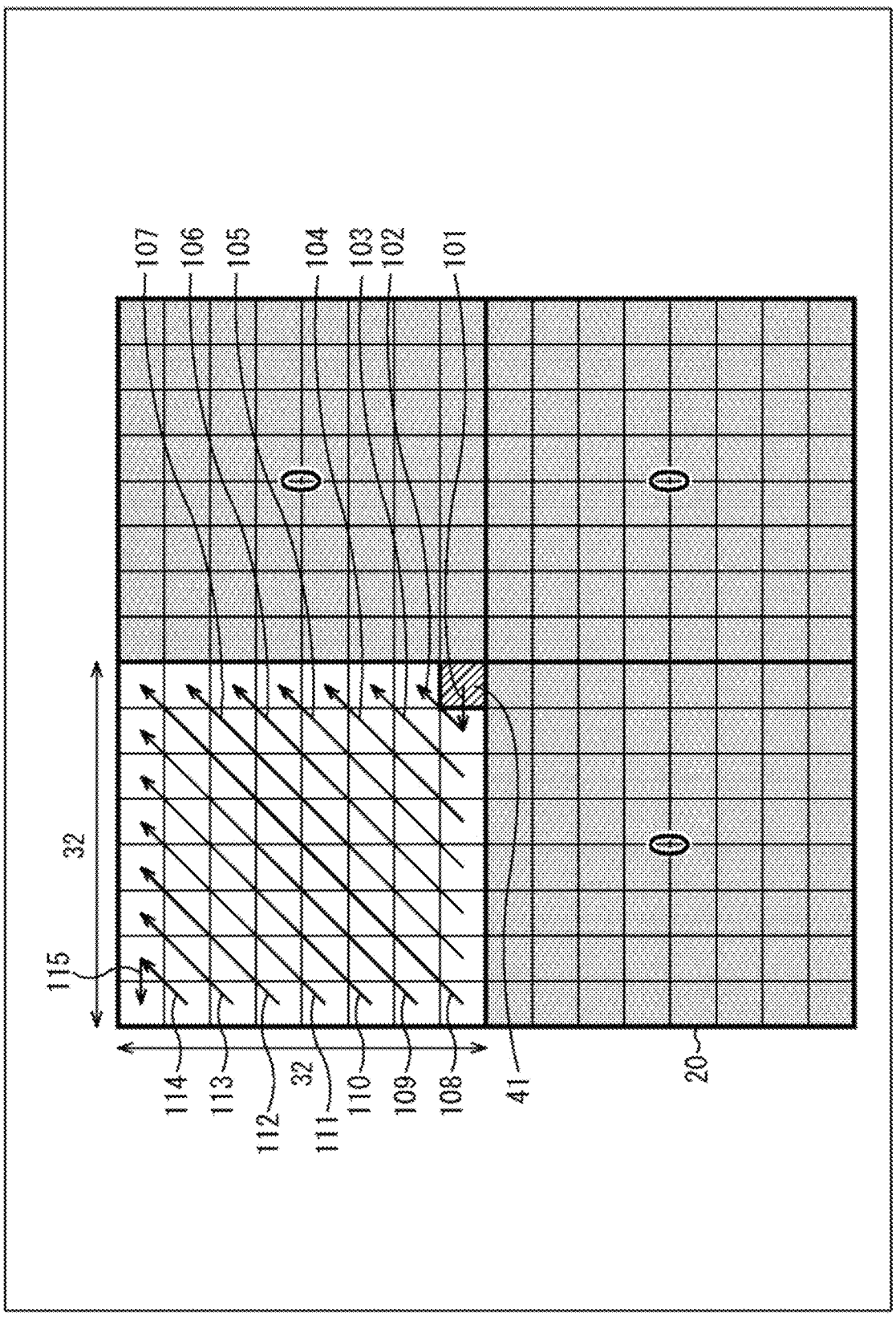
FIG. 14 is a diagram describing an example of skipping an invalid transform coefficient region.

In the case of the example in FIG. 14, the scan is started from the sub-block 41 at the lower right corner of the 32×32 valid transform coefficient region on the upper left (white part in FIG. 14) in the 64×64 block 20 as in the example of FIG. 7. However, the control is performed as described above in this case, and only the sub-blocks in the valid transform coefficient region are encoded and decoded as indicated by arrows in the block 20 of FIG. 14. That is, the sub-blocks in the valid transform coefficient region are scanned in order from an arrow 101 to an arrow 115, and the sub-blocks in the invalid transform coefficient region are not scanned.

This can suppress encoding and decoding of the sub-blocks in the invalid transform coefficient region that are unnecessary information, and the reduction in the encoding efficiency can be suppressed. In addition, for a similar reason, the increase in the load of the encoding process and the decoding process can be suppressed, and the increase in the cost, the circuit scale, the processing time, and the like can be suppressed (typically, the device can be more inexpensively developed and manufactured, the device can be more easily downsized, and the encoding and the decoding can be performed faster).

Figure 15:
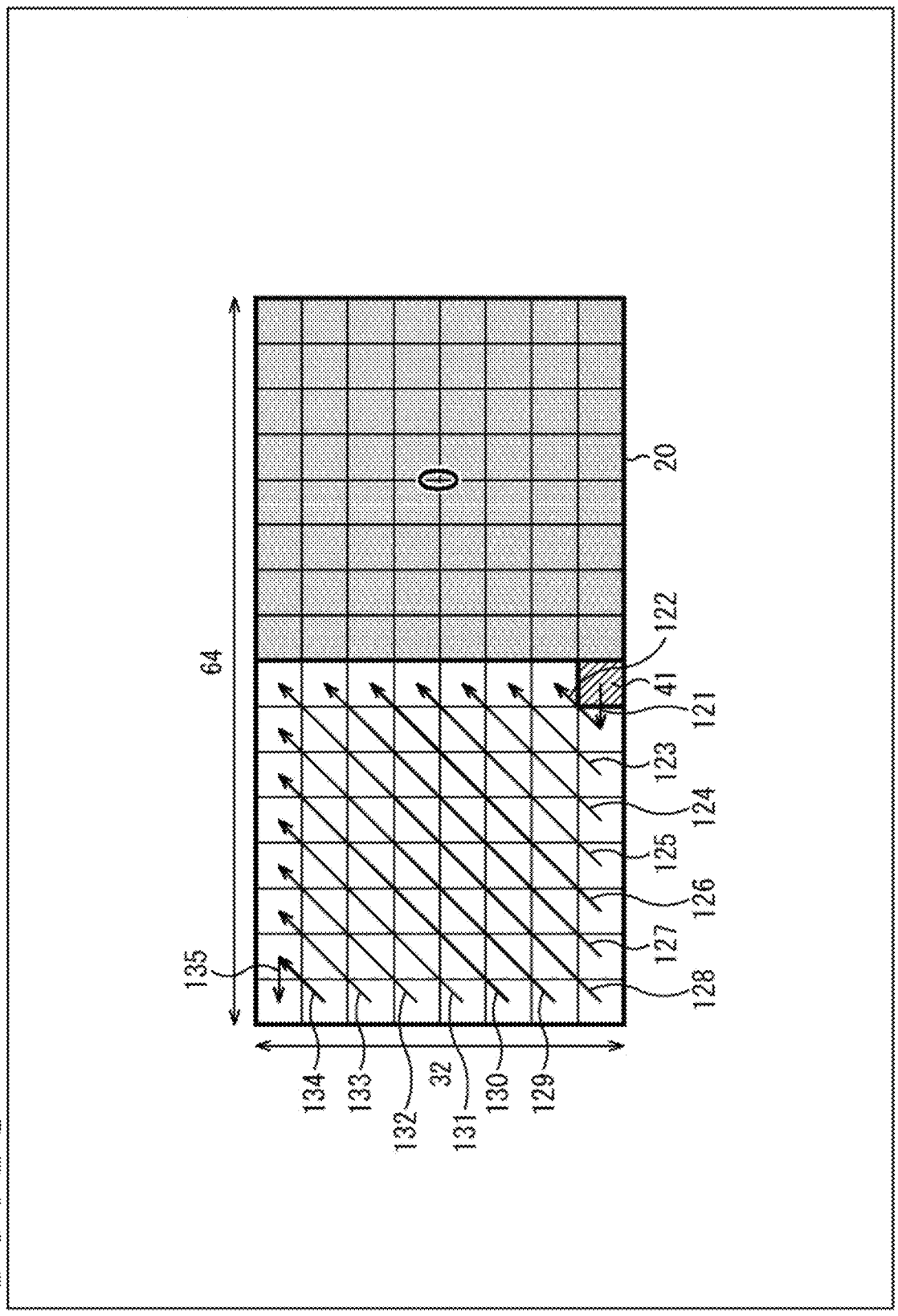
FIG. 15 is another diagram describing an example of skipping the invalid transform coefficient region.

The shape of the block 20 is optional, and the shape may not be a square as in the example of FIG. 14. For example, the block 20 may be a horizontally long rectangle as in an example of FIG. 15. In the case of the example of FIG. 15, the size of the block 20 is 64×32 as in the case of FIG. 9. In addition, 32×32 on the left is a valid transform coefficient region (white part in FIG. 15), and 32×32 on the right is an invalid transform coefficient region. The scan is started from the sub-block 41 at the lower right corner of the valid transform coefficient region (white part in FIG. 15). However, the control is performed as described above in this case, and only the sub-blocks in the valid transform coefficient region are encoded and decoded as indicated by arrows in the block 20 of FIG. 15. That is, the sub-blocks in the valid transform coefficient region are scanned in order from an arrow 121 to an arrow 135, and the sub-blocks in the invalid transform coefficient region are not scanned.

This can suppress encoding and decoding of the sub-blocks in the invalid transform coefficient region that are unnecessary information, and the reduction in the encoding efficiency can be suppressed. In addition, for a similar reason, the increase in the load of the encoding process and the decoding process can be suppressed, and the increase in the cost, the circuit scale, the processing time, and the like can be suppressed (typically, the device can be more inexpensively developed and manufactured, the device can be more easily downsized, and the encoding and the decoding can be performed faster).

Figure 16:
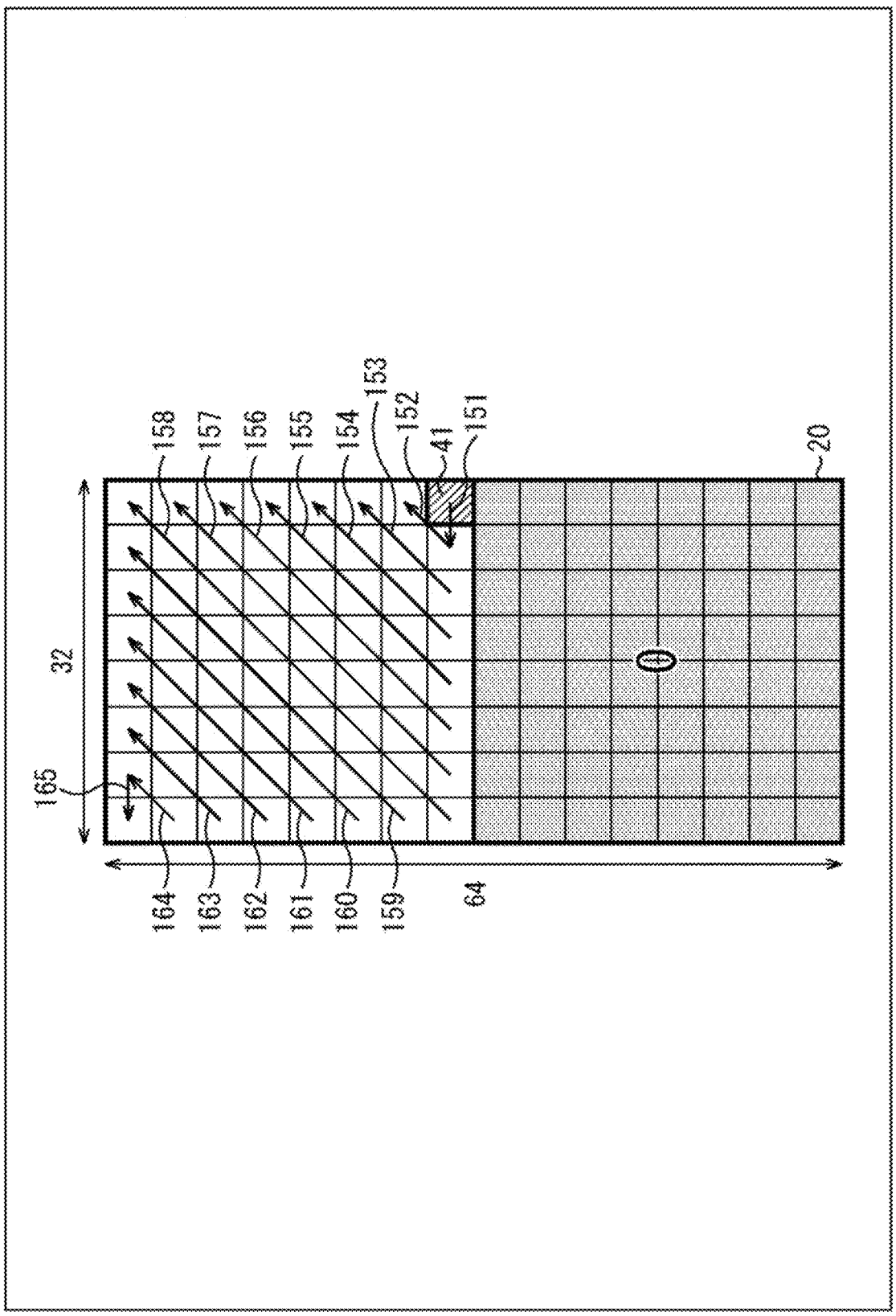
FIG. 16 is still another diagram describing an example of skipping the invalid transform coefficient region.

In addition, for example, the block 20 may be a vertically long rectangle as in an example of FIG. 16. In the case of the example in FIG. 16, the size of the block 20 is 32×64 as in the case of FIG. 10. In addition, upper 32×32 is a valid transform coefficient region (white part in FIG. 16), and lower 32×32 is an invalid transform coefficient region. The scan is started from the sub-block 41 at the lower right corner of the valid transform coefficient region (white part in FIG. 16). However, the control is performed as described above in this case, and only the sub-blocks in the valid transform coefficient region are encoded and decoded as indicated by arrows in the block 20 of FIG. 16. That is, the sub-blocks in the valid transform coefficient region are scanned in order from an arrow 151 to an arrow 165, and the sub-blocks in the invalid transform coefficient region are not scanned.

This can suppress encoding and decoding of the sub-blocks in the invalid transform coefficient region that are unnecessary information, and the reduction in the encoding efficiency can be suppressed. In addition, for a similar reason, the increase in the load of the encoding process and the decoding process can be suppressed, and the increase in the cost, the circuit scale, the processing time, and the like can be suppressed (typically, the device can be more inexpensively developed and manufactured, the device can be more easily downsized, and the encoding and the decoding can be performed faster).

Note that, although the diagonal order from lower left to upper right is repeated from lower right to upper left in the example of the order of scan (scan direction) described above as in the example of FIG. 4, the order of scan in which the present technique is applied is optional, and the order of scan is not limited to the example. For example, a diagonal order from upper right to lower left may be repeated from lower right to upper left in the opposite direction from the arrows in FIG. 4.

<4-2: Encoding>
<Encoding Apparatus>

Figure 17:
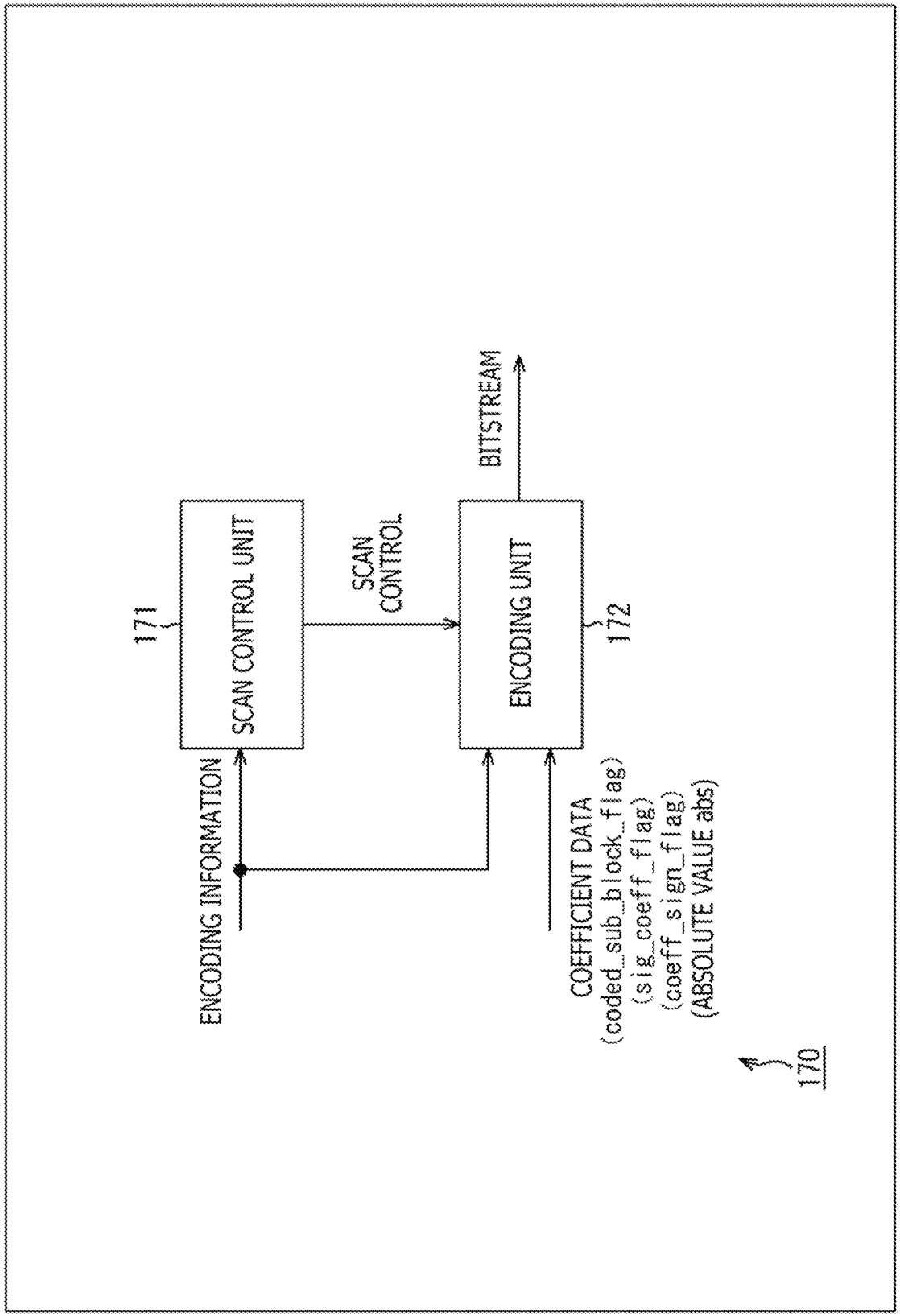
FIG. 17 is a block diagram illustrating a main configuration example of an encoding apparatus.

Next, an example of the device that realizes such scan control will be described. FIG. 17 is a block diagram illustrating an example of a main configuration of an encoding apparatus as a mode of the image processing apparatus according to the present technique. An encoding apparatus 170 illustrated in FIG. 17 is an apparatus that encodes coefficient data of an input image and that outputs the encoded data. As illustrated in FIG. 17, the encoding apparatus 170 includes a scan control unit 171 and an encoding unit 172.

The scan control unit 171 executes a process related to the control of scan. For example, the scan control unit 171 acquires encoding information input from the outside of the encoding apparatus 170. The encoding information is also called encoding parameters and includes any information regarding encoding of an image (coefficient data). For example, the encoding information includes information regarding the block size (TbW, TbH) of the block to be processed, information regarding the size of the valid transform coefficient region in the block to be processed (also referred to as valid transform coefficient region information), and the like. The scan control unit 171 extracts the information regarding the block size of the block to be processed and the valid transform coefficient region information from the acquired encoding information.

The scan control unit 171 specifies the range of the valid transform coefficient region (the position of the valid transform coefficient region) in the block to be processed, based on the information. The scan control unit 171 controls the order of scan of the coefficient data performed by the encoding unit 172, based on the information. That is, the scan control unit 171 controls the order of scan so that, for example, the encoding unit 172 skips the encoding of the coefficient data of the sub-blocks in the invalid transform coefficient region and encodes the coefficient data of the sub-blocks in the valid transform coefficient region as described above in <4-1: Scan Example of Method 1>. The scan control unit 171 supplies a control command or the like to the encoding unit 172 to control the order of scan of the encoding unit 172.

The encoding unit 172 executes a process related to encoding. For example, the encoding unit 172 acquires encoding information and an image (coefficient data) input to the encoding apparatus 170. In addition, the encoding unit 172 acquires a control command or the like related to the scan supplied from the scan control unit 171. The encoding unit 172 encodes the coefficient data in the order of scan controlled by the scan control unit 171 and generates encoded data of the coefficient data. For example, the encoding unit 172 skips the encoding of the coefficient data related to the image in the sub-blocks of the invalid transform coefficient region and encodes the coefficient data in the sub-blocks of the valid transform coefficient region as described above in <4-1: Scan Example of Method 1>.

That is, the encoding unit 172 may skip the encoding of the coefficient data in the invalid transform coefficient region and encode the coefficient data in the valid transform coefficient region based on the information indicating the block size of the block to be processed and the information indicating the range of the valid transformation coefficient region.

In addition, the content of the coefficient data is optional. For example, the coefficient data may include valid transform coefficient flag information (codec_sub_block_flag) indicating the presence/absence of the valid transform coefficient for each sub-block. Further, the encoding unit 172 may skip the encoding of the valid transform coefficient flag information (codec_sub_block_flag) of each sub-block in the invalid transform coefficient region and encode the valid transform coefficient flag information (codec_sub_block_flag) of each sub-block in the valid transform coefficient region.

In addition, for example, the coefficient data may further include validity flag information (sig_coeff_flag) indicating, for each sub-block, the presence/absence of the valid transform coefficient with a value that is not 0 and may include a sign (coeff_sign_flag) and an absolute value (abs) of each valid transform coefficient. Further, the encoding unit 172 may encode the validity flag information (sig_coeff_flag) of the sub-block in which the valid transform coefficient flag information (codec_sub_block_flag) is encoded and may encode the sign (coeff_sign_flag) and the absolute value (abs) of each valid transform coefficient of the sub-block in which the validity flag information (sig_coeff_flag) is true.

In addition, the encoding unit 172 also encodes the encoding information and generates encoded data of the encoding information. The encoding unit 172 outputs the generated encoded data as a bitstream to the outside of the encoding apparatus 170.

In such a way, the encoding apparatus 170 can reduce the unnecessary information included in the bitstream (the encoded data of the coefficient data of the sub-blocks in the invalid transform coefficient region), and the reduction in the encoding efficiency can be suppressed. In addition, the encoding apparatus 170 can skip the encoding of the unnecessary information, and therefore, the encoding apparatus 170 can suppress the increase in the load of the encoding process. The encoding apparatus 170 can suppress the increase in the cost, the circuit scale, the processing time, and the like (typically, the device can be more inexpensively developed and manufactured, the device can be more easily downsized, and the encoding can be performed faster).

<Flow of Encoding Process>

Figure 18:
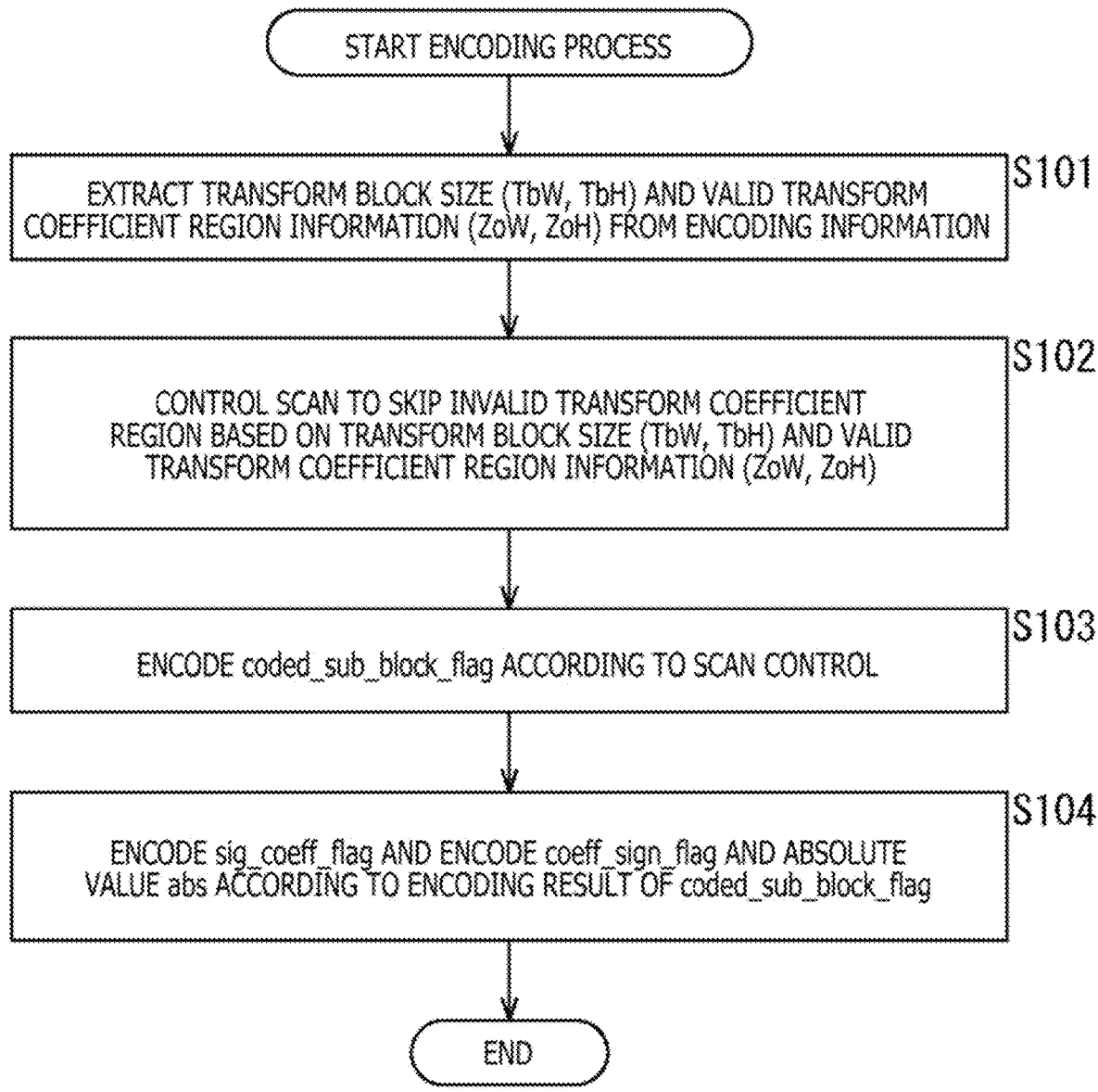
FIG. 18 is a flow chart describing an example of a flow of an encoding process.

An example of a flow of the encoding process executed by the encoding apparatus 170 will be described with reference to a flow chart of FIG. 18. Here, processing of one block will be described.

Once the encoding process is started, the scan control unit 171 of the encoding apparatus 170 acquires the encoding information and extracts the transform block size (TbW, TbH) and the valid transform coefficient region information (ZoW, ZoH) from the encoding information in step S101.

In step S102, the scan control unit 171 controls the scan by the encoding unit 172 based on the information extracted in step S101 (transform block size (TbW, TbH) and valid transform coefficient region information (ZoW, ZoH)) to skip the scan of the sub-blocks in the invalid transform coefficient region and scan the sub-blocks in the valid transform count region as described above in, for example, <4-1: Scan Example of Method 1>.

In step S103, the encoding unit 172 scans each sub-block according to the control and encodes the valid transform coefficient flag information (coded_sub_block_flag) of each sub-block. That is, the encoding unit 172 skips the scan of the sub-blocks in the invalid transform coefficient region and scans only the sub-blocks in the valid transform coefficient region as described above in, for example, <4-1: Scan Example of Method 1>. Therefore, only the valid transform coefficient flag information (coded_sub_block_flag) of each sub-block in the valid transform coefficient region is encoded.

In step S104, the encoding unit 172 encodes the validity flag information (sig_coeff_flag) of each sub-block based on the value of the valid transform coefficient flag information (coded_sub_block_flag) encoded in step S103. That is, the encoding unit 172 encodes the validity flag information (sig_coeff_flag) of each sub-block in which the valid transform coefficient flag information (coded_sub_block_flag) is true (for example, "1").

In addition, the encoding unit 172 encodes the sign (coeff_sign_flag) and the absolute value (abs) of the transform coefficient according to the value of the encoded validity flag information (sig_coeff_flag). That is, the encoding unit 172 encodes the sign (coeff_sign_flag) and the absolute value (abs) of each transform coefficient of each sub-block in which the validity flag information (sig_coeff_flag) is true (for example, "1").

That is, in the processes of step S103 and step S104, the encoding unit 172 skips the encoding of the coefficient data related to the image in each sub-block of the invalid transform coefficient region and encodes the coefficient data in each sub-block of the valid transform coefficient region as described above in, for example, <4-1: Scan Example of Method 1>. Further, the encoding unit 172 also encodes the encoding information. The encoding unit 172 outputs the encoded data as a bitstream. Once the process of step S104 is completed, the encoding process ends.

In such a way, the encoding apparatus 170 can reduce the unnecessary information (the encoded data of the coefficient data of the sub-blocks in the invalid transform coefficient region) included in the bitstream, and the reduction in the encoding efficiency can be suppressed. In addition, the encoding apparatus 170 can skip the encoding of the unnecessary information, and therefore, the encoding apparatus 170 can suppress the increase in the load of the encoding process. The encoding apparatus 170 can suppress the increase in the cost, the circuit scale, the processing time, and the like (typically, the device can be more inexpensively developed and manufactured, the device can be more easily downsized, and the encoding can be performed faster).

<4-3: Decoding>

<Decoding Apparatus>

Figure 19:
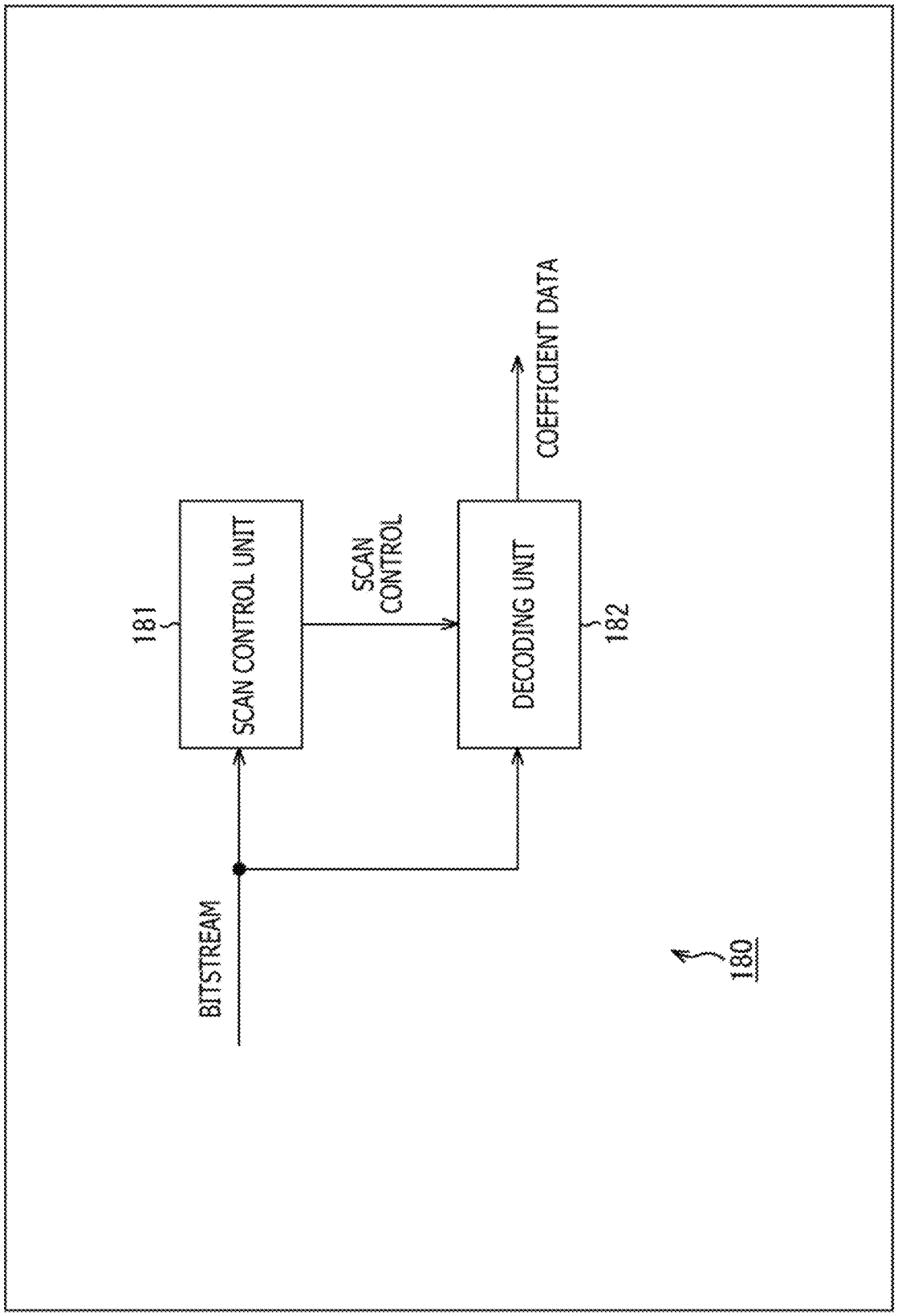
FIG. 19 is a block diagram illustrating a main configuration example of a decoding apparatus.

FIG. 19 is a block diagram illustrating an example of a main configuration of a decoding apparatus as a mode of the image processing apparatus according to the present technique. A decoding apparatus 180 illustrated in FIG. 19 is an apparatus that decodes encoded data of an input image and that outputs coefficient data of the image. As illustrated in FIG. 19, the decoding apparatus 180 includes a scan control unit 181 and a decoding unit 182.

The scan control unit 181 executes a process related to the control of scan. For example, the scan control unit 181 acquires a bitstream (encoded data) input from the outside of the decoding apparatus 180. The bitstream is, for example, generated by the encoding apparatus 170, and the bitstream includes encoded data of coefficient data encoded in the order of scan for skipping the encoding of the coefficient data of the sub-blocks in the invalid transform coefficient region that is unnecessary information and includes encoded data of encoding information. The scan control unit 181 extracts the block size (TbW, TbH) of the block to be processed and the valid transform coefficient region information from the acquired bitstream.

The scan control unit 181 specifies the range of the valid transform coefficient region (the position of the valid transform coefficient region) in the block to be processed, based on the information. The scan control unit 181 reproduces the scan order in encoding (that is, scan control by the scan control unit 171), based on the information. The scan control unit 181 supplies a control command or the like to the decoding unit 182 and thereby controls the decoding unit 182 to reproduce the order of scan (that is, the order of scan for skipping the encoding of the coefficient data of the sub-blocks in the invalid transform coefficient region and encoding the coefficient data of the sub-blocks in the valid transform coefficient region as described above in, for example, <4-1: Scan Example of Method 1>).

The decoding unit 182 executes a process related to decoding. For example, the decoding unit 182 acquires a bitstream input to the decoding apparatus 180. The bitstream includes the encoded data of the coefficient data and the encoding information. In addition, the decoding unit 182 acquires a control command or the like related to scan supplied from the scan control unit 181. The decoding unit 182 decodes the bitstream to obtain the coefficient data, based on the order of scan in encoding reproduced according to the control of the scan control unit 181. For example, the decoding unit 182 skips decoding of the encoded data including the encoded coefficient data related to the image in the sub-blocks of the invalid transform coefficient region and decodes the encoded data in the sub-blocks of the valid transform coefficient region as described above in, for example, <4-1: Scan Example of Method 1>.

That is, the decoding unit 182 may skip the decoding of the encoded data of the coefficient data in the invalid transform coefficient region and decode the encoded data of the coefficient data in the valid transform coefficient region, based on the information indicating the block size of the block to be processed and the information indicating the range of the valid transform coefficient region.

In addition, the content of the coefficient data is optional. For example, the coefficient data may include the valid transform coefficient flag information (codec_sub_block_flag) indicating the presence/absence of the valid transform coefficient for each sub-block. Further, the decoding unit 182 may decode the encoded data of the valid transform coefficient flag information (codec_sub_block_flag) of each sub-block in the valid transform coefficient region.

In addition, for example, the coefficient data may further include the validity flag information (sig_coeff_flag) indicating, for each sub-block, the presence/absence of the valid transform coefficient with a value that is not 0 and may include the sign (coeff_sign_flag) and the absolute value (abs) of each valid transform coefficient. Further, the decoding unit 182 may decode the encoded data of the validity flag information (sig_coeff_flag) of the sub-block for which the encoded data of the valid transform coefficient flag information (codec_sub_block_flag) is decoded and may decode the encoded data of the sign (coeff_sign_flag) and the absolute value (abs) of each valid transform coefficient in the sub-block in which the validity flag information (sig_coeff_flag) is true.

For example, the decoding unit 182 decodes the encoded data of the coefficient data included in the bitstream, to obtain the transmitted coefficient data. In addition, the decoding unit 182 specifies the sub-blocks corresponding to the transmitted coefficient data based on the order of scan controlled by the scan control unit 181 (that is, the order of scan for skipping the encoding of the coefficient data of the sub-blocks in the invalid transform coefficient region and encoding the coefficient data of the sub-blocks in the valid transform coefficient region as described above in, for example, <4-1: Scan Example of Method 1>). That is, the transmitted coefficient data is associated with the sub-blocks in the valid transform coefficient region. Further, the decoding unit 182 restores the coefficient data of other sub-blocks, that is, the coefficient data not transmitted (for example, invalid transform coefficients and the like). The decoding unit 182 generates the coefficient data of each block in such a way and outputs the coefficient data to the outside of the decoding apparatus 180.

In such a way, the decoding apparatus 180 can correctly decode the encoded data generated in the order of scan for reducing the unnecessary information included in the bitstream (the encoded data of the coefficient data of the sub-blocks in the invalid transform coefficient region). That is, the decoding apparatus 180 can suppress the reduction in the encoding efficiency. In addition, the decoding apparatus 180 can skip the decoding of the unnecessary information, and therefore, the decoding apparatus 180 can suppress the increase in the load of the decoding process. The decoding apparatus 180 can suppress the increase in the cost, the circuit scale, the processing time, and the like (typically, the device can be more inexpensively developed and manufactured, the device can be more easily downsized, and the decoding can be performed faster).

<Flow of Decoding Process>

Figure 20:
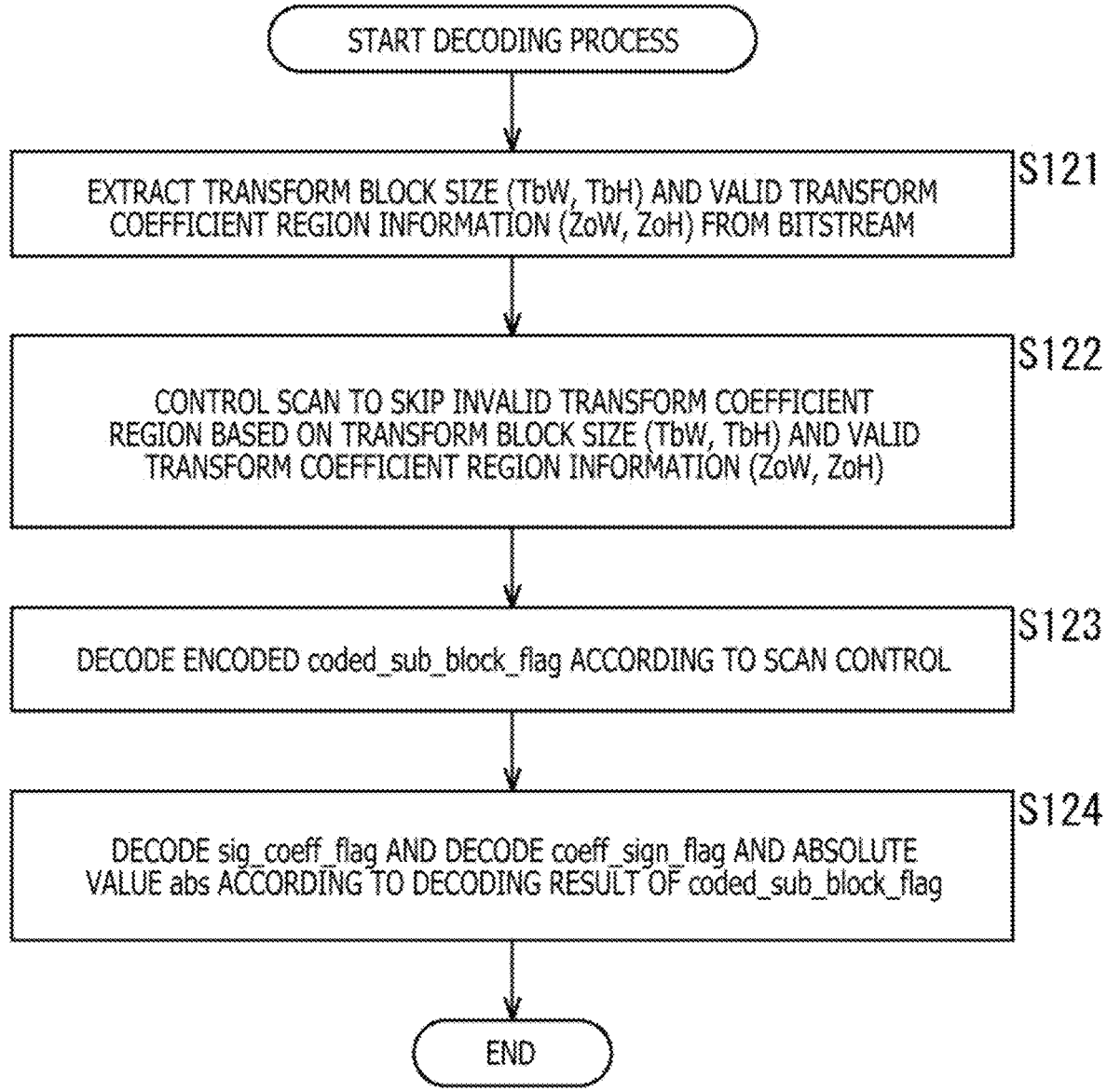
FIG. 20 is a flow chart describing an example of a flow of a decoding process.

An example of a flow of the encoding process executed by the decoding apparatus 180 will be described with reference to a flow chart of FIG. 20. Here, processing of one block will be described.

Once the decoding process is started, in step S121, the scan control unit 181 of the decoding apparatus 180 acquires the bitstream and extracts the transform block size (TbW, TbH) and the valid transform coefficient region information (ZOW, ZoH) from the bitstream.

In step S122, the scan control unit 181 controls the decoding unit 182 based on the information (transform block size (TbW, TbH) and valid transform coefficient region information (ZoW, ZoH)) extracted in step S121 to reproduce the order of scan in encoding (the order of scan for skipping the scan of the sub-blocks in the invalid transform coefficient region and scanning the sub-blocks in the valid transform count region as described above in, for example, <4-1: Scan Example of Method 1>).

In step S123, the decoding unit 182 decodes the encoded data of the valid transform coefficient flag information (coded_sub_block_flag) of each sub-block according to the order of scan in encoding, based on the control.

For example, the decoding unit 182 decodes the encoded data of the valid transform coefficient flag information (coded_sub_block_flag) included in the bitstream and obtains the transmitted valid transform coefficient flag information (coded_sub_block_flag). In addition, the decoding unit 182 specifies the sub-blocks corresponding to the transmitted valid transform coefficient flag information (coded_sub_block_flag) based on the order of scan controlled by the scan control unit 181 (that is, the order of scan in encoding). Further, the decoding unit 182 restores the valid transform coefficient flag information (coded_sub_block_flag) of other sub-blocks, that is, the valid transform coefficient flag information (coded_sub_block_flag) not transmitted.

For example, in the case where the valid transform coefficient flag information (coded_sub_block_flag) of the sub-blocks in the valid transform coefficient region is obtained by decoding the bitstream, the decoding unit 182 restores the valid transform coefficient flag information (coded_sub_block_flag) of the sub-blocks in the invalid transform coefficient region that is another region. In such a way, the decoding unit 182 restores the valid transform coefficient flag information (coded_sub_block_flag) of all of the sub-blocks of the block to be processed.

In step S124, the decoding unit 182 decodes the validity flag information (sig_coeff_flag) of each sub-block, based on the value of the valid transform coefficient flag information (coded_sub_block_flag) decoded in step S123.

For example, the decoding unit 182 decodes the encoded data of the validity flag information (sig_coeff_flag) included in the bitstream and obtains the transmitted validity flag information (sig_coeff_flag). In addition, the decoding unit 182 specifies the sub-blocks corresponding to the transmitted validity flag information (sig_coeff_flag), based on the decoding result of the valid transform coefficient flag information (coded_sub_block_flag). Further, the decoding unit 182 restores the validity flag information (sig_coeff_flag) of other sub-blocks, that is, the validity flag information (sig_coeff_flag) not transmitted.

Further, the decoding unit 182 decodes the sign (coeff_sign_flag) and the absolute value (abs) of the transform coefficient included in each sub-block, based on the value of the validity flag information (sig_coeff_flag) of each sub-block restored in such a way.

For example, the decoding unit 182 decodes the encoded data of the sign (coeff_sign_flag) and the absolute value (abs) of the transform coefficient included in the bitstream and obtains the sign (coeff_sign_flag) and the absolute value (abs) of the transmitted transform coefficient. In addition, the decoding unit 182 associates the sign (coeff_sign_flag) and the absolute value (abs) of the transmitted transform coefficient with the sub-block in which the validity flag information (sig_coeff_flag) is true (for example, "1"). Further, the decoding unit 182 restores the sign (coeff_sign_flag) and the absolute value (abs) of the transform coefficient included in another sub-block, that is, the sign (coeff_sign_flag) and the absolute value (abs) of the transform coefficient not transmitted.

That is, in the processes of step S123 and step S124, the decoding unit 182 skips the decoding of the encoded data including the encoded coefficient data related to the image in each sub-block of the invalid transform coefficient region and decodes the encoded data in each sub-block of the valid transform coefficient region. The decoding unit 182 outputs the coefficient data generated in such a way. Once the process of step S124 is completed, the decoding process ends.

In such a way, the decoding apparatus 180 can correctly decode the encoded data generated in the order of scan for reducing the unnecessary information included in the bitstream (the encoded data of the coefficient data of the sub-blocks in the invalid transform coefficient region). That is, the decoding apparatus 180 can suppress the reduction in the encoding efficiency. In addition, the decoding apparatus 180 can skip the decoding of the unnecessary information, and therefore, the decoding apparatus 180 can suppress the increase in the load of the decoding process. The decoding apparatus 180 can suppress the increase in the cost, the circuit scale, the processing time, and the like (typically, the device can be more inexpensively developed and manufactured, the device can be more easily downsized, and the decoding can be performed faster).

<4-4: Syntax>

Although the skip of the sub-blocks in the invalid transform coefficient region as described above may be realized by changing the order of scan as described above, the skip may be realized by using syntax.

FIG. 21 illustrates an example of the syntax in this case. Although the example of the syntax is basically similar to the example of FIG. 6, the range of the scan is limited to the valid transform coefficient region ((xS<=32) && (yS<=32)) in the if statement of the sixth stage from the top. In such a way, the abovementioned scan control can easily be realized.

5. Second Embodiment

<5-1: Scan Example of Method 1-1>

In the present embodiment the "method 1-1" will be described. As described above, in addition to the method 1 described above, the order of scan in the valid transform coefficient region of the block to be processed is controlled in the method 1-1. In such a way, the scan direction of the sub-block units can be any direction, and a scan direction other than the diagonal direction can be realized. As a result, the encoding and the decoding can be performed in, for example, a more appropriate scan order for the tendency of the distribution of the values of the coefficient data in the block to be processed. Therefore, the reduction in the encoding efficiency can be suppressed.

For example, the scan control unit 171 in the encoding apparatus 170 may control the order of scan in the valid transform coefficient region in step S102, and the encoding unit 172 may scan and encode the sub-blocks in the valid transform coefficient region according to the control in step S103 and step S104. In such a way, the encoding apparatus 170 can further suppress the reduction in the encoding efficiency.

In addition, for example, the scan control unit 181 in the decoding apparatus 180 may control the order of scan in the valid transform coefficient region in step S122, and the decoding unit 182 may use the scan of the sub-blocks in the valid transform coefficient region according to the control to decode the encoded data in step S123 and step S124. In such a way, the decoding apparatus 180 can further suppress the reduction in the encoding efficiency.

Specific examples of the control of the order of scan will be described below.

<5-1-1: Method 1-1-1>

For example, the scan direction of the sub-block units in the valid transform coefficient region in the encoding and the decoding may be vertical or horizontal (method 1-1-1).

Figure 22:
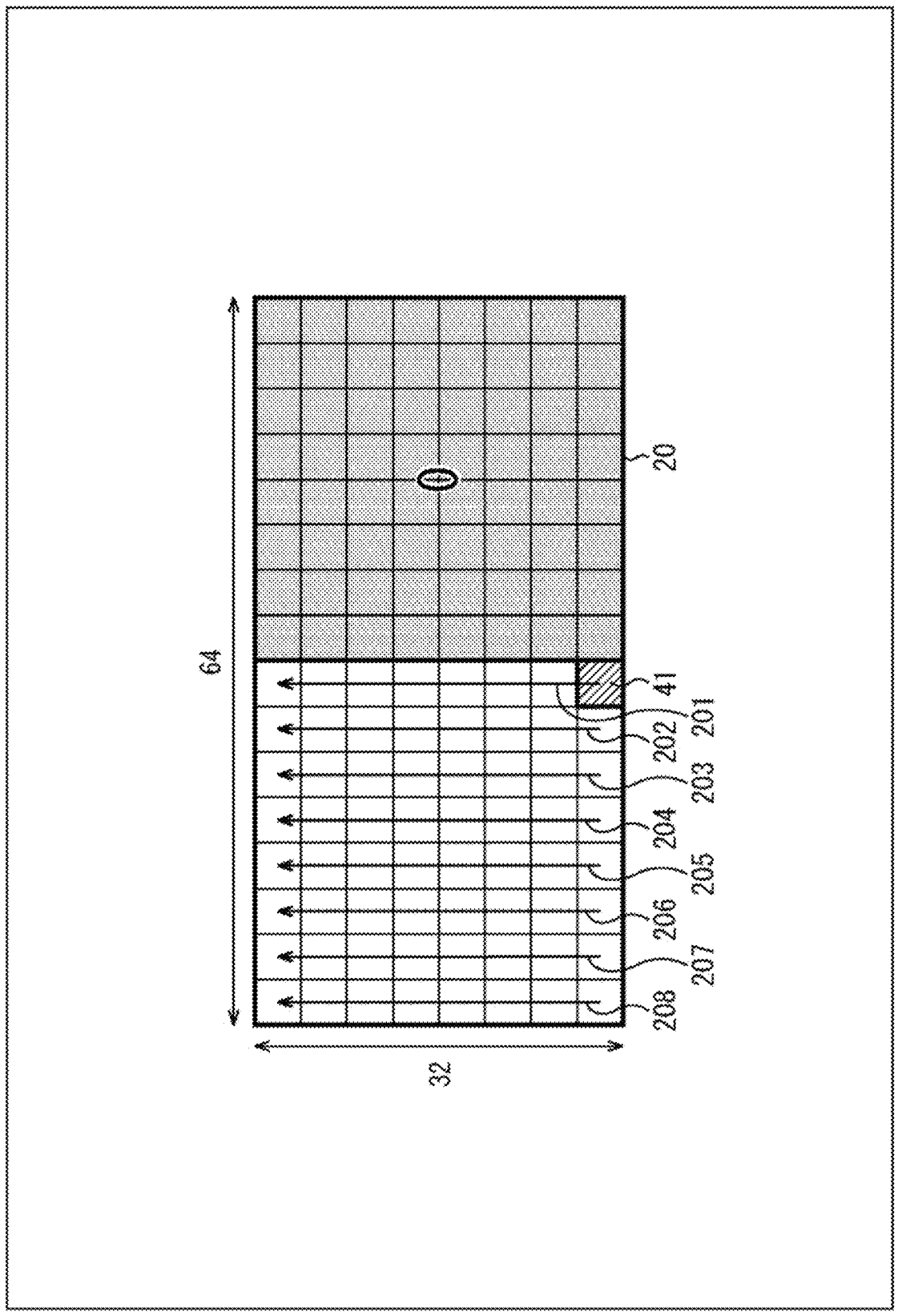
FIG. 22 is a diagram describing an example of scan order control of a valid transform coefficient region.

For example, in a case of FIG. 22, the size of the block 20 is 64×32. In addition, 32×32 on the left is a valid transform coefficient region (white part in FIG. 22), and 32×32 on the right is an invalid transform coefficient region (gray part in FIG. 22). The scan is started from the sub-block 41 at the lower right corner of the valid transform coefficient region. Further, only the sub-blocks in the valid transform coefficient region are scanned as in the case of the example in FIG. 15.

However, in the case of the example in FIG. 22, the sub-block units are scanned in the vertical direction of FIG. 22. That is, the scan is started from the sub-block 41, and the sub-blocks in the same column are scanned from the bottom to the top. The sub-blocks in each column are scanned in a similar order in the vertical direction. Further, the columns are sequentially scanned one by one from the right column. That is, the sub-blocks are scanned in order from an arrow 201 to an arrow 208.

For example, in a case where the prediction direction of the intra prediction is the horizontal direction, the values of the coefficient data tend to significantly change in the vertical direction as a result of the orthogonal transform. That is, the distribution of the values of the coefficient data tends to significantly change more (that is, the deviation of the values becomes larger) in the vertical direction than in the horizontal direction in this case. Therefore, as in the example of FIG. 22, the scan direction of the sub-block units in the encoding and the decoding can be set to the vertical direction to further utilize the size of the deviation of the values, and the encoding efficiency can be improved.

Figure 23:
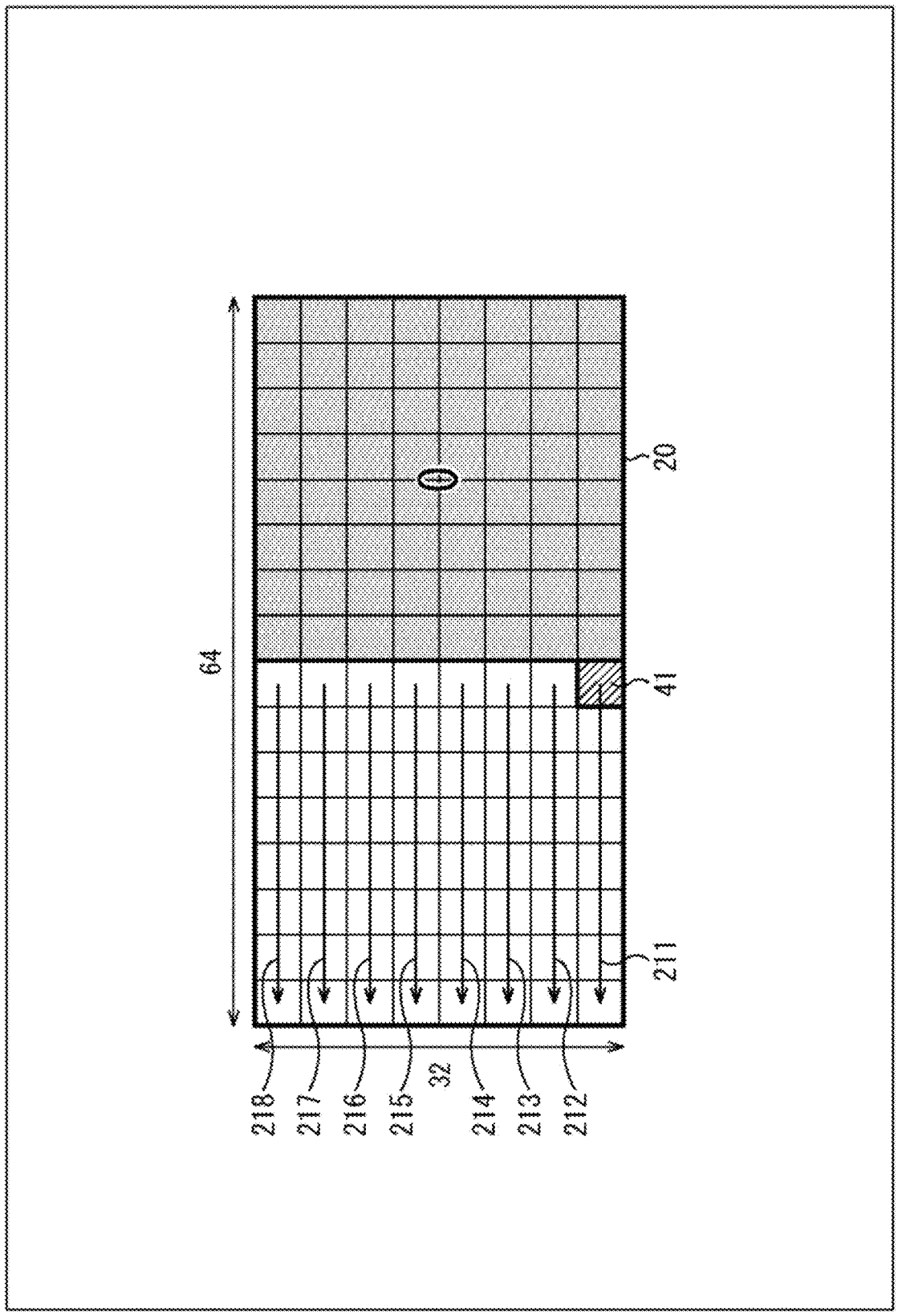
FIG. 23 is another diagram describing an example of the scan order control of the valid transform coefficient region.

In addition, for example, although the shape, the valid transform coefficient region, and the like of the block 20 in a case of FIG. 23 are similar to those in the case of the example in FIG. 22, the sub-block units are scanned in the horizontal direction in FIG. 23. That is, the scan is started from the sub-block 41, and the sub-blocks in the same row are scanned from the right to the left. The sub-blocks in each row are scanned in a similar order in the horizontal direction. Further, the rows are sequentially scanned one by one from the bottom row. That is, the sub-blocks are scanned in order from an arrow 211 to an arrow 218.

For example, in a case where the prediction direction of the intra prediction is the vertical direction, the values of the coefficient data tend to significantly change in the horizontal direction as a result of the orthogonal transform. That is, the distribution of the values of the coefficient data tends to significantly change more (that is, the deviation of the values becomes larger) in the horizontal direction than in the vertical direction in this case. Therefore, as in the example of FIG. 23, the scan direction of the sub-block units in the encoding and the decoding can be set to the horizontal direction to further utilize the size of the deviation of the values, and the encoding efficiency can be improved.

That is, the scan direction of the sub-block units in the valid transform coefficient region (for example, whether to set the scan direction to the vertical direction, the horizontal direction, or the diagonal direction) may be selected according to the prediction direction of the intra prediction. In such a way, the encoding efficiency can be improved regardless of the prediction direction of the intra prediction.

Figure 24:
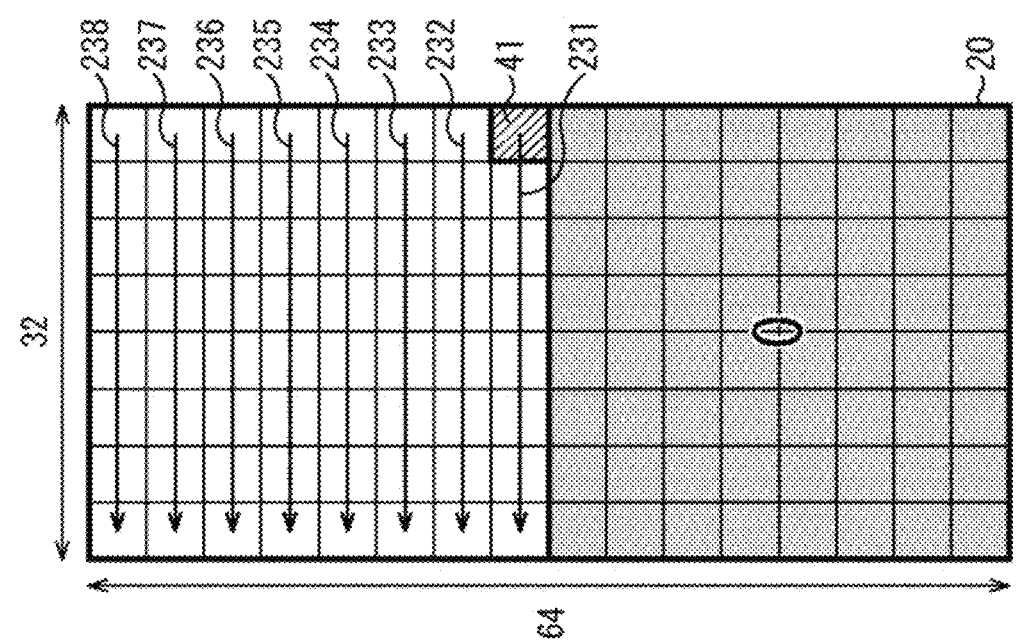
FIG. 24 is still another diagram describing an example of the scan order control of the valid transform coefficient region.

For example, the size of the block 20 is 32×64 in a case of FIG. 24. In addition, upper 32×32 is a valid transform coefficient region (white part in FIG. 24), and lower 32×32 is an invalid transform coefficient region (gray part in FIG. 24). The scan is started from the sub-block 41 at the lower right corner of the valid transform coefficient region. Further, as in the case of the example in FIG. 16, only the sub-blocks in the valid transform coefficient region are scanned.

However, in the case of the example in FIG. 24, the sub-block units are scanned in the horizontal direction of FIG. 24. That is, the scan is started from the sub-block 41, and the sub-blocks of the same row are scanned from the right to the left. The sub-blocks in each row are scanned in the horizontal direction in a similar order. Further, the rows are scanned one by one from the bottom row. That is, the sub-blocks are scanned in order from an arrow 231 to an arrow 238.

In the case where the intra prediction of the block to be processed is in the vertical direction, the scan direction of the sub-block units in the encoding and the decoding can be set to the horizontal direction in such a way to improve the encoding efficiency as in the example of FIG. 23.

Figure 25:
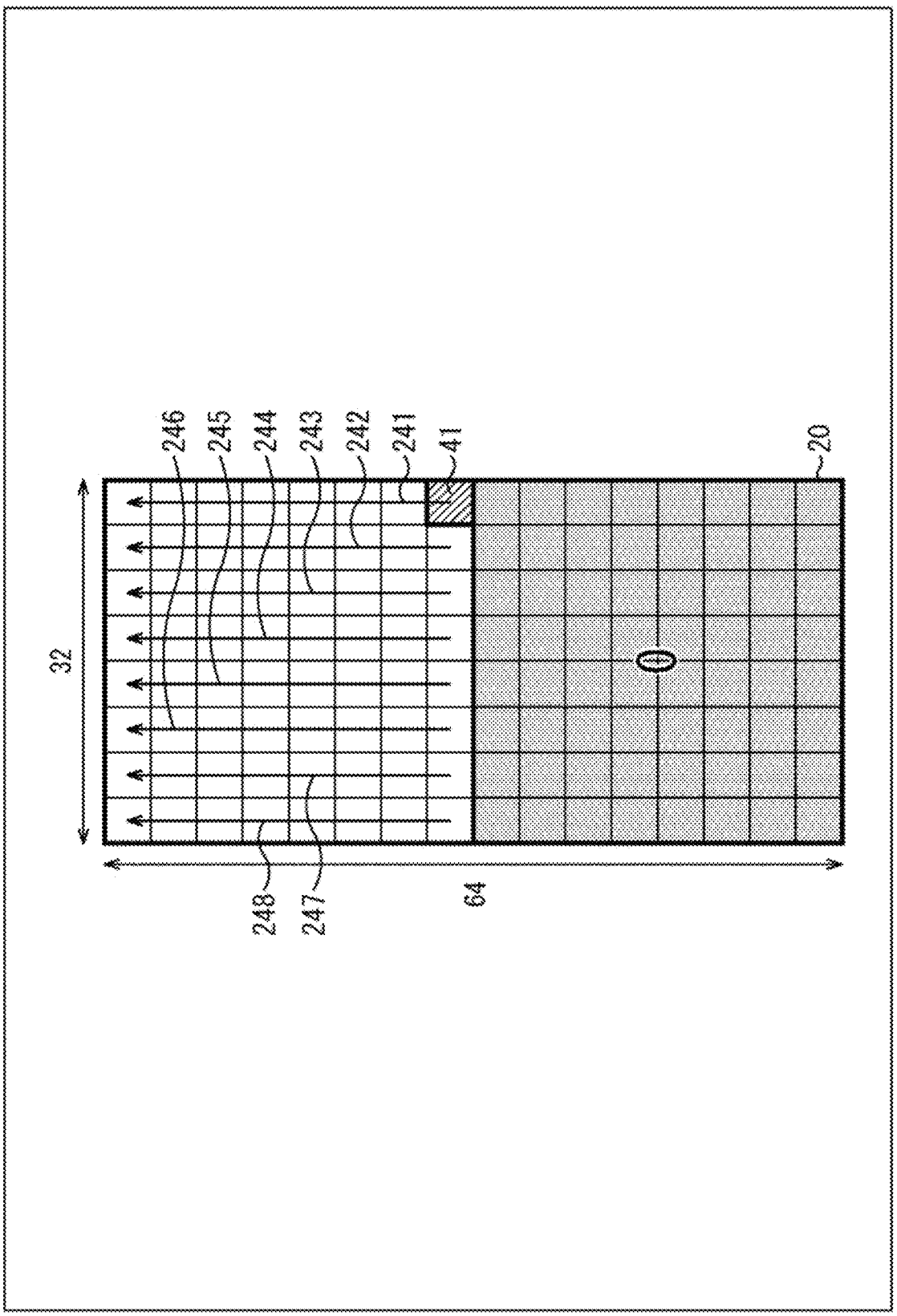
FIG. 25 is yet another diagram describing an example of the scan order control of the valid transform coefficient region.

In addition, for example, although the shape, the valid transform coefficient region, and the like of the block 20 in a case of FIG. 25 are similar to those in the case of the example in FIG. 24, the sub-block units are scanned in the vertical direction in FIG. 25. That is, the scan is started from the sub-block 41, and the sub-blocks in the same column are scanned from the bottom to the top. The sub-blocks in each column are scanned in the vertical direction in a similar order. Further, the columns are sequentially scanned one by one from the right column. That is, the sub-blocks are scanned in order from an arrow 241 to an arrow 248.

In the case where the intra prediction of the block to be processed is in the horizontal direction, the scan direction of the sub-block units in the encoding and the decoding can be set to the vertical direction in such a way to improve the encoding efficiency as in the example of FIG. 22.

Figure 26:
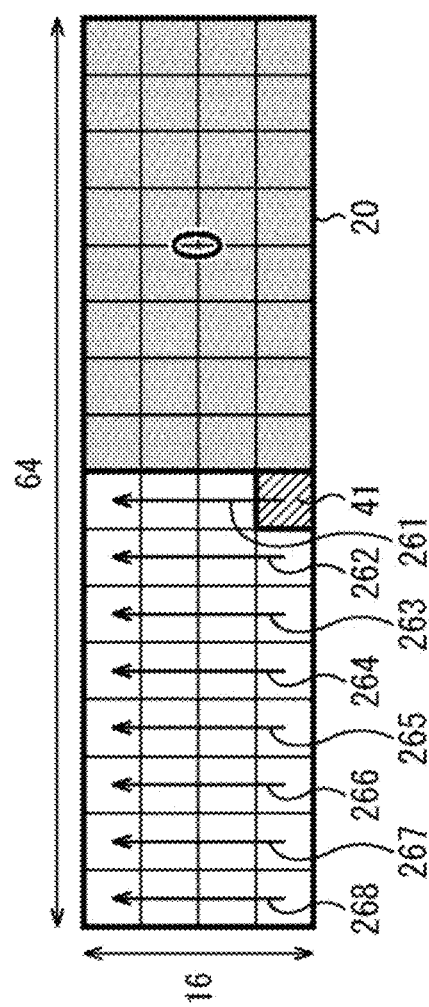
FIG. 26 is a further diagram describing an example of the scan order control of the valid transform coefficient region.

For example, the size of the block 20 is 64×16 in a case of FIG. 26. In addition, 32×16 on the left is a valid transform coefficient region (white part in FIG. 26), and 32×16 on the right is an invalid transform coefficient region (gray part in FIG. 26). The scan is started from the sub-block 41 on the lower right corner of the valid transform coefficient region. Further, only the sub-blocks in the valid transform coefficient region are scanned as in the examples described above.

In the case of the example in FIG. 26, the sub-block units are scanned in the vertical direction of FIG. 26. That is, the scan is started from the sub-block 41, and the sub-blocks in the same column are scanned from the bottom to the top. The sub-blocks in each column are scanned in the vertical direction in a similar order. Further, the columns are sequentially scanned one by one from the right column. That is, the sub-blocks are scanned in order from an arrow 261 to an arrow 268.

In the case where the intra prediction of the block to be processed is in the horizontal direction, the scan direction of the sub-block units in the encoding and the decoding can be set to the vertical direction in such a way to improve the encoding efficiency as in the example of FIG. 22.

Figure 27:
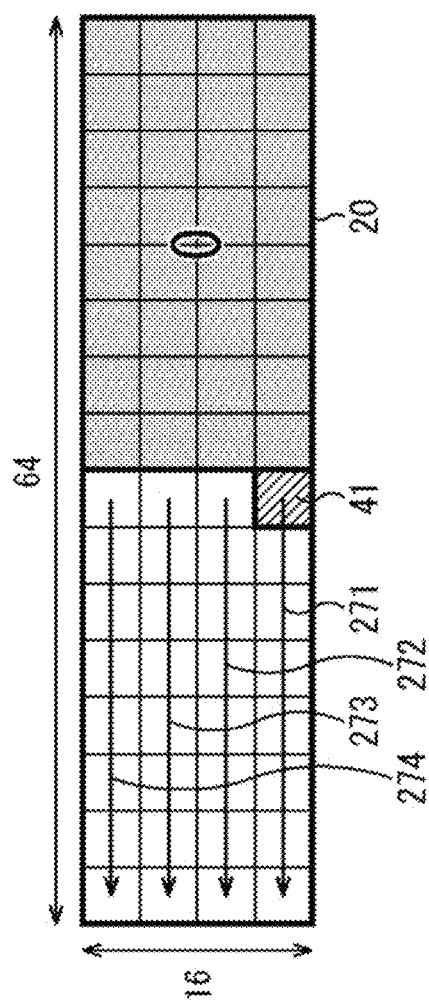
FIG. 27 is a further diagram describing an example of the scan order control of the valid transform coefficient region.

In addition, for example, although the shape, the valid transform coefficient region, and the like of the block 20 in a case of FIG. 27 are similar to those in the case of the example in FIG. 26, the sub-block units are scanned in the horizontal direction in FIG. 27. That is, the scan is started from the sub-block 41, and the sub-blocks in the same row are scanned from the right to the left. The sub-blocks in each row are scanned in the horizontal direction in a similar order. Further, the rows are sequentially scanned one by one from the bottom row. That is, the sub-blocks are scanned in order from an arrow 271 to an arrow 274.

In the case where the intra prediction of the block to be processed is the vertical direction, the scan direction of the sub-block units in the encoding and the decoding can be set to the horizontal direction in such a way to improve the encoding efficiency as in the example of FIG. 23.

Figure 28:
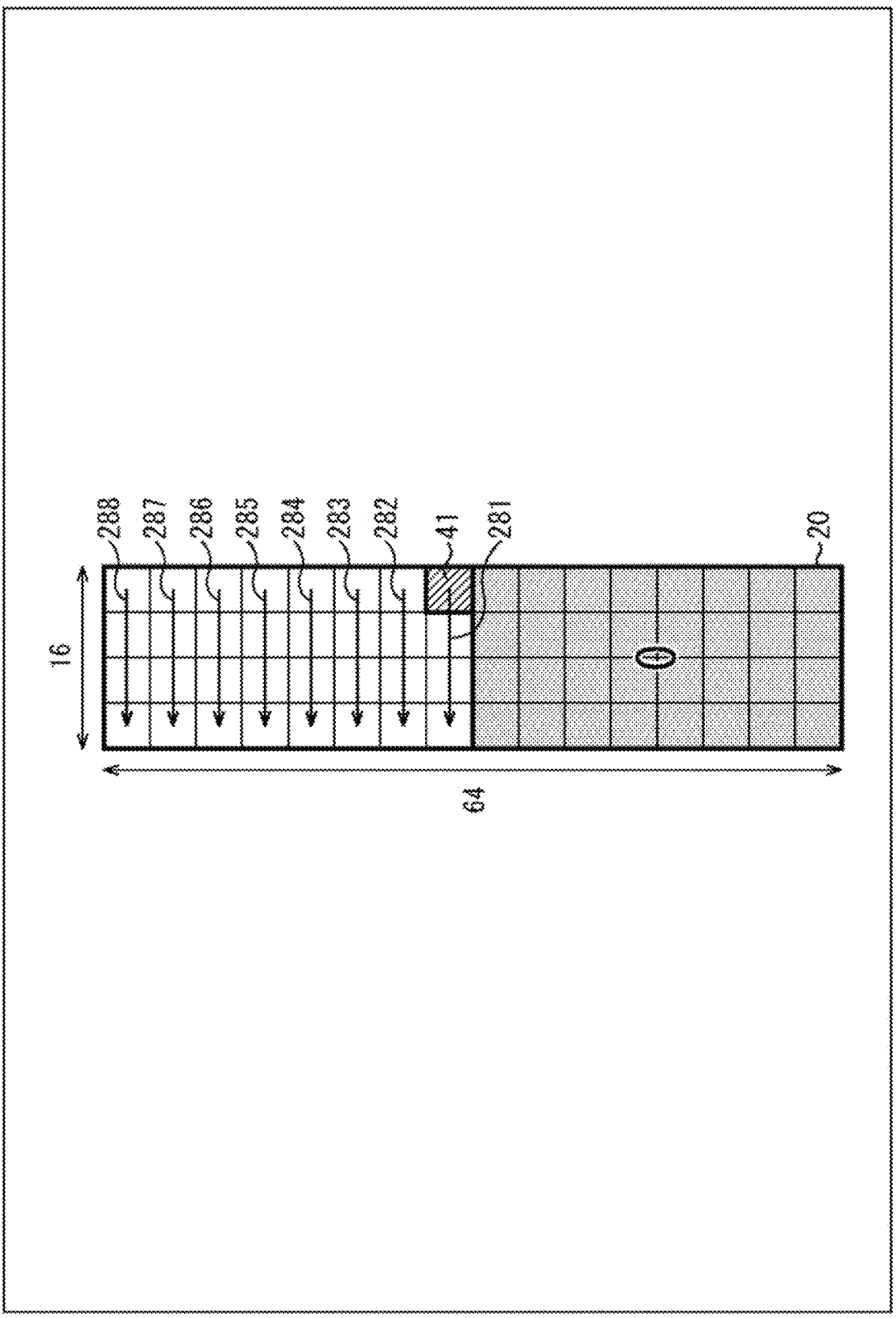
FIG. 28 is a further diagram describing an example of the scan order control of the valid transform coefficient region.

For example, the size of the block 20 is 16×64 in a case of FIG. 28. In addition, upper 16×32 is a valid transform coefficient region (white part in FIG. 28), and lower 16×32 is an invalid transform coefficient region (gray part in FIG. 28). The scan is started from the sub-block 41 at the lower right corner of the valid transform coefficient region. Further, only the sub-blocks in the valid transform coefficient region are scanned as in the examples described above.

However, in the case of the example in FIG. 28, the sub-block units are scanned in the horizontal direction of FIG. 28. That is, the scan is started from the sub-block 41, and the sub-blocks in the same row are scanned from the right to the left. The sub-blocks in each row are scanned in the horizontal direction in a similar order. Further, the rows are sequentially scanned one by one from the bottom row. That is, the sub-blocks are scanned in order from an arrow 281 to an arrow 288.

In the case where the intra prediction of the block to be processed is the vertical direction, the scan direction of the sub-block units in the encoding and the decoding can be set to the horizontal direction in such a way to improve the encoding efficiency as in the example of FIG. 24.

Figure 29:
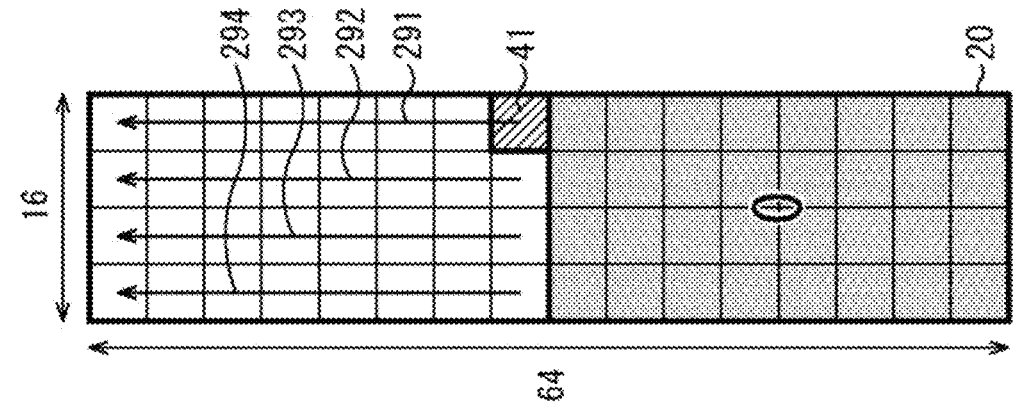
FIG. 29 is a further diagram describing an example of the scan order control of the valid transform coefficient region.

In addition, for example, although the shape, the valid transform coefficient region, and the like of the block 20 in a case of FIG. 29 are similar to those in the case in the example of FIG. 28, the sub-block units are scanned in the vertical direction in FIG. 29. That is, the scan is started from the sub-block 41, and the sub-blocks in the same column are scanned from the bottom to the top. The sub-blocks in each column are scanned in the vertical direction in a similar order. Further, the columns are sequentially scanned one by one from the right column. That is, the sub-blocks are scanned in order from an arrow 291 to an arrow 294.

In the case where the intra prediction of the block to be processed is the horizontal direction, the scan direction of the sub-block units in the encoding and the decoding can be set to the vertical direction in such a way to improve the encoding efficiency as in the example of FIG. 25.

As described above, the shape and the size of the block and the valid transform coefficient region are optional. Obviously, the shape and the size of the block and the valid transform coefficient region may be other than the shapes and the sizes in the examples described above.

<5-1-2: Method 1-1-2>

For example, in the encoding and the decoding, the scan direction of the sub-block units in the valid transform coefficient region may be a direction corresponding to the block shape (method 1-1-2).

The values of the coefficient data generally tend to gather in lower frequency components as a result of the orthogonal transform. That is, the value of the coefficient data increases toward the upper left corner and decreases toward the lower right corner. Therefore, when the scan is started from high-frequency components and the high-frequency components are preferentially scanned as much as possible, the coefficients in the same level are scanned in a growth ring shape.

However, the orthogonal transform is performed according to the shape of the transform block, and the low-frequency components of the transform coefficients also tend to be distributed according to the shape of the block. For example, in a case where the block shape is a square, the low-frequency components in the same level are concentrically distributed around the upper left. Further, in a case where the block shape is a rectangle, the low-frequency components in the same level are elliptically distributed around the upper left.

Therefore, in a case where the scan direction of the sub-block units in the encoding and the decoding is simply set to the diagonal direction regardless of the block shape, the scan direction matches the tendency of the distribution of the values of the coefficient data in a square block. However, the scan direction does not match the tendency of the distribution of the values of the coefficient data in a block with another shape, such as, for example, a rectangle, and the encoding efficiency may be reduced.

Therefore, the scan direction of the sub-block units in the valid transform coefficient region can be set to a direction corresponding to the block shape as described above. As a result, the scan can be performed in a direction more suitable for the tendency of the distribution of the values of the coefficient data, and the reduction in the encoding efficiency can be suppressed.

Scan Example 1

For example, in a case where the shape of the valid transform coefficient region is a vertically long rectangle, the high-frequency region is scanned with a slope of "−1," and in a case where the scan reaches the left edge or the upper edge of the valid transform coefficient region, the scan is performed with a slope at a ratio of "−height/width (−height of valid transform coefficient region/width of valid transform coefficient region)." In a case where it is difficult in practice to accurately perform the scan with a slope of "height/width," the scan in the vertical direction and the scan with a slope of −1 may be combined to realize the scan.

Figure 30:
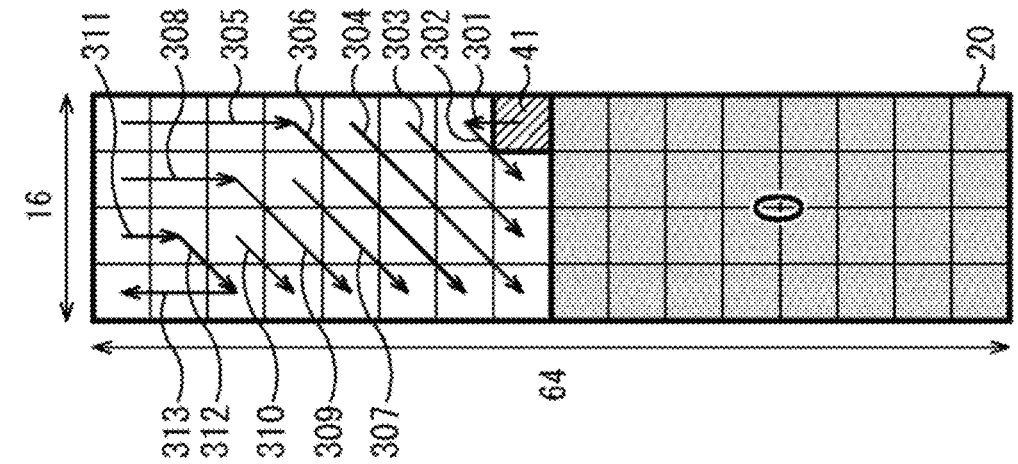
FIG. 30 is a further diagram describing an example of the scan order control of the valid transform coefficient region.

For example, in a case of FIG. 30, the size of the block 20 is 16×64. In addition, upper 16×32 is a valid transform coefficient region (white part in FIG. 30), and lower 16×32 is an invalid transform coefficient region (gray part in FIG. 30). The scan is started from the sub-block 41 at the lower right corner of the valid transform coefficient region. Further, only the sub-blocks in the valid transform coefficient region are scanned.

In the case of the example in FIG. 30, the scan is started from the sub-block 41, and the sub-blocks are scanned in order from an arrow 301 to an arrow 313. That is, plural scan directions (for example, three or more directions) are combined to perform the scan in this case (the scan direction is curved).

More specifically, the ratio of the width (blkWidth) and the height (blkHeight) of the valid transform coefficient region is 1 to 2 in the case of FIG. 30. The horizontal direction of the valid transform coefficient region in FIG. 30 will be defined as an x direction, the vertical direction in FIG. 30 will be defined as a y direction, and the upper left edge of the valid transform coefficient region will be defined as an origin (x=0, y=0). In this case, the scan is first performed with a slope of y=−x (arrow 301 to arrow 304). Once the scan reaches x=0, the scan is performed in the y direction (arrow 305) after moving to the position of (height/2, 0). Further, once the scan reaches the position of (height/2, height−width), the scan is performed with a slope of "−1." Note that, in a case where y is not a multiple of 4 when x=0, the scan moves to the unscanned maximum x with a slope of y=−x.

In such a way, the scan can be performed in a direction more suitable for the tendency of the distribution of the values of the coefficient data in the valid transform coefficient region in which the ratio of the width (blkWidth) and the height (blkHeight) of the valid transform coefficient region is 1 to 2, and the reduction in the encoding efficiency can be suppressed.

Figure 31:
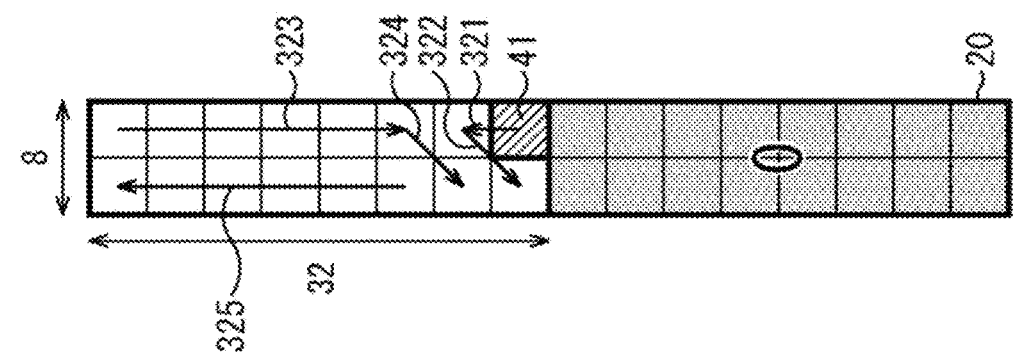
FIG. 31 is a further diagram describing an example of the scan order control of the valid transform coefficient region.

In addition, for example, the size of the block 20 is 8×64 in a case of FIG. 31. In addition, upper 8×32 is a valid transform coefficient region (white part in FIG. 31), and lower 8×32 is an invalid transform coefficient region (gray part in FIG. 31). The scan is started from the sub-block 41 at the lower right corner of the valid transform coefficient region. Further, only the sub-blocks in the valid transform coefficient region are scanned.

In the case of the example in FIG. 31, the scan is started from the sub-block 41, and the sub-blocks are scanned in order from an arrow 321 to an arrow 325. That is, plural scan directions (for example, three or more directions) are combined to perform the scan in this case (scan direction is curved).

More specifically, the ratio of the width (blkWidth) and the height (blkHeight) of the valid transform coefficient region is 1 to 4 in the case of FIG. 31. The horizontal direction of the valid transform coefficient region in FIG. 31 will be defined as an x direction, the vertical direction in FIG. 31 will be defined as a y direction, and the upper left edge of the valid transform coefficient region will be defined as an origin (x=0, y=0). In this case, the scan is first performed with a slope of y=−x (arrow 321 and arrow 322). Once the scan reaches x=0, the scan is performed in the y direction (arrow 323) after moving to the position of (height/4, 0). Further, once the scan reaches the position of (height/4, height-width), the scan is performed with a slope of "−1."

In such a way, the scan can be performed in a direction more suitable for the tendency of the distribution of the values of the coefficient data in the valid transform coefficient region in which the ratio of the width (blkWidth) and the height (blkHeight) of the valid transform coefficient region is 1 to 4, and the reduction in the encoding efficiency can be suppressed.

Figure 32:
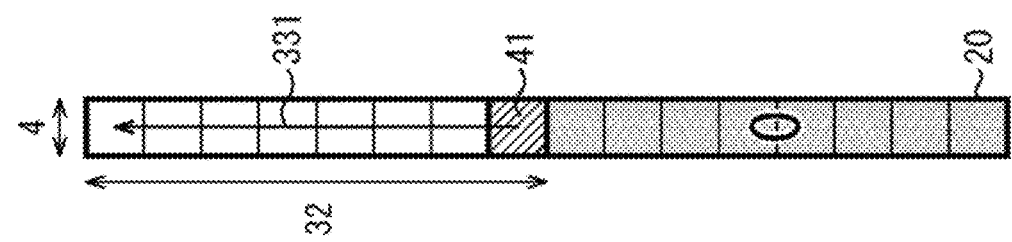
FIG. 32 is a further diagram describing an example of the scan order control of the valid transform coefficient region.

In addition, for example, the size of the block 20 is 4×64 in a case of FIG. 32. In addition, upper 4×32 is a valid transform coefficient region (white part in FIG. 32), and lower 4×32 is an invalid transform coefficient region (gray part in FIG. 32). The scan is started from the sub-block 41 at the lower (lower right) corner of the valid transform coefficient region. Further, only the sub-blocks in the valid transform coefficient region are scanned.

In the case of the example in FIG. 32, there is one column of sub-blocks in the valid transform coefficient region. Therefore, the scan is started from the sub-block 41, and the sub-blocks are scanned from the bottom to the top as indicated by an arrow 331.

In such a way, the scan can be performed in a direction more suitable for the tendency of the distribution of the values of the coefficient data in the valid transform coefficient region including one column of sub-blocks, and the reduction in the encoding efficiency can be suppressed.

Although the shape of the valid transform coefficient region is a rectangle with the longitudinal direction in the vertical direction (that is, vertically long rectangle) in the case described above, the description similarly applies to a case where the shape of the valid transform coefficient region is a rectangle with the longitudinal direction in the horizontal direction (that is, horizontally long rectangle).

That is, in the case where, for example, the shape of the valid transform coefficient region is a horizontally long rectangle, the high-frequency region is scanned with a slope of "−1," and in the case where the scan reaches the left edge or the upper edge of the valid transform coefficient region, the scan is performed with a slope at a ratio of "−height/width (−height of valid transform coefficient region/width of valid transform coefficient region)." In a case where it is difficult in practice to accurately perform the scan with a slope of "height/width," the scan in the vertical direction and the scan with a slope of −1 may be combined to realize the scan.

For example, in a case where the ratio of the width (blkWidth) and the height (blkHeight) of the valid transform coefficient region is 2 to 1, the scan is first performed with a slope of y=−x. Once the scan reaches y=0, the scan is performed in the x direction after moving to the position of (0, width/2). Further, once the scan reaches the position of (width−height, width/2), the scan is performed with a slope of "−1." Note that, in a case where x is not a multiple of 4 when y=0, the scan moves to the unscanned maximum y with a slope of y=−x.

In such a way, the scan can be performed in a direction more suitable for the tendency of the distribution of the values of the coefficient data in the valid transform coefficient region in which the ratio of the width (blkWidth) and the height (blkHeight) of the valid transform coefficient region is 2 to 1, and the reduction in the encoding efficiency can be suppressed.

Further, in a case where, for example, the ratio of the width (blkWidth) and the height (blkHeight) of the valid transform coefficient region is 4 to 1, the scan is first performed with a slope of y=−x. Once the scan reaches y=0, the scan is performed in the x direction after moving to the position of (0, width/4). Further, once the scan reaches the position of (width−height, width/4), the scan is performed with a slope of "−1."

In such a way, the scan can be performed in a direction more suitable for the tendency of the distribution of the values of the coefficient data in the valid transform coefficient region in which the ratio of the width (blkWidth) and the height (blkHeight) of the valid transform coefficient region is 4 to 1, and the reduction in the encoding efficiency can be suppressed.

Further, in a case where, for example, there is one row of sub-blocks in the valid transform coefficient region, the scan is started from the sub-block 41, and the sub-blocks are scanned from the right to the left.

In such a way, the scan can be performed in a direction more suitable for the tendency of the distribution of the values of the coefficient data in the valid transform coefficient region including one row of sub-blocks, and the reduction in the encoding efficiency can be suppressed.

Scan Example 2

Obviously, the setting method of the scan direction corresponding to the block shape is optional, and the setting method is not limited to the example described above. For example, in a case of a valid transform coefficient region of width 16×height 32, a method as illustrated in A of FIG. 33 may be used to derive the order of scan.

That is, the height (blkheight) of the valid transform coefficient region is represented by 2n where n is the width (blkwidth) of the valid transform coefficient region. In this case, the ellipse can be expressed as in the following Equation (1).

[Math. 1]

$$\frac{x^2}{n^2} + \frac{y^2}{4n^2} = 1 \qquad (1)$$

Here, n when the ellipse passes through the vertex on the upper left is obtained for each sub-block. Here, n is derived as in the following Equation (2).

[Math. 2]

$$n = \sqrt{x^2 + \frac{y^2}{4}} \qquad (2)$$

Figure 33:
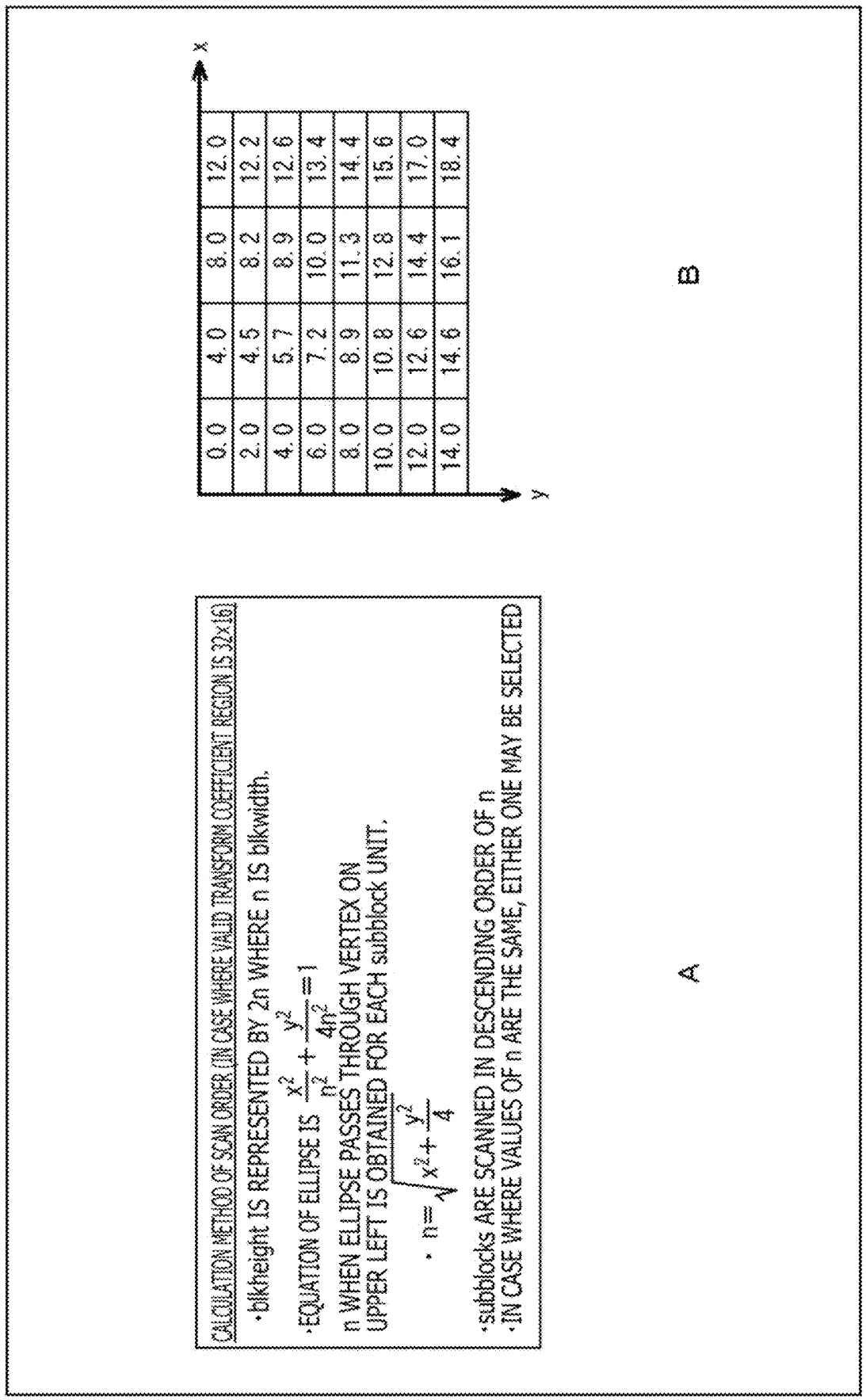
FIG. 33 illustrates diagrams describing an example of a scan order calculation method.
Figure 34:
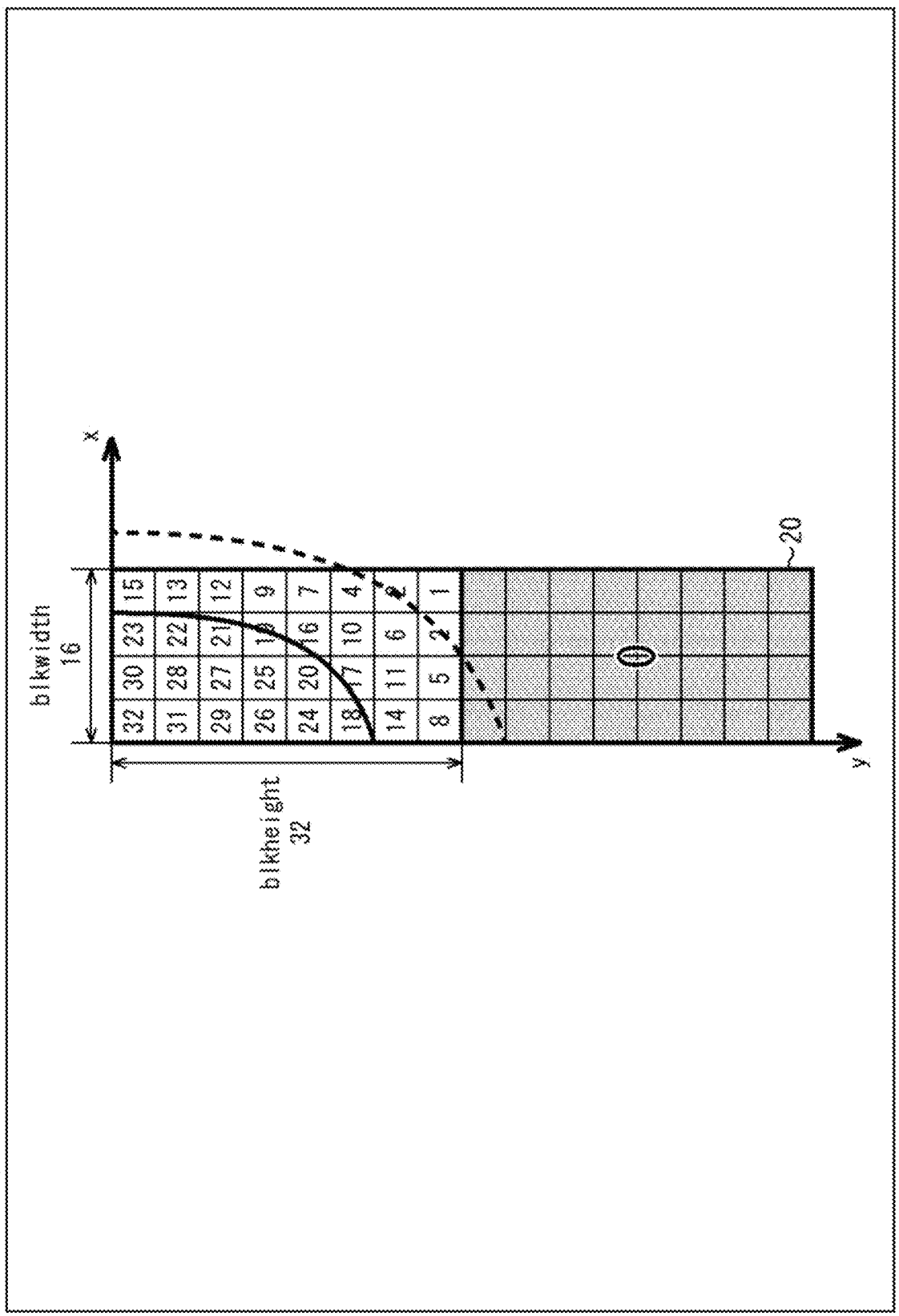
FIG. 34 is another diagram describing an example of the scan order calculation method.

In the block 20 as illustrated in FIG. 34, n of each sub-block is as in B of FIG. 33. For example, n=12 is elliptic as depicted by a solid curve in FIG. 34, and n=18.4 is elliptic as depicted by a dotted curve in FIG. 34. Therefore, the sub-blocks are scanned in descending order of n. Here, in a case where the values of n are the same, either one can be selected.

Figure 35:
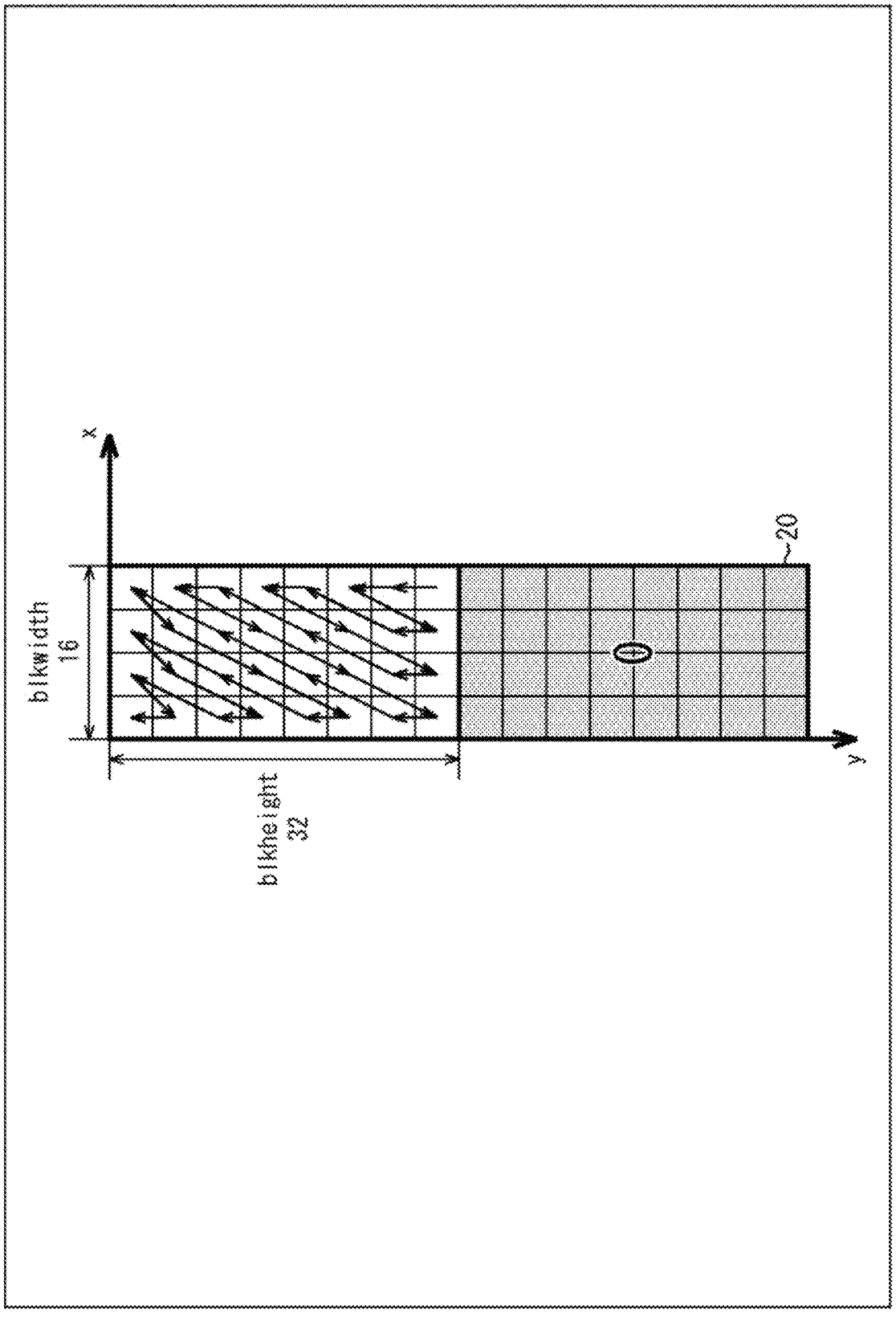
FIG. 35 is a further diagram describing an example of the scan order control of the valid transform coefficient region.

In this case, when, for example, the ellipse passing through the position (16, 0) and the position (0, 32) is approximated as a straight line, y=−2x+32 is obtained. Therefore, the scan is basically carried out with a slope of −2. For example, the scan may be carried out as indicated by arrows illustrated in FIG. 35. In such a way, the scan can be performed in a direction more suitable for the tendency of the distribution of the values of the coefficient data in the block in which the ratio of the width and the height of the valid transform coefficient region is 1 to 2, and the reduction in the encoding efficiency can be suppressed.

Figure 36:
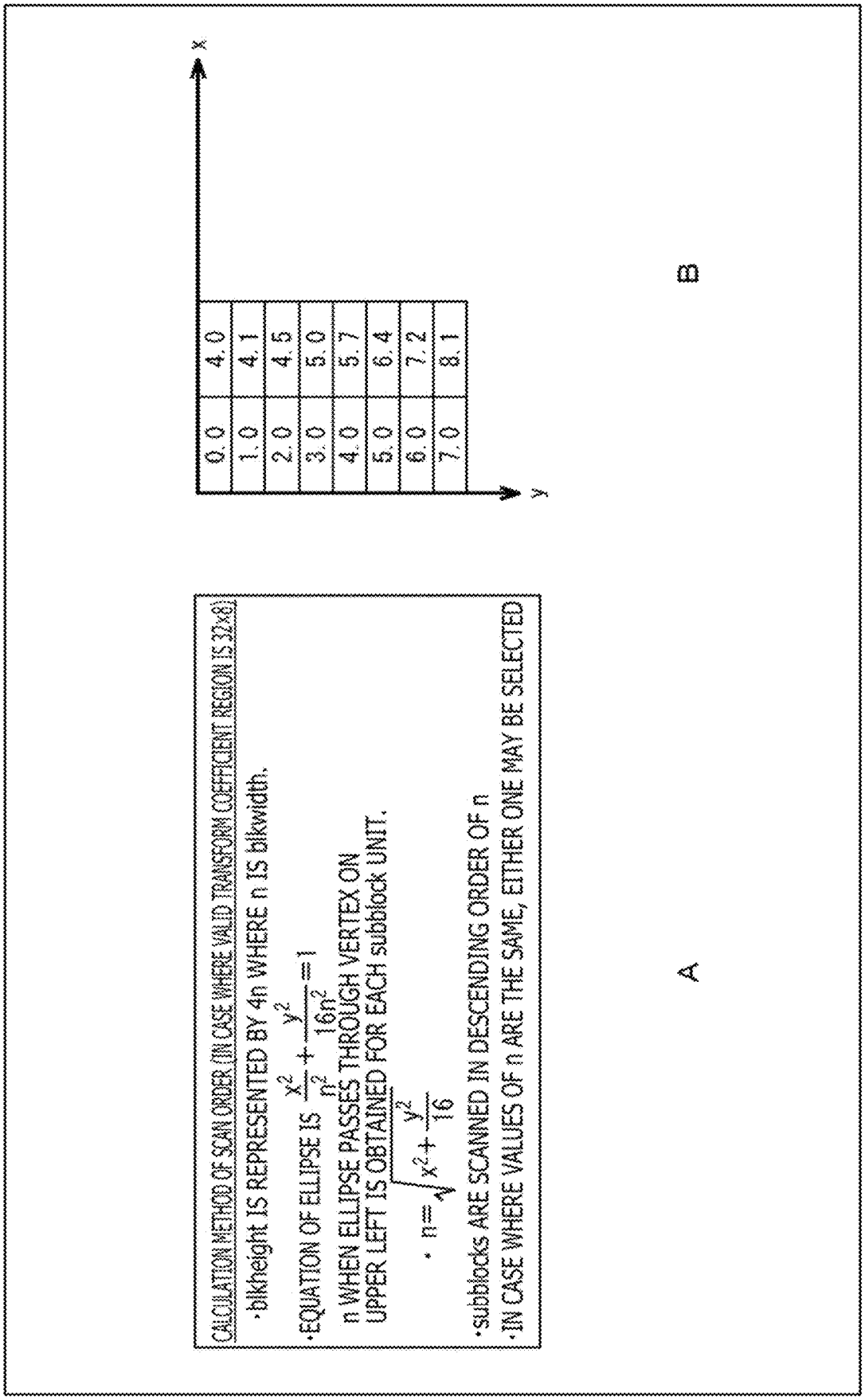
FIG. 36 illustrates other diagrams describing an example of the scan order calculation method.

Further, in a case of, for example, a valid transform coefficient region of width 8×height 32, a method as illustrated in A of FIG. 36 may be used to derive the order of scan. In this case, the height (blkheight) of the valid transform coefficient region is represented by 4n where n is the width (blkwidth) of the valid transform coefficient region. In this case, the ellipse can be expressed as in the following Equation (3).

[Math. 3]

$$\frac{x^2}{n^2} + \frac{y^2}{16n^2} = 1 \quad (3)$$

Here, n when the ellipse passes through the vertex on the upper left is obtained for each sub-block. Here, n is derived as in the following Equation (4).

[Math. 4]

$$n = \sqrt{x^2 + \frac{y^2}{16}} \quad (4)$$

Figure 37:
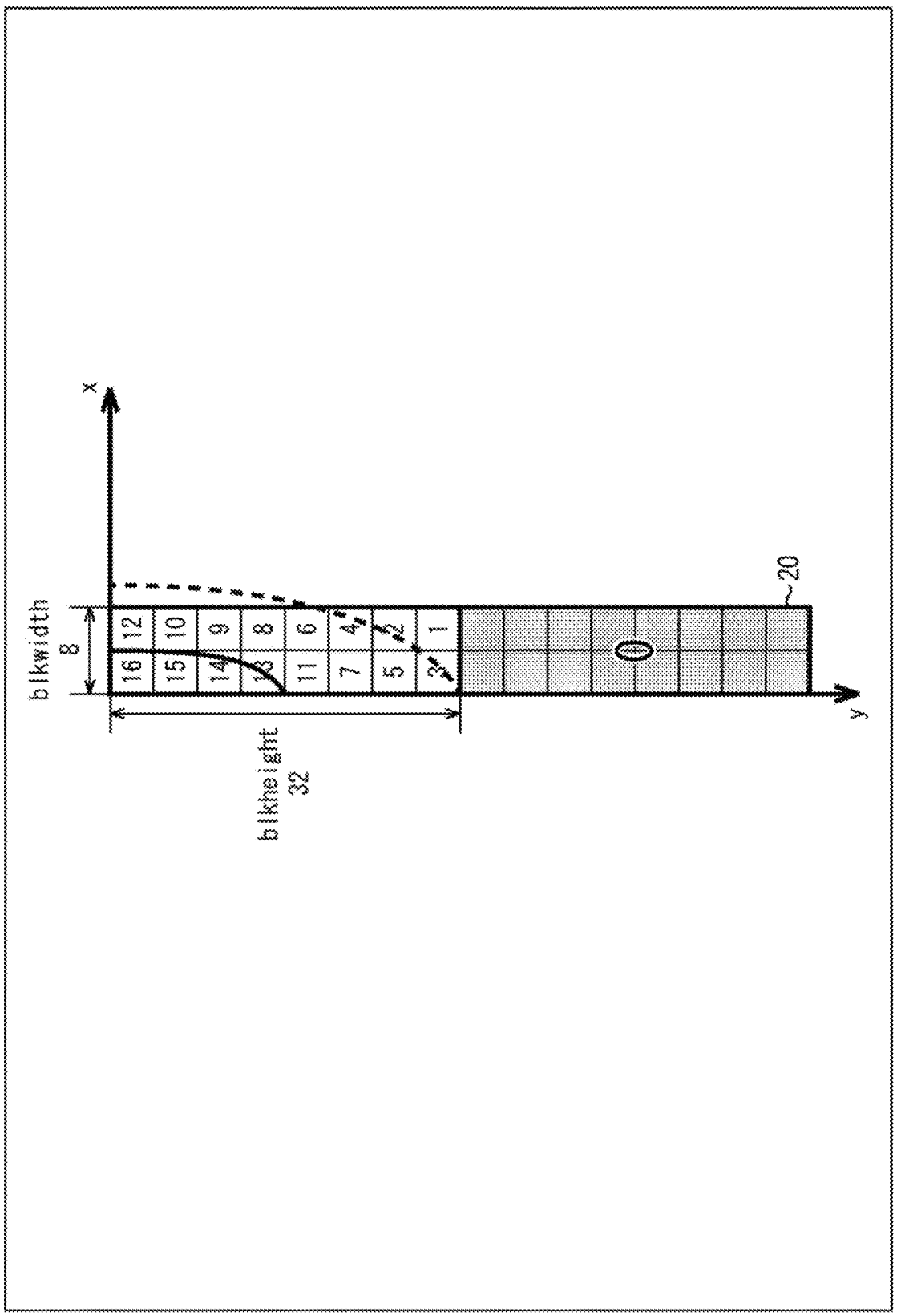
FIG. 37 is still another diagram describing an example of the scan order calculation method.

In the block 20 as illustrated in FIG. 37, n of each sub-block is as in B of FIG. 36. For example, n=4 is elliptic as depicted by a solid curve in FIG. 37, and n=8.1 is elliptic as depicted by a dotted curve in FIG. 37. Therefore, the sub-blocks are scanned in descending order of n. Here, in a case where the values of n are the same, either one can be selected.

Figure 38:
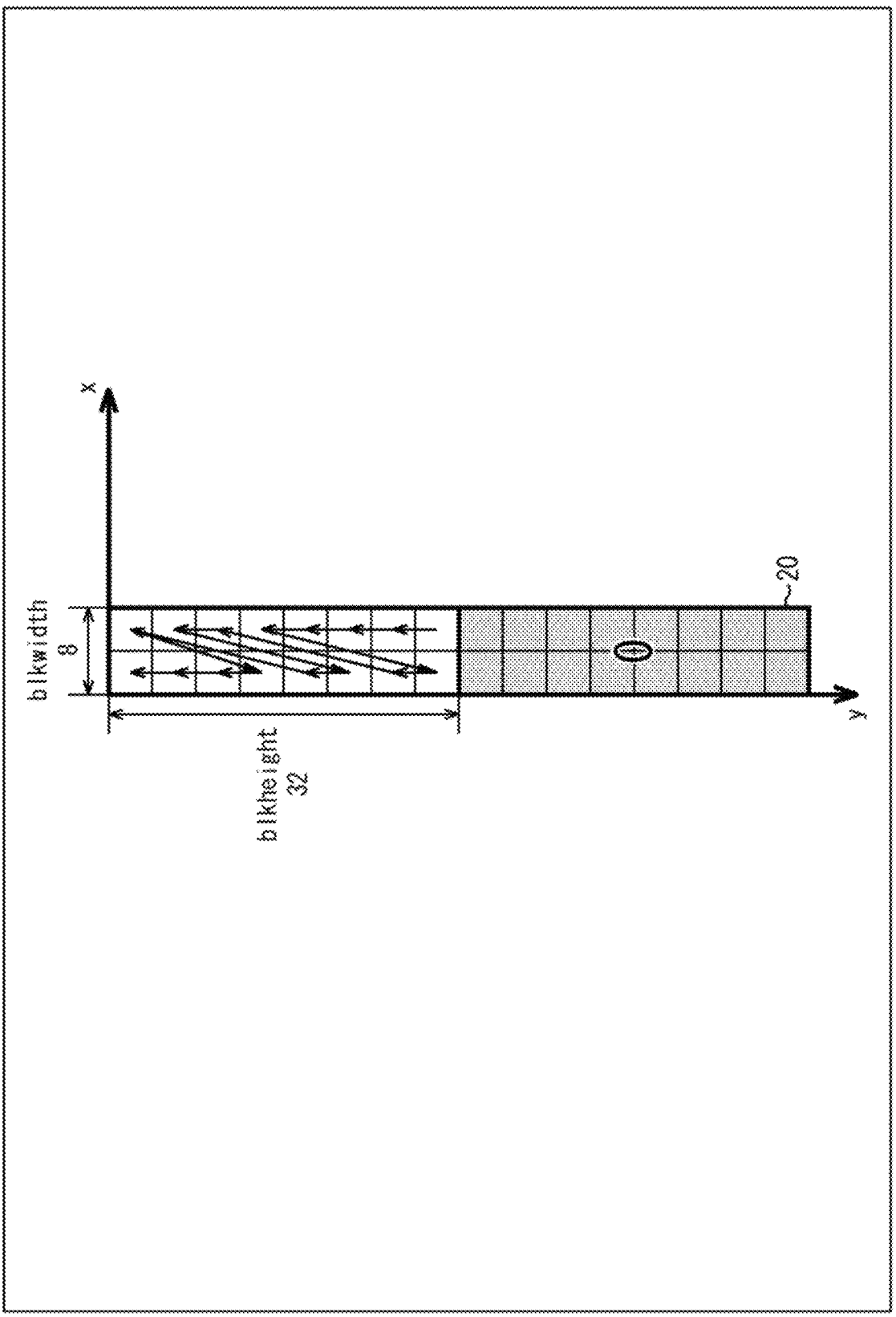
FIG. 38 is a further diagram describing an example of the scan order control of the valid transform coefficient region.

In this case, when, for example, the ellipse passing through the position (8, 0) and the position (0, 32) is approximated as a straight line, y=−4x+32 is obtained. Therefore, the scan is basically carried out with a slope of −4. For example, the scan may be carried out as indicated by arrows illustrated in FIG. 38. In such a way, the scan can be performed in a direction more suitable for the tendency of the distribution of the values of the coefficient data in the block in which the ratio of the width and the height of the valid transform coefficient region is 1 to 4, and the reduction in the encoding efficiency can be suppressed.

Note that it is sufficient if, in a case where the width of the valid transform coefficient region is equivalent to one sub-block, that is, in a case where the valid transform coefficient region includes one column of sub-blocks, the scan is performed in an order similar to the example in FIG. 32.

Further, it is sufficient if, in a case where the valid transform coefficient region is a horizontally long rectangle, the scan is basically similar to that in the example described above.

<5-1-3: Method 1-1-3>

For example, the sub-blocks in the valid transform coefficient region may be grouped to control the scan in the encoding and the decoding (method 1-1-3).

Figure 39:
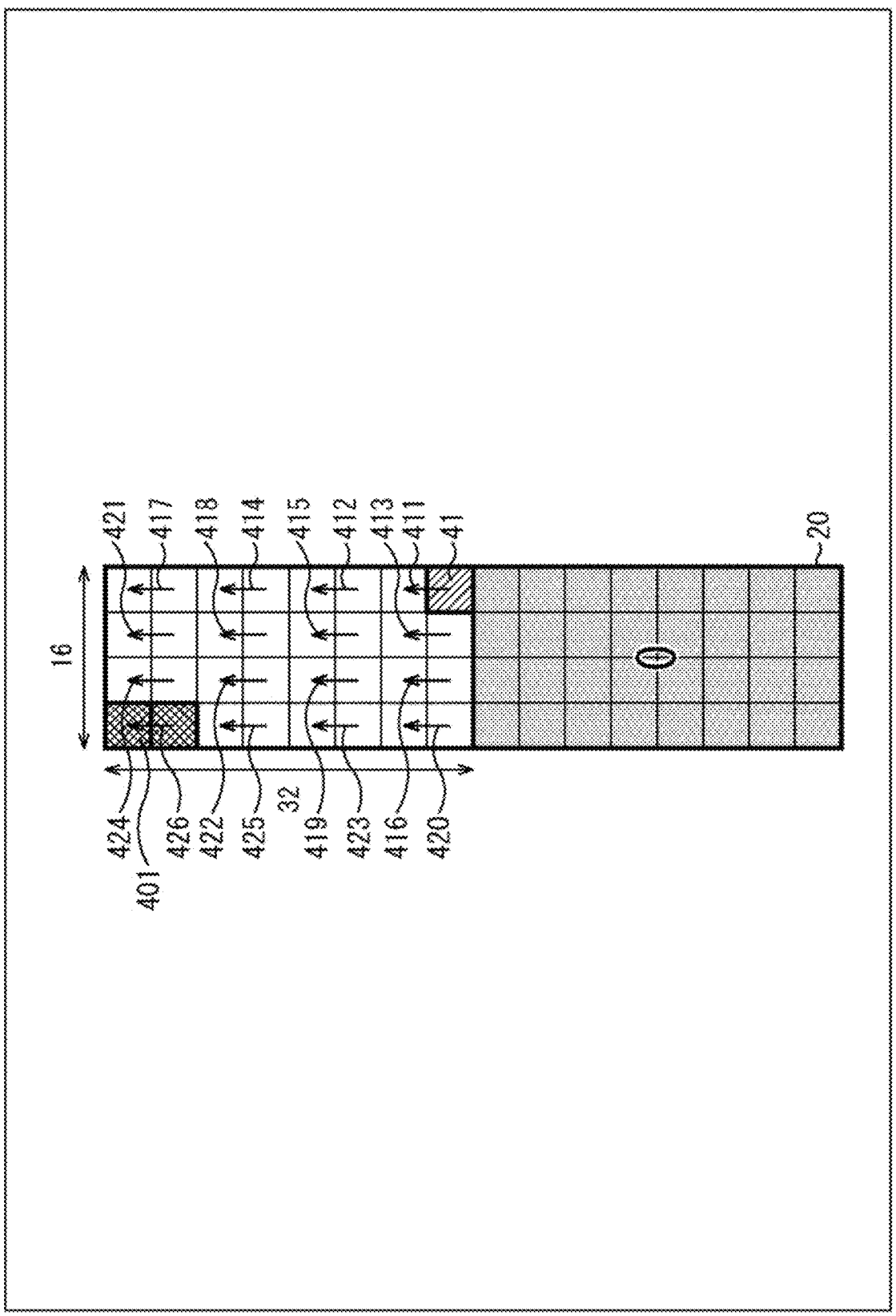
FIG. 39 is a further diagram describing an example of the scan order control of the valid transform coefficient region.

For example, as illustrated in FIG. 39, the sub-blocks in the valid transform region are put into 1×2 groups in the block 20 including a valid transform coefficient region of 16×32. A sub-block group 401 indicated by a mesh pattern is a region with an aspect ratio of 1 to 2 including one sub-block horizontally and two sub-blocks vertically. Although only the upper left edge is illustrated in FIG. 39, all of the sub-blocks in the valid transform coefficient region are actually grouped. That is, the sub-block groups are formed in the entire valid transform coefficient region. In each sub-block group, the sub-block unit is scanned in the direction from the bottom to the top. In addition, the sub-block group units are scanned in the direction from the high-frequency component side to the low-frequency component side. That is, the sub-blocks in the valid transform coefficient region are scanned in order from an arrow 411 to an arrow 426.

Figure 40:
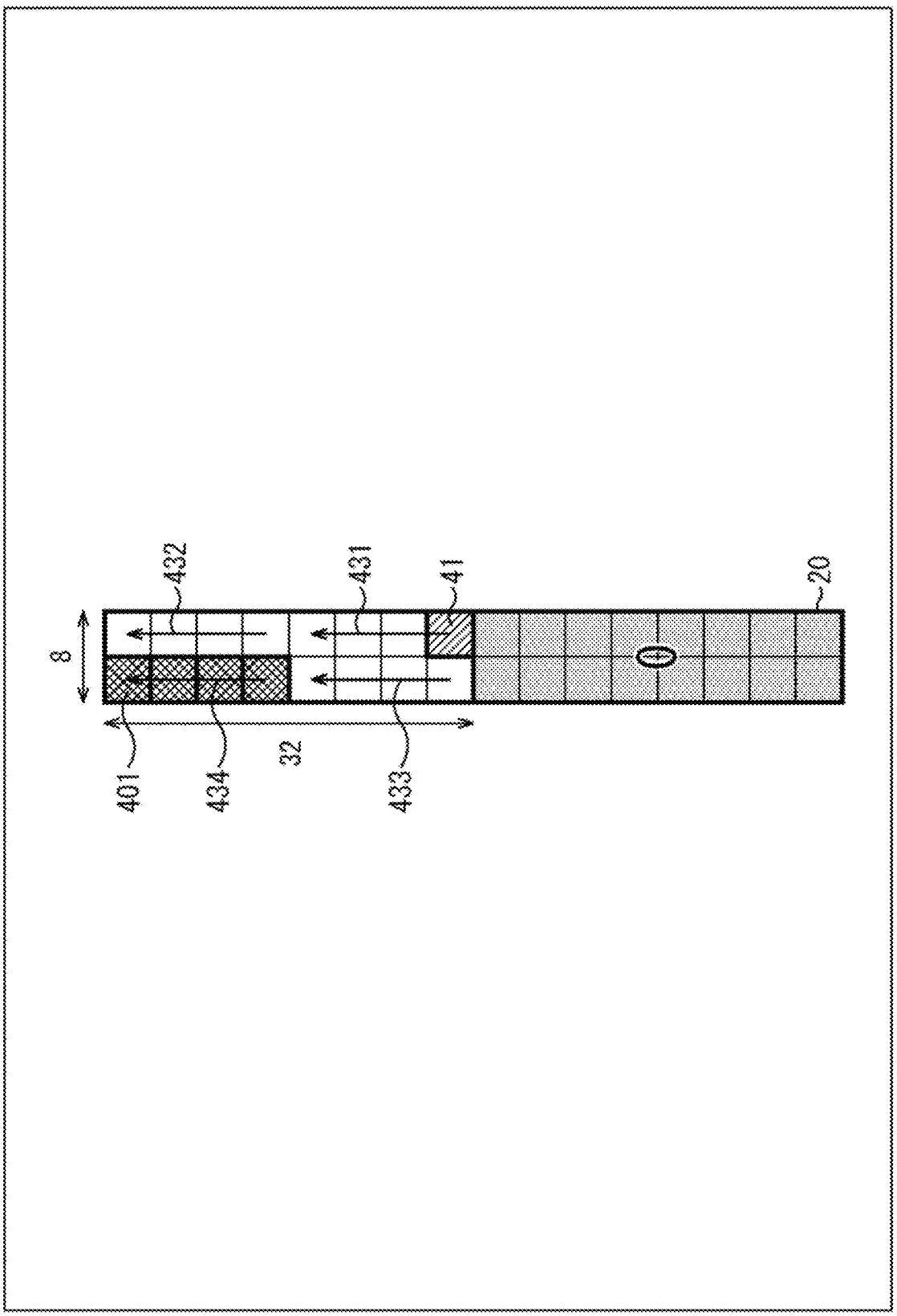
FIG. 40 is a further diagram describing an example of the scan order control of the valid transform coefficient region.

In addition, for example, the sub-blocks in the valid transform region are put into 1×4 groups in the block 20 including a valid transform coefficient region of 8×32 as illustrated in FIG. 40. The sub-block group 401 indicated by a mesh pattern is a region with an aspect ratio of 1 to 4 including one sub-block horizontally and four sub-blocks vertically. Although only the upper left edge is illustrated in FIG. 40, all of the sub-blocks in the valid transform coefficient region are actually grouped. That is, the sub-block groups are formed in the entire valid transform coefficient region. In each sub-block group, the sub-block unit is scanned in the direction from the bottom to the top. In addition, the sub-block group units are scanned in the direction from the high-frequency component side to the low-frequency component side. That is, the sub-blocks in the valid transform coefficient region are scanned in order from an arrow 431 to an arrow 434.

As described above, the sub-blocks in the valid transform coefficient region may be grouped to control the scan. Further, in that case, the groups of the sub-blocks may be formed to provide the same aspect ratio as the aspect ratio of the valid transform coefficient region.

In such a way, the scan can be performed in a direction more suitable for the tendency of the distribution of the values of the coefficient data, and the reduction in the encoding efficiency can be suppressed.

Figure 41:
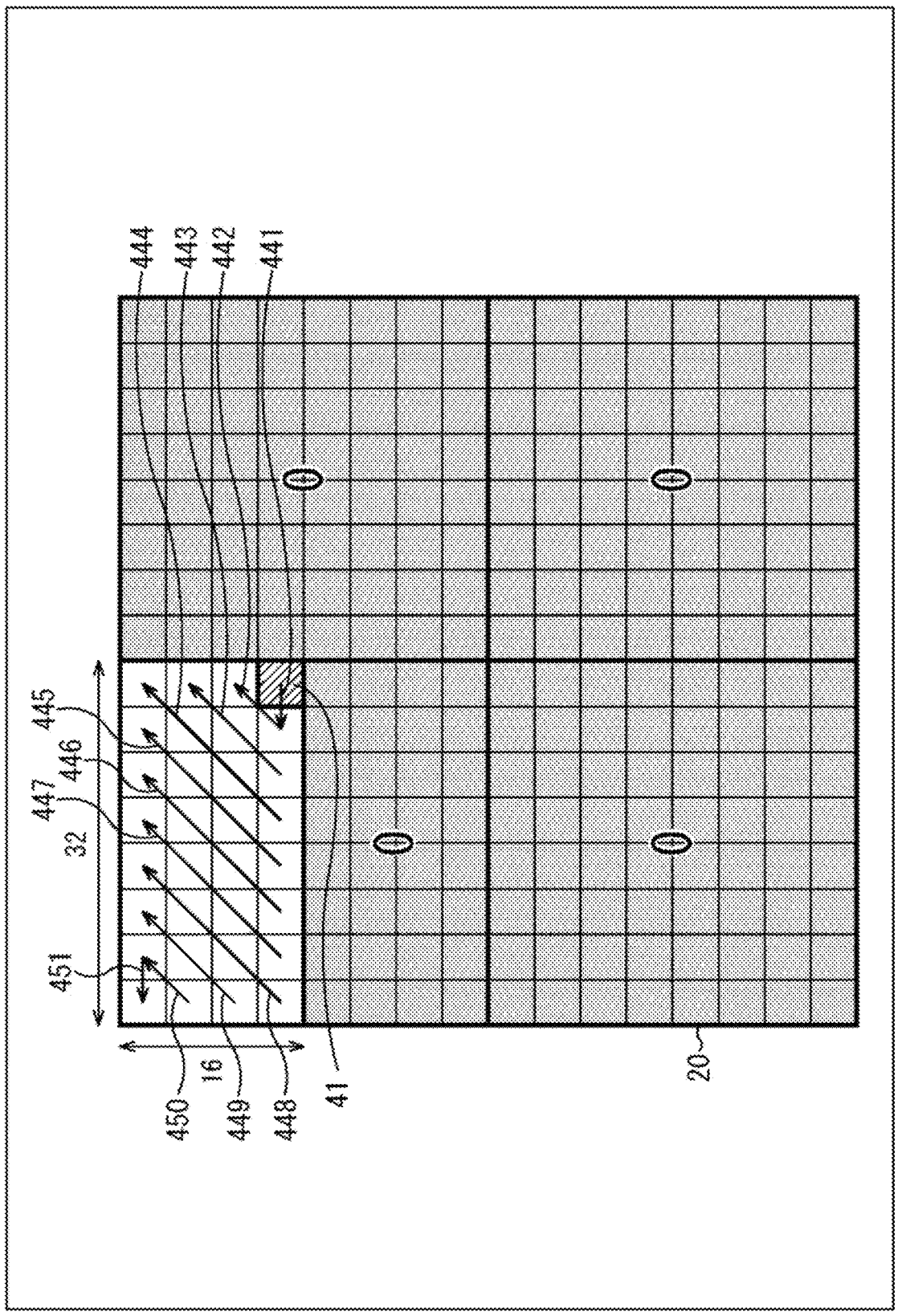
FIG. 41 is a further diagram describing an example of the scan order control of the valid transform coefficient region.

Note that, although the valid transform coefficient regions in various shapes are described in the first embodiment and the second embodiment, the shapes of the valid transform coefficient region are not limited to the examples, and the shapes are optional. For example, the shape of the valid transform coefficient region may be different from the block shape. For example, as illustrated in FIG. 41, the valid transform coefficient region may be set to a rectangle even though the block 20 is a square. In the case of the example in FIG. 41, a valid transform coefficient region of 32×16 is set in the block 20 of 64×64. In this case, the scan of the sub-block units is started from the sub-block 41, and the scan is performed in order from an arrow 441 to an arrow 451.

6. Third Embodiment

Scan Example of Method 1-2

In the present embodiment, the "method 1-2" will be described. The process (Zero Out) of setting the high-frequency region coefficients of the block in a size larger than 32×32 to 0 described above may be applied not only to the luminance components, but also to the chroma components. This can further suppress the reduction in the encoding efficiency.

Further, in that case, the present technique may also be applied to the chroma components to which the process is applied. For example, the method 1 may be applied to the chroma components as in the case of the luminance components. In such a way, the reduction in the encoding efficiency can be suppressed. In addition, the increase in the load of encoding and decoding can be suppressed, and the increase in the cost, the circuit scale, the processing time, and the like can be suppressed. In addition, for example, the method 1-1 may also be applied to the chroma components as in the case of the luminance components. For example, one of the methods 1-1-1 to 1-1-3 may be applied to the chroma components. In such a way, the reduction in the encoding efficiency can be suppressed.

Figure 42:
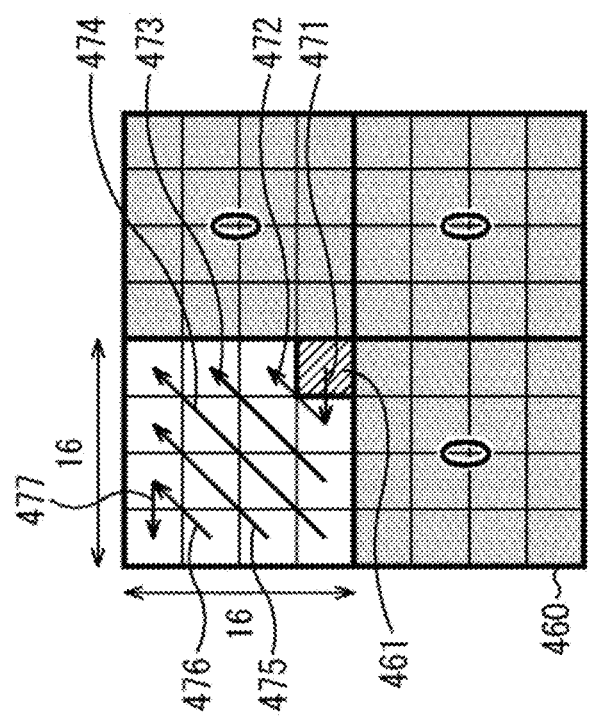
FIG. 42 is a diagram describing an example of skipping the invalid transform coefficient region of chroma components.

Note that, in that case, the block size of the chroma components may not be the same as the block size of the luminance components. For example, while the block 20 of the luminance components is 64×64 as in the example of FIG. 14, a block 460 of the chroma components may be 32×32 as illustrated in FIG. 42. Assuming that the scan is started from a sub-block 461 at the lower right corner of the valid transform coefficient region in the block 460 of the chroma components, the sub-block units are scanned in order from an arrow 471 to an arrow 477 as illustrated in FIG. 42. That is, in this case as well, the scan of the chroma components is performed similarly to the scan of the luminance components. In such a way, the scan method can be uniform for the luminance components and the chroma components, and the scan can be more easily controlled.

For example, the scan control unit 171 in the encoding apparatus 170 may also control the order of scan for the chroma components in step S102 as in the case of the luminance components, and the encoding unit 172 may scan and encode the sub-blocks in step S103 and step S104 according to the control. In such a way, the encoding apparatus 170 can also suppress the reduction in the encoding efficiency for the chroma components.

In addition, for example, the scan control unit 181 in the decoding apparatus 180 may also control the order of scan for the chroma components in step S122 as in the case of the luminance components, and the decoding unit 182 may use the scan of each sub-block to decode the encoded data for the chroma components in step S123 and step S124 according to the control as in the case of the luminance components. In such a way, the decoding apparatus 180 can also further suppress the reduction in the encoding efficiency for the chroma components.

7. Fourth Embodiment

<7-1: Image Encoding Apparatus>

The present technique described above can be applied to any apparatuses, devices, systems, and the like. For example, the present technique described above can be applied to an image encoding apparatus that encodes image data.

Figure 43:
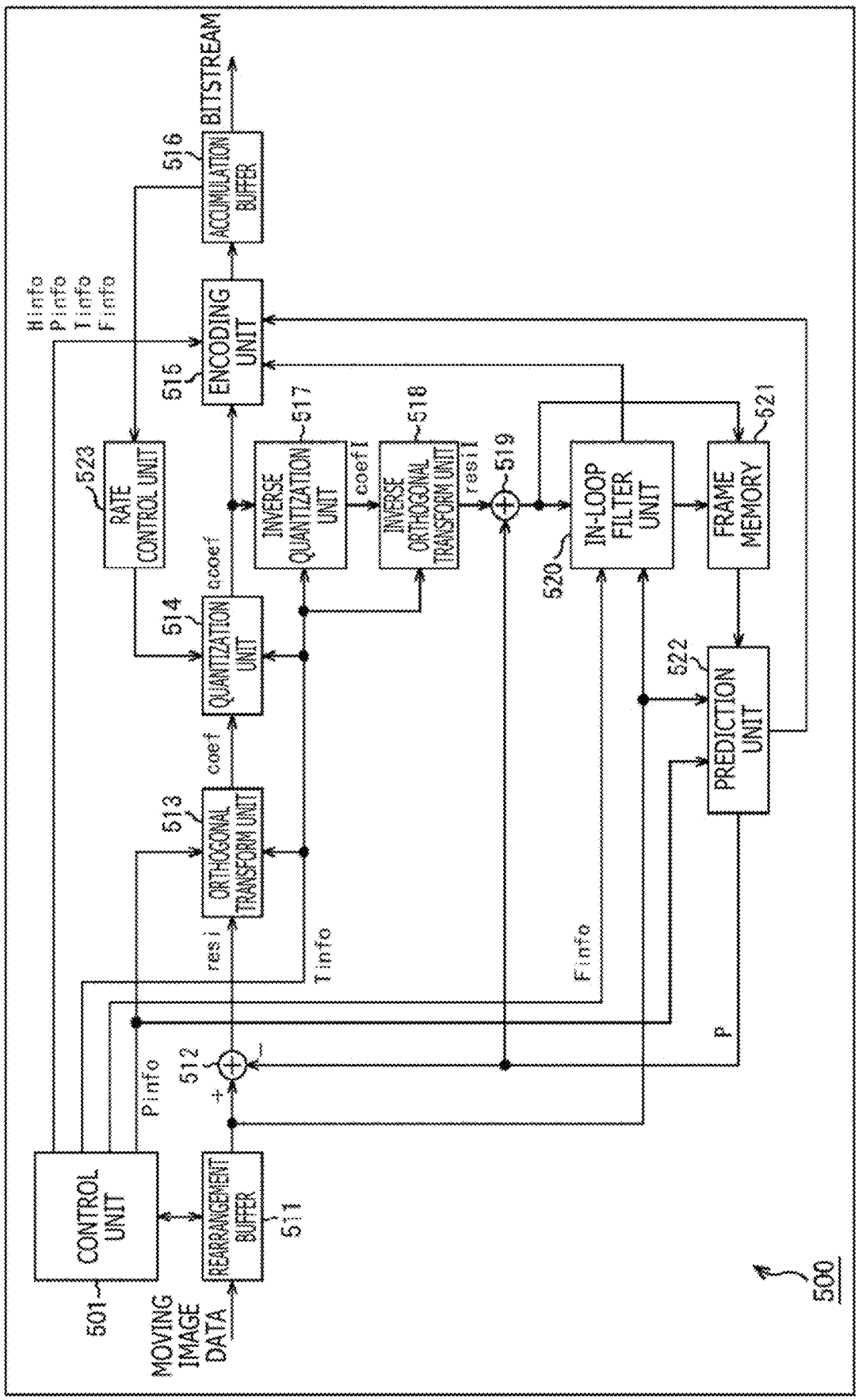
FIG. 43 is a block diagram illustrating a main configuration example of an image encoding apparatus.

FIG. 43 is a block diagram illustrating an example of the configuration of the image encoding apparatus that is a mode of an image processing apparatus according to the present technique. An image encoding apparatus 500 illustrated in FIG. 43 is an apparatus that encodes image data of moving images. For example, the image encoding apparatus 500 is provided with the techniques described in NPL 1 to NPL 4, and the image encoding apparatus 500 uses a method compliant with the standard described in any of the above-mentioned pieces of literature to encode the image data of the moving images.

Note that FIG. 43 illustrates main processing units, flows of data, and the like, and FIG. 43 may not illustrate everything. That is, in the image encoding apparatus 500, there may be processing units not illustrated as blocks in FIG. 43, and there may be flows of processes and data not indicated by arrows or the like in FIG. 43. This similarly applies to other drawings describing the processing units and the like in the image encoding apparatus 500.

As illustrated in FIG. 43, the image encoding apparatus 500 includes a control unit 501, a rearrangement buffer 511, a computation unit 512, an orthogonal transform unit 513, a quantization unit 514, an encoding unit 515, an accumulation buffer 516, an inverse quantization unit 517, an inverse orthogonal transform unit 518, a computation unit 519, an in-loop filter unit 520, a frame memory 521, a prediction unit 522, and a rate control unit 523.

<Control Unit>

The control unit 501 divides moving image data held in the rearrangement buffer 511 into blocks in a unit of processing (such as CU, PU, and transform block), based on the block size of the unit of processing designated from the outside or designated in advance. In addition, the control unit 501 determines encoding parameters (such as header information Hinfo, prediction mode information Pinfo, transform information Tinfo, and filter information Finfo) to be supplied to each block, based on, for example, RDO (Rate-Distortion Optimization).

The details of the encoding parameters will be described later. Once the control unit 501 determines the encoding parameters, the control unit 501 supplies the encoding parameters to each block. Specifically, the encoding parameters are supplied as follows.

The header information Hinfo is supplied to each block. The prediction mode information Pinfo is supplied to the encoding unit 515 and the prediction unit 522. The transform information Tinfo is supplied to the encoding unit 515, the orthogonal transform unit 513, the quantization unit 514, the inverse quantization unit 517, and the inverse orthogonal transform unit 518. The filter information Finfo is supplied to the in-loop filter unit 520.

<Rearrangement Buffer>

Each field (input image) of the moving image data is input to the image encoding apparatus 500 in the order of reproduction (order of display). The rearrangement buffer 511 acquires the input images in the order of reproduction (order of display) and holds (stores) the input images. The rearrangement buffer 511 rearranges the input images in the order of encoding (order of decoding) or divides the input images into blocks in the unit of processing based on the control of the control unit 501. The rearrangement buffer 511 supplies the processed input images to the computation unit 512. In addition, the rearrangement buffer 511 also supplies the input images (original images) to the prediction unit 522 and the in-loop filter unit 520.

<Computation Unit>

The computation unit 512 receives an image I corresponding to the blocks in the unit of processing and a predicted image P supplied from the prediction unit 522. The computation unit 512 subtracts the predicted image P from the image I as indicated in the following Equation (5) to derive a predicted residual resi and supplies the predicted residual resi to the orthogonal transform unit 513.

[Math. 5]

$$resi = I - P \qquad (5)$$

<Orthogonal Transform Unit>

The orthogonal transform unit 513 receives the predicted residual resi supplied from the computation unit 512 and the transform information Tinfo supplied from the control unit 501. The orthogonal transform unit 513 applies an orthogonal transform to the predicted residual resi based on the transform information Tinfo to derive a transform coefficient coef. The orthogonal transform unit 513 supplies the obtained transform coefficient coef to the quantization unit 514.

<Quantization Unit>

The quantization unit 514 receives the transform coefficient coef supplied from the orthogonal transform unit 513 and the transform information Tinfo supplied from the control unit 501 and scales (quantizes) the transform coefficient coef based on the transform information Tinfo. Note that the rate of the quantization is controlled by the rate control unit 523. The quantization unit 514 supplies the quantized transform coefficient obtained by the quantization, that is, a quantization transform coefficient level qcoef to the encoding unit 515 and the inverse quantization unit 517.

<Encoding Unit>

The encoding unit 515 receives the quantization transform coefficient level qcoef supplied from the quantization unit 514, the various encoding parameters (such as header information Hinfo, prediction mode information Pinfo, transform information Tinfo, and filter information Finfo) supplied from the control unit 501, information regarding a filter, such as a filter coefficient, supplied from the in-loop filter unit 520, and information regarding an optimal prediction mode supplied from the prediction unit 522. The encoding unit 515 performs variable-length encoding (for example, arithmetic coding) of the quantization transform coefficient level qcoeff to generate a bit string (encoded data).

In addition, the encoding unit 515 derives residual information Rinfo from the quantization transform coefficient level qoeff and encodes the residual information Rinfo to generate a bit string.

Further, the encoding unit 515 includes the information regarding the filter supplied from the in-loop filter unit 520 in the filter information Finfo and includes the information regarding the optimal prediction mode supplied from the prediction unit 522 in the prediction mode information Pinfo. The encoding unit 515 then encodes the various encoding parameters (such as header information Hinfo, prediction mode information Pinfo, transform information Tinfo, and filter information Finfo) and generates bit strings.

In addition, the encoding unit 515 multiplexes the bit strings of various types of information generated in such a way to generate encoded data. The encoding unit 515 supplies the encoded data to the accumulation buffer 516.

<Accumulation Buffer>

The accumulation buffer 516 temporarily holds the encoded data obtained by the encoding unit 515. The accumulation buffer 516 outputs the held encoded data as, for example, a bitstream or the like to the outside of the image encoding apparatus 500 at a predetermined timing. For example, the encoded data is transmitted to the decoding side through any recording medium, any transmission medium, any information processing apparatus, or the like. That is, the accumulation buffer 516 is also a transmission unit that transmits the encoded data (bitstream).

<Inverse Quantization Unit>

The inverse quantization unit 517 executes a process regarding inverse quantization. For example, the inverse quantization unit 517 receives the quantization transform coefficient level qcoeff supplied from the quantization unit 514 and the transform information Tinfo supplied from the control unit 501 and scales (inverse quantization) the value of the quantization transform coefficient level level based on the transform information Tinfo. Note that the inverse quantization is an opposite process of the quantization executed by the quantization unit 514. The inverse quantization unit 517 supplies a transform coefficient coefI obtained by the inverse quantization to the inverse orthogonal transform unit 518.

<Inverse Orthogonal Transform Unit>

The inverse orthogonal transform unit 518 executes a process regarding an inverse orthogonal transform. For example, the inverse orthogonal transform unit 518 receives the transform coefficient coefI supplied from the inverse quantization unit 517 and the transform information Tinfo supplied from the control unit 501 and applies an inverse orthogonal transform to the transform coefficient coefI based on the transform information Tinfo to derive a predicted residual resiI. Note that the inverse orthogonal transform is an opposite process of the orthogonal transform performed by the orthogonal transform unit 513. The inverse orthogonal transform unit 518 supplies the predicted residual resiI obtained by the inverse orthogonal transform to the computation unit 519. Note that the inverse orthogonal transform unit 518 is similar to an inverse orthogonal transform unit (described later) on the decoding side, and the description for the decoding side (described later) can be applied to the inverse orthogonal transform unit 518.

<Computation Unit>

The computation unit 519 receives the predicted residual resiI supplied from the inverse orthogonal transform unit 518 and the predicted image P supplied from the prediction unit 522. The computation unit 519 adds the predicted residual resiI and the predicted image P corresponding to the predicted residual resiI to derive a local decoded image Rlocal. The computation unit 519 supplies the derived local decoded image Rlocal to the in-loop filter unit 520 and the frame memory 521.

<In-Loop Filter Unit>

The in-loop filter unit 520 executes a process regarding an in-loop filter process. For example, the in-loop filter unit 520 receives the local decoded image Rlocal supplied from the computation unit 519, the filter information Finfo supplied from the control unit 501, and the input image (original image) supplied from the rearrangement buffer 511. Note that the information to be input to the in-loop filter unit 520 is optional, and information other than the information may be input. For example, information, such as a prediction mode, motion information, an encoding amount target value, a quantization parameter QP, a picture type, and blocks (such as CU and CTU), may be input to the in-loop filter unit 520 as necessary.

The in-loop filter unit 520 appropriately applies a filter process to the local decoded image Rlocal based on the filter information Finfo. The in-loop filter unit 520 also uses the input image (original image) and other input information in the filter process as necessary.

For example, the in-loop filter unit 520 sequentially applies four in-loop filters including a bilateral filter, a deblocking filter (DBF (DeBlocking Filter)), an adaptive offset filter (SAO (Sample Adaptive Offset)), and an adaptive loop filter (ALF (Adaptive Loop Filter)), in this order. Note that the filters to be applied and the order of applying the filters are optional and can appropriately be selected.

Obviously, the filter process executed by the in-loop filter unit 520 is optional, and the filter process is not limited to the example. For example, the in-loop filter unit 520 may apply a Wiener filter or the like.

The in-loop filter unit 520 supplies the filtered local decoded image Rlocal to the frame memory 521. Note that, in a case of transmitting, for example, information regarding the filter, such as a filter coefficient, to the decoding side, the in-loop filter unit 520 supplies the information regarding the filter to the encoding unit 515.

<Frame Memory>

The frame memory 521 executes a process regarding storage of data related to an image. For example, the frame memory 521 receives the local decoded image Rlocal supplied from the computation unit 519 or the filtered local decoded image Rlocal supplied from the in-loop filter unit 520 and holds (stores) the local decoded image Rlocal. In addition, the frame memory 521 uses the local decoded image Rlocal to reconstruct the decoded image R of each picture unit and holds the decoded image R (stores the decoded image R in a buffer of the frame memory 521). The frame memory 521 supplies the decoded image R (or part of the decoded image R) to the prediction unit 522 according to a request from the prediction unit 522.

<Prediction Unit>

The prediction unit 522 executes a process regarding generation of a predicted image. For example, the prediction unit 522 receives the prediction mode information Pinfo supplied from the control unit 501, the input image (original image) supplied from the rearrangement buffer 511, and the decoded image R (or part of the decoded image R) read from the frame memory 521. The prediction unit 522 uses the prediction mode information Pinfo and the input image (original image) to execute a prediction process, such as inter prediction and intra prediction, and refers to the decoded image R as a reference image to perform prediction. The prediction unit 522 executes a motion compensation process based on the prediction result to generate a predicted image P. The prediction unit 522 supplies the generated predicted image P to the computation unit 512 and the computation unit 519. In addition, the prediction unit 522 supplies information regarding a prediction mode selected in the process, that is, an optimal prediction mode, to the encoding unit 515 as necessary.

<Rate Control Unit>

The rate control unit 523 executes a process regarding rate control. For example, the rate control unit 523 controls the rate of the quantization operation of the quantization unit 514 to prevent an overflow or an underflow, based on the amount of encoding of the encoded data accumulated in the accumulation buffer 516.

<Application of Present Technique>

In the image encoding apparatus 500 configured as described above, the encoding apparatus 170 (FIG. 17) may be applied as the encoding unit 515, for example. That is, the encoding unit 515 may include the scan control unit 171 and the encoding unit 172, and various types of scan control described in <3. Concept> to <6. Third Embodiment> may be applied to the encoding performed by the encoding unit 172.

According to the configuration, the encoding unit 515 can reduce the unnecessary information included in the bitstream (the encoded data of the coefficient data of the sub-blocks in the invalid transform coefficient region) and suppress the reduction in the encoding efficiency as in the case of the encoding apparatus 170. In addition, encoding of the unnecessary information can be skipped, and therefore, the increase in the load of the encoding process can be suppressed, and the increase in the cost, the circuit scale, the processing time, and the like can be suppressed.

Therefore, the image encoding apparatus 500 can suppress the reduction in the encoding efficiency. In addition, the image encoding apparatus 500 can suppress the increase in the load of the encoding process and suppress the increase in the cost, the circuit scale, the processing time, and the like.

<Flow of Image Encoding Process>

Figure 44:
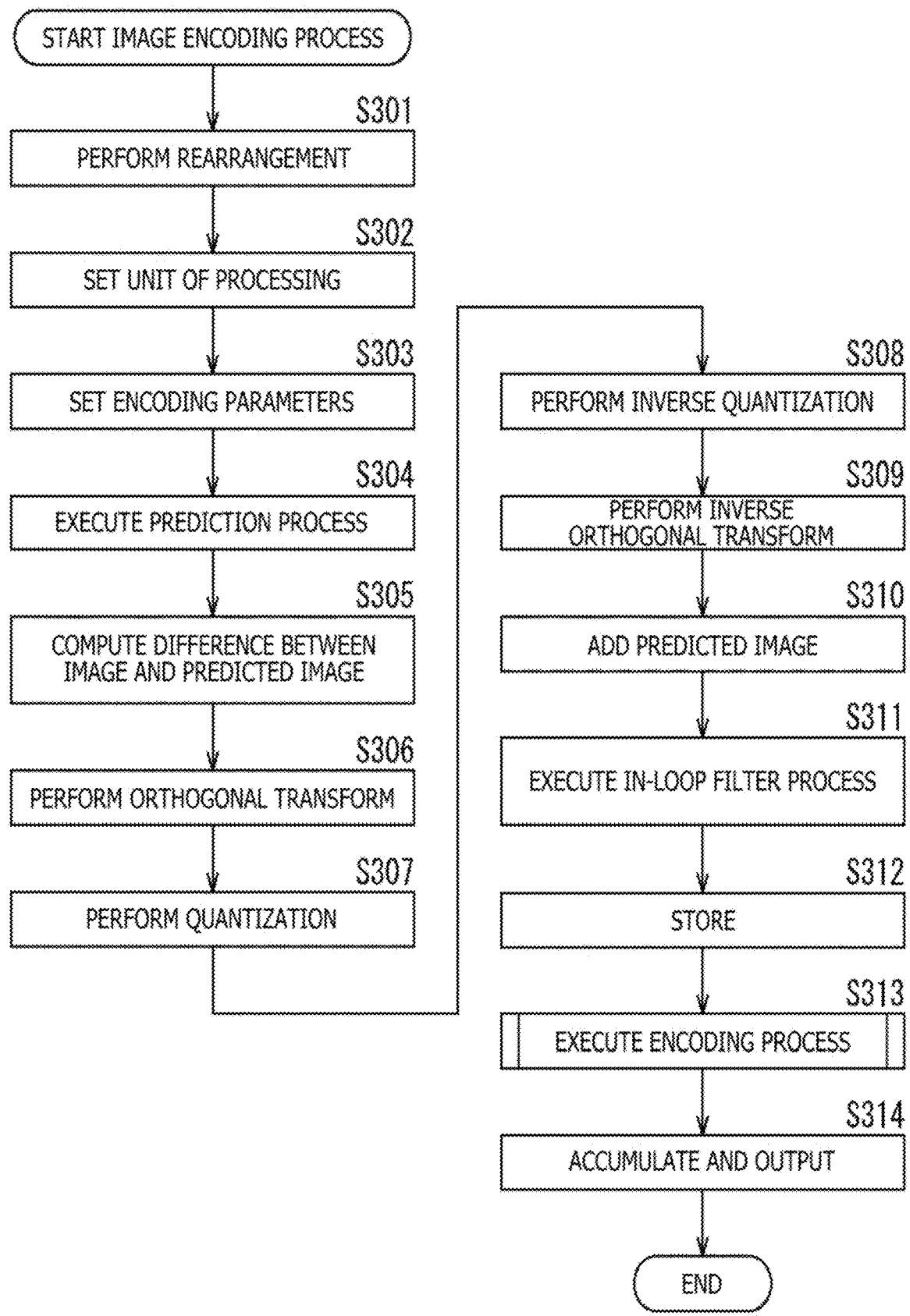
FIG. 44 is a flow chart illustrating an example of a flow of an image encoding process.

Next, flows of processes executed by the image encoding apparatus 500 will be described. First, an example of a flow of an image encoding process will be described with reference to a flow chart of FIG. 44.

Once the image encoding process is started, the rearrangement buffer 511 rearranges the order of the frames of the moving image data controlled and input by the control unit 501 from the order of display to the order of encoding in step S301.

In step S302, the control unit 501 sets the unit of processing for the input image held by the rearrangement buffer 511 (divides the input image into blocks).

In step S303, the control unit 501 determines (sets) the encoding parameters of the input image held by the rearrangement buffer 511.

In step S304, the prediction unit 522 executes the prediction process to generate the predicted image and the like of the optimal prediction mode. For example, in the prediction process, the prediction unit 522 performs the intra prediction to generate the predicted image and the like of the optimal intra prediction mode and performs the inter prediction to generate the predicted image and the like of the optimal inter prediction mode. The prediction unit 522 selects the optimal prediction mode from them based on the cost function value and the like.

In step S305, the computation unit 512 computes the difference between the input image and the predicted image of the optimal mode selected in the prediction process of step S504. That is, the computation unit 512 generates the predicted residual resi of the input image and the predicted image. The amount of data of the predicted residual resi obtained in such a way is reduced compared to the original image data. Therefore, the amount of data can be compressed compared to the case in which the image is encoded as it is.

In step S306, the orthogonal transform unit 513 applies the orthogonal transform process to the predicted residual resi generated in the process of step S305 to derive the transform coefficient coef.

In step S307, the quantization unit 514 quantizes the transform coefficient coef obtained in the process of step S306 by, for example, using the quantization parameters calculated by the control unit 501 and derives the quantization transform coefficient level qcoef.

In step S308, the inverse quantization unit 517 uses the characteristics corresponding to the characteristics of the quantization of step S307 to apply inverse quantization to the quantization transform coefficient level qcoef generated in the process of step S307 and derives the transform coefficient coefI.

In step S309, the inverse orthogonal transform unit 518 uses the method corresponding to the orthogonal transform process of step S306 to apply an inverse orthogonal transform to the transform coefficient coefI obtained in the process of step S308 and derives the predicted residual resiI. Note that the inverse orthogonal transform process is similar to an inverse orthogonal transform process (described later) executed on the decoding side, and the description for the decoding side (described later) can be applied to the inverse orthogonal transform process of step S309.

In step S310, the computation unit 519 adds the predicted image obtained in the prediction process of step S304 to the predicted residual resiI derived in the process of step S309, to generate the decoded image that is locally decoded.

In step S311, the in-loop filter unit 520 applies an in-loop filter process to the decoded image that is locally decoded and derived in the process of step S310.

In step S312, the frame memory 521 stores the decoded image that is locally decoded and derived in the process of step S310 and the decoded image that is locally decoded filtered in step S312.

In step S313, the encoding unit 515 encodes the quantization transform coefficient level qcoef obtained in the process of step S307. For example, the encoding unit 515 uses the arithmetic coding or the like to encode the quantization transform coefficient level qcoef that is information regarding the image and generates the encoded data. In addition, the encoding unit 515 encodes various encoding parameters (header information Hinfo, prediction mode information Pinfo, transform information Tinfo) at this point. Further, the encoding unit 515 derives the residual information RInfo from the quantization transform coefficient level level and encodes the residual information RInfo.

In step S314, the accumulation buffer 516 accumulates the encoded data obtained in such a way and outputs the encoded data as, for example, a bitstream to the outside of the image encoding apparatus 500. The bitstream is transmitted to the decoding side through, for example, the transmission path or the recording medium. In addition, the rate control unit 523 performs the rate control as necessary.

Once the process of S314 is completed, the image encoding process ends.

In the encoding process executed in step S313 of the image encoding process, the order of scan of the valid transform coefficient region may be controlled as described above. That is, the encoding process as described with reference to the flow chart of FIG. 18 may be executed in this encoding process. In such a way, the image encoding apparatus 500 can further suppress the reduction in the encoding efficiency.

<7-2: Image Decoding Apparatus>

In addition, the present technique described above can be applied to, for example, an image decoding apparatus that decodes encoded data including encoded image data.

Figure 45:
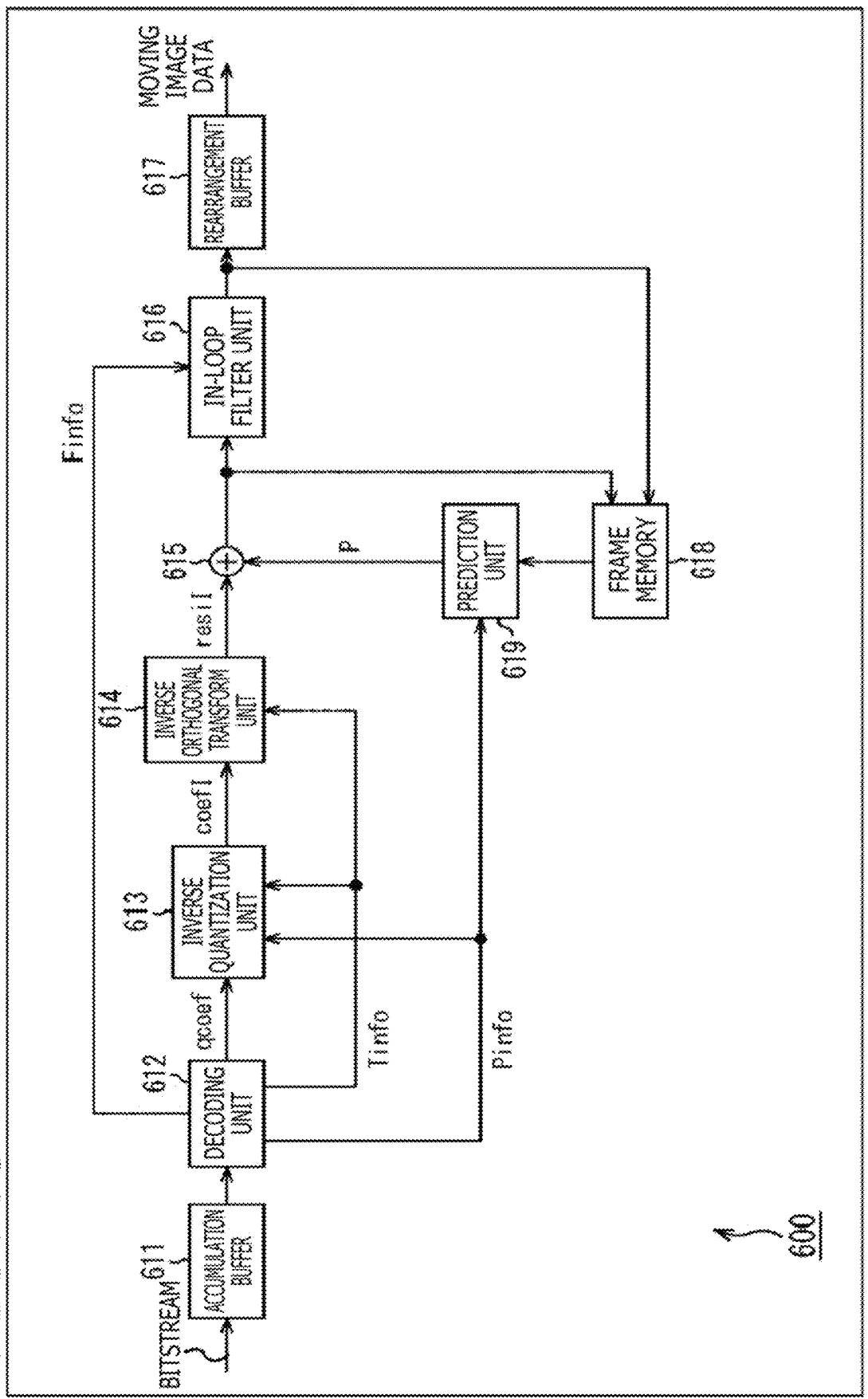
FIG. 45 is a block diagram illustrating a main configuration example of an image decoding apparatus.

FIG. 45 is a block diagram illustrating an example of a configuration of the image decoding apparatus that is a mode of the image processing apparatus according to the present technique. An image decoding apparatus 600 illustrated in FIG. 45 is an apparatus that decodes encoded data in which a predicted residual of an image and a predicted image of the image is encoded as in AVC or HEVC. For example, the image decoding apparatus 600 is provided with the techniques described in NPL 1 to NPL 4, and the image decoding apparatus 600 uses a method compliant with a standard described in any of the abovementioned pieces of literature to decode the encoded data in which the image data of moving images is encoded. For example, the image decoding apparatus 600 decodes the encoded data (bitstream) generated by the image encoding apparatus 500.

Note that FIG. 45 illustrates main processing units, flows of data, and the like, and FIG. 45 may not illustrate everything. That is, in the image decoding apparatus 600, there may be processing units not illustrated as blocks in FIG. 45, and there may be flows of processes or data not indicated by arrows or the like in FIG. 45. This similarly applies to other drawings describing the processing units and the like in the image decoding apparatus 600.

In FIG. 45, the image decoding apparatus 600 includes an accumulation buffer 611, a decoding unit 612, an inverse quantization unit 613, an inverse orthogonal transform unit 614, a computation unit 615, an in-loop filter unit 616, a rearrangement buffer 617, a frame memory 618, and a prediction unit 619. Note that the prediction unit 619 includes an intra prediction unit and an inter prediction unit not illustrated. The image decoding apparatus 600 is an apparatus that decodes the encoded data (bitstream) to generate moving image data.

<Accumulation Buffer>

The accumulation buffer 611 acquires the bitstream input to the image decoding apparatus 600 and holds (stores) the bitstream. The accumulation buffer 611 supplies the accumulated bitstream to the decoding unit 612 at a predetermined timing or in a case where, for example, a predetermined condition is met.

<Decoding Unit>

The decoding unit 612 executes a process regarding decoding of an image. For example, the decoding unit 612 receives the bitstream supplied from the accumulation buffer 611. The decoding unit 612 applies variable-length decoding to syntax values of syntax elements from the bit string according to the definition of a syntax table and derives parameters.

The syntax elements and the parameters derived from the syntax values of the syntax elements include information, such as, for example, header information Hinfo, prediction mode information Pinfo, transform information Tinfo, residual information Rinfo, and filter information Finfo. That is, the decoding unit 612 parses (analyzes and acquires) the information from the bitstream. The information will be described below.

<Header Information Hinfo>

The header information Hinfo includes, for example, header information, such as VPS (Video Parameter Set)/SPS (Sequence ParameterSet)/PPS (Picture Parameter Set)/SH (slice header). The header information Hinfo includes, for example, information defining image size (width PicWidth, height PicHeight), bit depth (luminance bitDepthY, chroma bitDepthC), chroma array type ChromaArrayType, maximum value MaxCUSize/minimum value MinCUSize of CU size, maximum depth MaxQTDepth/minimum depth MinQTDepth of quad-tree partition (also referred to as Quad-tree partition), maximum depth MaxBTDepth/minimum depth MinBTDepth of binary-tree partition (Binary-tree partition), maximum value MaxTSSize of transform skip block (also referred to as a maximum transform skip block size), on/off flag of each encoding tool (also referred to as enabled flag), and the like.

An example of the on/off flag of the encoding tool included in the header information Hinfo includes the following on/off flag related to the transform and the quantization process. Note that the on/off flag of the encoding tool can also be interpreted as a flag indicating whether or not the encoded data includes the syntax related to the encoding tool. Further, in a case where the value of the on/off flag is 1 (true), the encoding tool can be used. In a case where the value of the on/off flag is 0 (false), the encoding tool cannot be used. Note that the interpretation of the flag values may be opposite.

Cross-component prediction enabled flag (ccp_enabled flag): flag information indicating whether or not cross-component prediction (CCP (Cross-Component Prediction), also referred to as CC prediction) can be used. For example, the cross-component prediction can be used in a case where the flag information is "1" (true), and the cross-component prediction cannot be used in a case where the flag information is "0" (false).

Note that the CCP will also be referred to as cross-component linear prediction (CCLM or CCLMP).

<Prediction Mode Information Pinfo>

The prediction mode information Pinfo includes, for example, information, such as size information PBSize (prediction block size) of processing target PB (prediction block), intra prediction mode information IPinfo, and motion prediction information MVinfo.

The intra prediction mode information IPinfo includes, for example, prev_intra_luma_pred_flag, mpm_idx, and rem_intra_pred_mode in JCTVC-W1005, 7.3.8.5 Coding Unit syntax, a luminance intra prediction mode IntraPredModeY derived from the syntax, and the like.

In addition, the intra prediction mode information IPinfo includes, for example, a cross-component prediction flag (ccp_flag (cclmp_flag)), a multi-class linear prediction mode flag (mclm_flag), a chroma sample location type identifier (chroma_sample_loc_type_idx), a chroma MPM identifier (chroma_mpm_idx), a luminance intra prediction mode (IntraPredModeC) derived from the syntax, and the like.

The cross-component prediction flag (ccp_flag (cclmp_flag)) is flag information indicating whether or not to apply cross-component linear prediction. For example, the cross-component prediction is to be applied in a case of ccp_flag==1, and the cross-component prediction is not to be applied in a case of ccp_flag==0.

The multi-class linear prediction mode flag (mclm_flag) is information regarding the mode of linear prediction (linear prediction mode information). More specifically, the multi-class linear prediction mode flag (mclm_flag) is flag information indicating whether or not to set the multi-class linear prediction mode. For example, a 1-class mode (single class mode) (for example, CCLMP) is set in a case of "0," and a 2-class mode (multi-class mode) (for example, MCLMP) is set in a case of "1."

The chroma sample location type identifier (chroma_sample_loc_type_idx) is an identifier for identifying the type of the pixel location of chroma component (also referred to as a chroma sample location type). For example, in a case where the chroma array type (ChromaArrayType) that is information regarding the color format indicates 420-format, the chroma sample location type identifiers are allocated as in the following Equation (6).

[Math. 6]

$$\text{chroma\_sample\_loc\_type\_idx}==0\text{:Type2}$$

$$\text{chroma\_sample\_loc\_type\_idx}==1\text{:Type3}$$

$$\text{chroma\_sample\_loc\_type\_idx}==2\text{:Type0}$$

$$\text{chroma\_sample\_loc\_type\_idx}==3\text{:Type1} \qquad (6)$$

Note that the chroma sample location type identifier (chroma_sample_loc_type_idx) is transmitted as (stored in) information regarding pixel location of chroma component (chroma_sample_loc_info( )).

The chroma MPM identifier (chroma_mpm_idx) is an identifier indicating which prediction mode candidate in a chroma intra prediction mode candidate list (intraPredModeCandListC) is to be designated as a chroma intra prediction mode.

The motion prediction information MVinfo includes, for example, information, such as merge_idx, merge_flag, inter_pred_idc, ref_idx_LX, mvp_lX_flag, x={0, 1}, and mvd (for example, see JCTVC-W1005, 7.3.8.6 Prediction Unit Syntax).

Obviously, the information included in the prediction mode information Pinfo is optional, and information other than the abovementioned information may be included.

<Transform Information Tinfo>

The transform information Tinfo includes, for example, the following information. Obviously, the information included in the transform information Tinfo is optional, and information other than the information described below may be included.

Width size TBWSize and height TBHSize of the processing target transform block (or may be logarithms log 2TBWSize and log 2TBHSize of TBWSize and TBHSize with 2 as a base). Transform skip flag (ts_flag): a flag indicating whether or not to skip the (inverse) primary transform and the (inverse) secondary transform.

Scan identifier (scanIdx)

Quantization parameter (qp)

Quantization matrix (scaling matrix (for example, JCTVC-W1005, 7.3.4 Scaling list data syntax))

<Residual Information Rinfo>

The residual information Rinfo (for example, see 7.3.8.11 Residual Coding syntax of JCTVC-W1005) includes, for example, the following syntax.

cbf (coded_block_flag): residual data presence/absence flag, last_sig_coeff_x_pos: last non-zero coefficient X coordinate, last_sig_coeff_y_pos: last non-zero coefficient Y coordinate, coded_sub_block_flag: sub-block non-zero coefficient presence/absence flag, sig_coeff_flag: non-zero coefficient presence/absence flag, gr1_flag: flag indicating whether the level of non-zero coefficient is greater than 1 (also referred to as GR1 flag), gr2_flag: flag indicating whether the level of non-zero coefficient is greater than 2 (also referred to as GR2 flag), sign_flag: sign indicating positive or negative of non-zero coefficient (also referred to as sign code), coeff_abs_level_remaining: remaining level of non-zero coefficient (also referred to as non-zero coefficient remaining level), and the like.

Obviously, the information included in the residual information Rinfo is optional, and information other than the abovementioned information may be included.

<Filter Information Finfo>

The filter information Finfo includes, for example, the following control information regarding each filter process.

Control information regarding deblocking filter (DBF), control information regarding sample adaptive offset filter (SAO), control information regarding adaptive loop filter (ALF), and control information regarding other linear/nonlinear filters.

More specifically, the filter information Finfo includes, for example, a picture to be applied with each filter, information designating a region in the picture, filter On/Off control information of CU unit, filter On/Off control information regarding boundary of slice and tile, and the like. Obviously, the information included in the filter information Finfo is optional, and information other than the abovementioned information may be included.

The decoding unit 612 will be further described. The decoding unit 612 refers to the residual information Rinfo to derive the quantization transform coefficient level qcoef of each coefficient location in each transform block. The decoding unit 612 supplies the quantization transform coefficient level qcoef to the inverse quantization unit 613.

In addition, the decoding unit 612 supplies the parsed header information Hinfo, prediction mode information Pinfo, quantization transform coefficient level qcoef, transform information Tinfo, and filter information Finfo to each block. Specifically, the information is supplied as follows.

The header information Hinfo is supplied to the inverse quantization unit 613, the inverse orthogonal transform unit 614, the prediction unit 619, and the in-loop filter unit 616. The prediction mode information Pinfo is supplied to the inverse quantization unit 613 and the prediction unit 619. The transform information Tinfo is supplied to the inverse quantization unit 613 and the inverse orthogonal transform unit 614. The filter information Finfo is supplied to the in-loop filter unit 616.

Obviously, the example described above is just an example, and the example is not limited to this. For example, each encoding parameter may be supplied to any processing unit. In addition, other information may be supplied to any processing unit.

<Inverse Quantization Unit>

The inverse quantization unit 613 executes a process regarding inverse quantization. For example, the inverse quantization unit 613 receives the transform information Tinfo and the quantization transform coefficient level qcoef supplied from the decoding unit 612 and scales (inverse quantization) the value of the quantization transform coefficient level qcoef, based on the transform information Tinfo, to derive the transform coefficient coefI after inverse quantization.

Note that the inverse quantization is performed as an opposite process of the quantization by the quantization unit 514. In addition, the inverse quantization is a process similar to the inverse quantization by the inverse quantization unit 517. That is, the inverse quantization unit 517 executes a process (inverse quantization) similar to that of the inverse quantization unit 613.

The inverse quantization unit 613 supplies the derived transform coefficient coefI to the inverse orthogonal transform unit 614.

<Inverse Orthogonal Transform Unit>

The inverse orthogonal transform unit 614 executes a process regarding inverse orthogonal transform. For example, the inverse orthogonal transform unit 614 receives the transform coefficient coefI supplied from the inverse quantization unit 613 and the transform information Tinfo supplied from the decoding unit 612. The inverse orthogonal transform unit 614 applies the inverse orthogonal transform process to the transform coefficient coefI based on the transform information Tinfo to derive the predicted residual resiI.

Note that the inverse orthogonal transform is executed as an opposite process of the orthogonal transform performed by the orthogonal transform unit 513. In addition, the inverse orthogonal transform is a process similar to the inverse orthogonal transform performed by the inverse orthogonal transform unit 518. That is, the inverse orthogonal transform unit 518 executes a process (inverse orthogonal transform) similar to that of the inverse orthogonal transform unit 614.

The inverse orthogonal transform unit 614 supplies the derived predicted residual resiI to the computation unit 615.

<Computation Unit>

The computation unit 615 executes a process related to addition of information regarding an image. For example, the computation unit 615 receives the predicted residual resiI supplied from the inverse orthogonal transform unit 614 and the predicted image P supplied from the prediction unit 619. The computation unit 615 adds the predicted residual resiI and the predicted image P (prediction signal) corresponding to the predicted residual resiI as illustrated in the following Equation (7), to derive the local decoded image Rlocal.

[Math. 7]

$$Rlocal = resiI + P \qquad (7)$$

The computation unit 615 supplies the derived local decoded image Rlocal to the in-loop filter unit 616 and the frame memory 618.

<In-Loop Filter Unit>

The in-loop filter unit 616 executes a process related to an in-loop filter process. For example, the in-loop filter unit 616 receives the local decoded image Rlocal supplied from the computation unit 615 and the filter information Finfo supplied from the decoding unit 612. Note that the information input to the in-loop filter unit 616 is optional, and information other than the abovementioned information may be input.

The in-loop filter unit 616 appropriately applies a filter process to the local decoded image Rlocal based on the filter information Finfo.

For example, the in-loop filter unit 616 sequentially applies four in-loop filters including a bilateral filter, a deblocking filter (DBF (DeBlocking Filter)), an adaptive offset filter (SAO (Sample Adaptive Offset)), and an adaptive loop filter (ALF (Adaptive Loop Filter)), in this order. Note that the filters to be applied and the order of applying the filters are optional and can appropriately be selected.

The in-loop filter unit 616 executes a filter process corresponding to the filter process executed on the encoding side (for example, the in-loop filter unit 520 of the image encoding apparatus 500). Obviously, the filter process executed by the in-loop filter unit 616 is optional, and the filter process is not limited to the example. For example, the in-loop filter unit 616 may apply a Wiener filter or the like.

The in-loop filter unit 616 supplies the filtered local decoded image Rlocal to the rearrangement buffer 617 and the frame memory 618.

<Rearrangement Buffer>

The rearrangement buffer 617 receives the local decoded image Rlocal supplied from the in-loop filter unit 616 and holds (stores) the local decoded image Rlocal. The rearrangement buffer 617 uses the local decoded image Rlocal to reconstruct the decoded image R of each picture unit and holds the decoded image R (stores the decoded image R in the buffer). The rearrangement buffer 617 rearranges the obtained decoded images R from the order of decoding to the order of reproduction. The rearrangement buffer 617 outputs the rearranged decoded image R group as moving image data to the outside of the image decoding apparatus 600.

<Frame Memory>

The frame memory 618 executes a process regarding storage of data related to an image. For example, the frame memory 618 receives the local decoded image Rlocal supplied from the computation unit 615 to reconstruct the decoded image R of each picture unit. The frame memory 618 stores the decoded image R in the buffer of the frame memory 618.

In addition, the frame memory 618 receives the in-loop-filtered local decoded image Rlocal supplied from the in-loop filter unit 616 to reconstruct the decoded image R of each picture unit and stores the decoded image R in the buffer of the frame memory 618. The frame memory 618 appropriately supplies the stored decoded image R (or part of the decoded image R) as a reference image to the prediction unit 619.

Note that the frame memory 618 may store the header information Hinfo, the prediction mode information Pinfo, the transform information Tinfo, the filter information Finfo, and the like regarding the generation of the decoded image.

<Prediction Unit>

The prediction unit 619 executes a process regarding generation of a predicted image. For example, the prediction unit 619 receives the prediction mode information Pinfo supplied from the decoding unit 612. The prediction unit 619 uses a prediction method designated by the prediction mode information Pinfo to make a prediction and derives the predicted image P. In the derivation, the prediction unit 619 uses, as a reference image, the decoded image R (or part of the decoded image R) before filtering or after filtering that is designated by the prediction mode information Pinfo and that is stored in frame memory 618. The prediction unit 619 supplies the derived predicted image P to the computation unit 615.

<Application of Present Technique>

In the image decoding apparatus 600 configured in such a way, the decoding apparatus 180 (FIG. 19) may be applied as the decoding unit 612, for example. That is, the decoding unit 612 may include the scan control unit 181 and the decoding unit 182, and various types of scan control described in <3. Concept> to <6. Third Embodiment> may be applied to the decoding performed by the decoding unit 182.

According to the configuration, the decoding unit 612 can correctly decode the encoded data generated in the order of scan for reducing the unnecessary information included in the bitstream (the encoded data of the coefficient data of the sub-blocks in the invalid transform coefficient region) as in the case of the decoding apparatus 180. That is, the decoding unit 612 can suppress the reduction in the encoding efficiency. In addition, decoding of the unnecessary information can be skipped, and therefore, the increase in the load of the decoding process can be suppressed. The increase in the cost, the circuit scale, the processing time, and the like can thus be suppressed.

Therefore, the image decoding apparatus 600 can suppress the reduction in the encoding efficiency. In addition, the image decoding apparatus 600 can suppress the increase in the load of the decoding process and suppress the increase in the cost, the circuit scale, the processing time, and the like.

<Flow of Image Decoding Process>

Figure 46:
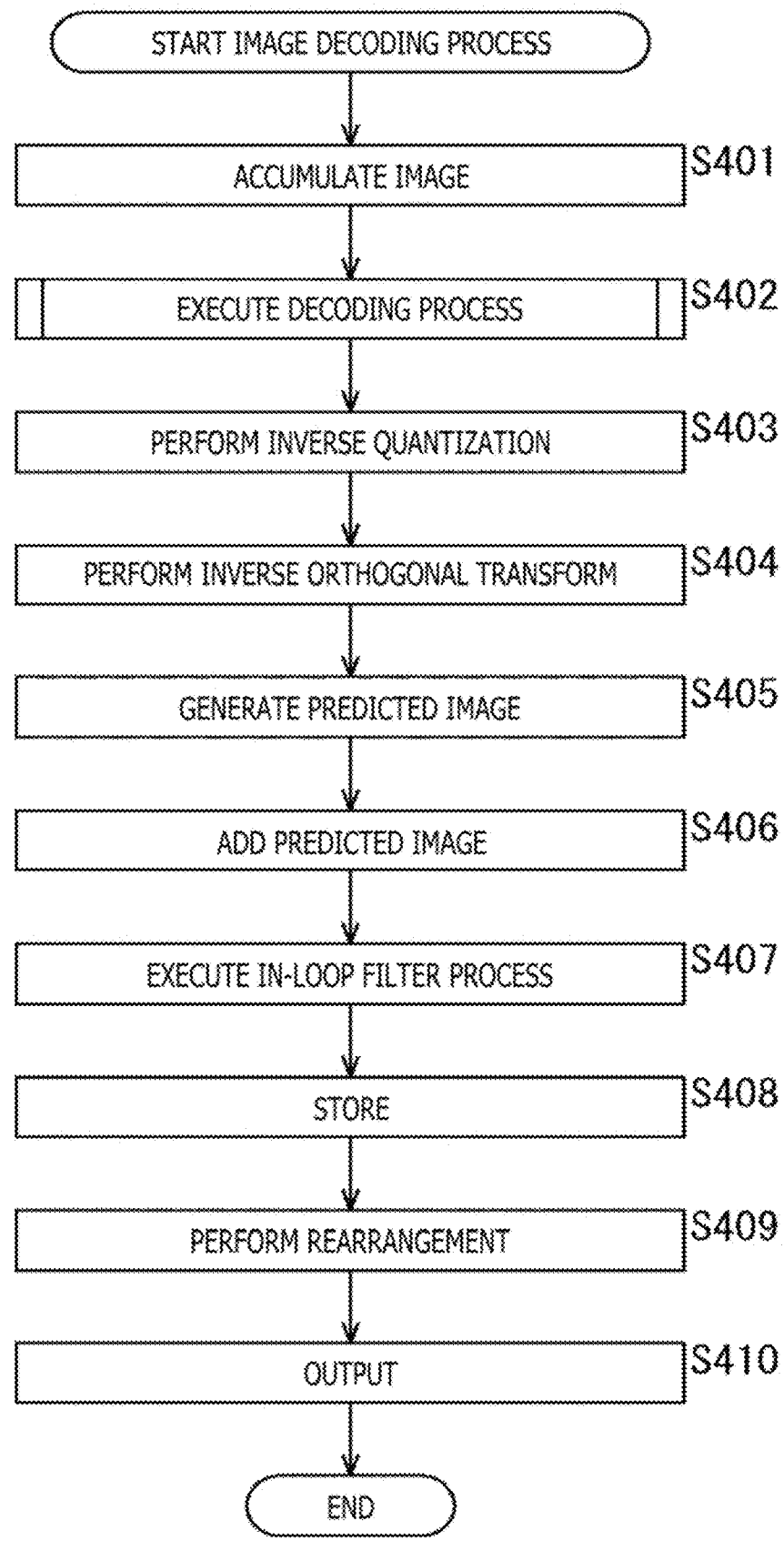
FIG. 46 is a flow chart describing an example of a flow of an image decoding process.

Next, an example of a flow of an image decoding process executed by the image decoding apparatus 600 will be described with reference to a flow chart of FIG. 46.

Once the image decoding process is started, the accumulation buffer 611 acquires the encoded data (bitstream) supplied from the outside of the image decoding apparatus 600 and holds (accumulates) the encoded data in step S401.

In step S602, the decoding unit 612 decodes the encoded data (bitstream) and obtains the quantization transform coefficient level qcoef. Further, in the decoding, the decoding unit 612 parses (analyzes and acquires) various encoding parameters from the encoded data (bitstream).

In step S403, the inverse quantization unit 613 applies, to the quantization transform coefficient level qcoef obtained in the process of step S402, inverse quantization that is an opposite process of the quantization performed on the encoding side and obtains the transform coefficient coefI.

In step S404, the inverse orthogonal transform unit 614 applies, to the transform coefficient coefI obtained in the process of step S403, an inverse orthogonal transform process that is an opposite process of the orthogonal transform process performed on the encoding side and obtains the predicted residual resiI.

In step S405, the prediction unit 619 uses a prediction method designated on the encoding side, to execute the prediction process based on the information parsed in step S402, and generates the predicted image P by, for example, referencing the reference image stored in the frame memory 618.

In step S406, the computation unit 615 adds the predicted residual resiI obtained in the process of step S404 and the predicted image P obtained in the process of step S405, to derive the local decoded image Rlocal.

In step S407, the in-loop filter unit 616 applies the in-loop filter process to the local decoded image Rlocal obtained in the process of step S406.

Further, in step S408, the frame memory 618 stores at least one of the local decoded image Rlocal obtained in the process of step S406 or the local decoded image Rlocal after filter process obtained in the process of step S407.

In step S409, the rearrangement buffer 617 uses the filtered local decoded image Rlocal obtained in the process of step S407, to derive the decoded image R, and rearranges the order of the decoded image R group from the order of decoding to the order of reproduction.

In step S410, the rearrangement buffer 617 outputs, as moving images, the decoded image R group rearranged in the order of reproduction to the outside of the image decoding apparatus 600. Once the process of step S410 is completed, the image decoding process ends.

In the decoding process executed in step S402 of the image decoding process, the order of scan of the valid transform coefficient region is controlled as described above. That is, the decoding process as described with reference to the flow chart of FIG. 20 may be executed in this decoding process. In such a way, the image decoding apparatus 600 can further suppress the reduction in the encoding efficiency.

<7-3: Syntax>

In the case of applying the present technique to the image encoding apparatus 500 or the image decoding apparatus 600, although the control of the scan of the present technique may be realized by changing the order of scan as described above, the syntax may be used to realize the control.

FIG. 47 illustrates an example of the syntax of the transform unit (transform unit). As indicated in the tenth to sixteenth stages from the top of FIG. 47, the residual data is encoded (residual coding) for the luminance components (luma) and the chroma components (cb, cr).

FIG. 48 illustrates an example of the syntax for encoding the residual data (coefficient data). In the syntax, the encoding of the coefficient data is basically controlled similarly to the example of FIG. 6. Further, as in the example of FIG. 21, the range of the scan is limited to the valid transform coefficient region ((xS<=32) && (yS<=32)) in the if statement of the thirty-second stage from the top. In such a way, the scan control can easily be realized.

8. Note

<Computer>

The series of processes can be executed by hardware or can be executed by software. In the case where the series of processes is executed by software, a program included in the software is installed on a computer. Here, examples of the computer include a computer incorporated into dedicated hardware and a general-purpose personal computer that can execute various functions by installing various programs.

FIG. 49 is a block diagram illustrating a configuration example of the hardware of the computer that uses a program to execute the series of processes.

In a computer 800 illustrated in FIG. 49, a CPU (Central Processing Unit) 801, a ROM (Read Only Memory) 802, and a RAM (Random Access Memory) 803 are connected to each other through a bus 804.

An input-output interface 810 is also connected to the bus 804. An input unit 811, an output unit 812, a storage unit 813, a communication unit 814, and a drive 815 are connected to the input-output interface 810.

The input unit 811 includes, for example, a keyboard, a mouse, a microphone, a touch panel, an input terminal, and the like. The output unit 812 includes, for example, a display, a speaker, an output terminal, and the like. The storage unit 813 includes, for example, a hard disk, a RAM disk, a non-volatile memory, and the like. The communication unit 814 includes, for example, a network interface. The drive 815 drives a removable medium 821, such as a magnetic disk, an optical disk, a magneto-optical disk, and a semiconductor memory.

In the computer configured in such a way, the CPU 801 loads, for example, a program stored in the storage unit 813 to the RAM 803 through the input-output interface 810 and the bus 804 to execute the program and thereby execute the series of processes. Data and the like necessary for the CPU 801 to execute various processes are also appropriately stored in the RAM 803.

The program executed by the computer (CPU 801) can be applied by, for example, recording the program in the removable medium 821 as a package medium or the like. In this case, the removable medium 821 can be mounted on the drive 815 to install the program on the storage unit 813 through the input-output interface 810.

Further, the program can also be provided through a wired or wireless transmission medium, such as a local area network, the Internet, and digital satellite broadcasting. In this case, the program can be received by the communication unit 814 and installed on the storage unit 813.

In addition, the program can also be installed in advance on the ROM 802 or the storage unit 813.

<Units of Information and Processes>

The data units in setting various types of information and the data units in various processes described above are optional, and the data units are not limited to the examples. For example, the information and the processes may be set for each TU (Transform Unit), TB (Transform Block), PU (Prediction Unit), PB (Prediction Block), CU (Coding unit), LCU (Largest Coding Unit), sub-block, block, tile, slice, picture, sequence, or component, or the data in the data units may be the target. Obviously, the data unit can be set for each piece of information or each process, and not all of the data units of the information and the processes have to be uniform. Note that the storage location of the information is optional, and the information may be stored in the header, the parameter set, or the like of the data unit. In addition, the information may be stored in plural places.

<Control Information>

The control information regarding the present technique described in each of the embodiments may be transmitted from the encoding side to the decoding side. For example, control information (for example, enabled flag) for controlling whether or not to permit (or prohibit) the application of the present technique may be transmitted. In addition, for example, control information indicating the target of applying the present technique (or the target of not applying the present technique) may be transmitted. For example, control information for designating the block size (one of or both an upper limit and a lower limit), the frame, the component, the layer, or the like in which the present technique is applied (or in which the application of the present technique is permitted or prohibited) may be transmitted.

<Target of Present Technique>

The present technique can be applied to any image encoding and decoding systems. That is, the specifications of various processes regarding image encoding and decoding, such as transform (inverse transform), quantization (inverse quantization), encoding (decoding), and prediction, are optional as long as the specifications do not contradict the present technique, and the specifications are not limited to the examples. In addition, part of the processes may be skipped unless it contradicts the present technique.

In addition, the present technique can be applied to a multi-view image encoding and decoding system that performs encoding and decoding of multi-view images including images from plural viewpoints (views). In that case, it is sufficient if the present technique is applied to the encoding and decoding from each viewpoint (view).

Further, the present technique can be applied to a tiered image encoding (scalable encoding) and decoding system that encodes and decodes tiered images divided into plural layers (tiers) to provide a scalability function for a predetermined parameter. In that case, it is sufficient if the present technique is applied to the encoding and decoding of each tier (layer).

The image processing apparatus, the image encoding apparatus, and the image decoding apparatus according to the embodiments can be applied to various electronic devices including, for example, a transmitter and a receiver (for example, television receiver and portable phone) in distribution through satellite broadcasting, cable broadcasting such as cable TV, or the Internet or in distribution to a terminal through cellular communication, an apparatus (for example, hard disk recorder and camera) that records images in a medium, such as an optical disk, a magnetic disk, and a flash memory, and that reproduces images from these storage media, and the like.

In addition, the present technique can also be carried out in any configuration mounted on any apparatus or an apparatus included in a system, such as, for example, a processor (for example, video processor) as system LSI (Large Scale Integration) or the like, a module (for example, video module) using plural processors or the like, a unit (for example, video unit) using plural modules or the like, and a set (for example, video set) provided with other functions in addition to the unit (that is, configuration of part of an apparatus).

Further, the present technique can also be applied to a network system including plural apparatuses. For example, the present technique can be applied to a cloud service for providing a service regarding images (moving images) to any terminal, such as a computer, an AV (Audio Visual) device, a portable information processing terminal, and an IoT (Internet of Things) device.

Note that the systems, the apparatuses, the processing units, and the like according to the present technique can be used in any fields, such as, for example, traffic, medical care, crime prevention, agriculture, livestock industry, mining industry, cosmetics, factories, home appliances, weather, and natural surveillance. In addition, the usage is also optional.

For example, the present technique can be applied to a system or a device used for providing content to be viewed or the like. In addition, the present technique can also be applied to, for example, a system or a device used for traffic, such as for monitoring traffic conditions and for controlling automatic driving. Further, the present technique can also be applied to, for example, a system or a device used for security. In addition, the present technique can be applied to, for example, a system or a device used for automatic control of a machine or the like. Further, the present technique can also be applied to, for example, a system or a device used for agriculture or livestock industry. In addition, the present technique can also be applied to, for example, a system or a device that monitors the state of nature, such as volcanos, forests, and oceans, wild life, and the like. Furthermore, the present technique can also be applied to, for example, a system or a device used for sports.

<Others>

Note that the "flag" in the present specification is information for identifying plural states, and the "flag" includes not only information used for identifying two states of true (1) and false (0), but also information that can identify three or more states. Therefore, the number of possible values of the "flag" may be two, such as 1/0, or may be three or more. That is, the number of bits of the "flag" is optional, and the "flag" may include 1 bit or plural bits. In addition, as for the identification information (including flag), there can be not only a form of including the identification information in the bitstream, but also a form of including difference information of the identification information with respect to reference information in the bitstream. Therefore, the "flag" and the "identification information" in the present specification include not only the information of the "flag" and the "identification information," but also the difference information with respect to the reference information.

In addition, various types of information (metadata and the like) regarding encoded data (bitstream) may be transmitted or recorded in any form as long as the information is associated with the encoded data. Here, the term "associated" denotes, for example, that one piece of data can be used (can be linked) in processing another piece of data. That is, the pieces of data associated with each other may be integrated as one piece of data or may be provided as separate pieces of data. For example, the information associated with the encoded data (image) may be transmitted on a transmission path different from the encoded data (image). In addition, for example, the information associated with the encoded data (image) may be recorded in a recording medium separate from the encoded data (image) (or in a separate recording area of the same recording medium). Note that part of the data may be "associated," instead of the entire data. For example, the image and the information corresponding to the image may be associated with each other in any unit, such as plural frames, one frame, and part of the frame.

Note that the terms, such as "combine," "multiplex," "add," "integrate," "include," "store," "put in," "place into," and "insert," in the present specification denote grouping of plural things into one thing, such as grouping of encoded data and metadata into one piece of data, and each term denotes one method of "associating" described above.

In addition, the embodiments of the present technique are not limited to the embodiments described above, and various changes can be made without departing from the scope of the present technique.

In addition, for example, the configuration of one apparatus (or processing unit) described above may be divided to provide plural apparatuses (or processing units). Conversely, the configurations of plural apparatuses (or processing units) described above may be integrated to provide one apparatus (or processing unit). In addition, configurations other than the configurations described above may obviously be added to the configuration of each apparatus (or each processing unit). Further, part of the configuration of an apparatus (or processing unit) may be included in the configuration of another apparatus (or another processing unit) as long as the configuration and the operation of the entire system are substantially the same.

Note that the system in the present specification denotes a set of plural constituent elements (apparatuses, modules (components), and the like), and whether or not all of the constituent elements are in the same housing does not matter. Therefore, plural apparatuses stored in separate housings and connected through a network and one apparatus storing plural modules in one housing are both systems.

In addition, the present technique can be provided as, for example, cloud computing in which plural apparatuses share one function and cooperate to execute a process through a network.

In addition, the program described above can be executed by, for example, any apparatus. In that case, it is sufficient if the apparatus can have necessary functions (such as functional blocks) and obtain necessary information.

In addition, for example, one apparatus can execute each step described in the flow charts, or plural apparatuses can take charge and execute each step. Further, in the case where one step includes plural processes, one apparatus can execute the plural processes included in one step, or plural apparatuses can take charge and execute the processes. In other words, plural processes included in one step can be executed as processes of plural steps. Conversely, processes described as plural steps can be integrated and executed in one step.

Note that the program executed by the computer may be a program in which the processes of the steps describing the program are executed in chronological order described in the present specification, or the program may be a program for executing the processes in parallel or for executing the processes separately at a necessary timing such as when the processes are invoked. That is, the processes of the steps may be executed in an order different from the order described above as long as there is no contradiction. Further, the processes of the steps describing the program may be executed in parallel with processes of other programs or may be executed in combination with processes of other programs.

Note that the plural present techniques described in the present specification can independently and separately be carried out as long as there is no contradiction. Obviously, any plural present techniques can also be combined and carried out. For example, part or all of the present technique described in one of the embodiments can also be carried out in combination with part or all of the present technique described in another embodiment. In addition, part or all of any present technique described above can also be carried out in combination with another technique not described above.

REFERENCE SIGNS LIST

170: Encoding apparatus
171: Scan control unit
172: Encoding unit
180: Decoding apparatus
181: Scan control unit
182: Decoding unit
500: Image encoding apparatus
501: Control unit
515: Encoding unit
600: Image decoding apparatus
612: Decoding unit

The invention claimed is:

1. An image processing apparatus comprising:
a transceiver; and
control circuitry configured to encode coefficient data related to an image, the coefficient data related to the image arranged in an M×N block, where M and N are integers, and N is equal to or different from M,
wherein, based on information indicating a K×L block of the M×N block is to be processed, where the K×L block corresponds to a valid transform coefficient region, where K and L are integers, and L is equal to or different from K, where at least one of K or L is less than at least one M or N, the control circuitry encodes the coefficient data related to the image by:
skipping encoding of the coefficient data related to the image in portions of the M×N block that are outside of the K×L block, the portions of the M×N block that are outside of the K×L block corresponding to one or more invalid transform coefficient regions, and
only encoding the coefficient data related to the image in the K×L block that corresponds to the valid transform coefficient region.

2. The image processing apparatus of claim 1, wherein the control circuitry is configured to encode the coefficient data related to the image in the K×L block that corresponds to the valid transform coefficient region by scanning the coefficient data related to the image in the K×L block that corresponds to the valid transform coefficient region in a predetermined scanning pattern.

3. The image processing apparatus of claim 2, wherein the predetermined scanning pattern includes a predetermined scanning direction.

4. The image processing apparatus of claim 3, wherein the predetermined scanning direction corresponds to a block shape of the K×L block.

5. The image processing apparatus of claim 1, wherein scanning of the coefficient data in the K×L block includes sequentially scanning a plurality of sub-blocks of the K×L block.

6. The image processing apparatus of claim 1, wherein the coefficient data related to the image in the K×L block comprises at least one of a luminance data or a chroma data.

7. A method of encoding performed by an image processing apparatus that is configured to encode coefficient data related to an image, the coefficient data related to the image arranged in an M×N block, where M and N are integers, and N is equal to or different from M, the method comprising:
based on information indicating a K×L block of the M×N block is to be processed, where the K×L block corresponds to a valid transform coefficient region, where K and L are integers, and L is equal to or different from K, where at least one of K or L is less than at least one M or N, encoding the coefficient data related to the image by:
skipping encoding of the coefficient data related to the image in portions of the M×N block that are outside of the K×L block, the portions of the M×N block that are outside of the K×L block corresponding to one or more invalid transform coefficient regions, and
only encoding the coefficient data related to the image in the K×L block that corresponds to the valid transform coefficient region.

8. An image processing apparatus comprising:
a transceiver; and
control circuitry configured to decode coefficient data related to an image, the coefficient data related to the image arranged in an M×N block, where M and N are integers, and N is equal to or different from M,
wherein, based on information indicating a K×L block of the M×N block is to be processed, where the K×L block corresponds to a valid transform coefficient region, where K and L are integers, and L is equal to or different from K, where at least one of K or L is less than at least one M or N, the control circuitry decodes the coefficient data related to the image by:
skipping decoding of the coefficient data related to the image in portions of the M×N block that are outside of the K×L block, the portions of the M×N block that are outside of the K×L block corresponding to one or more invalid transform coefficient regions, and
only decoding the coefficient data related to the image in the K×L block that corresponds to the valid transform coefficient region.

9. The image processing apparatus of claim 8, wherein the control circuitry is configured to decode the coefficient data related to the image in the K×L block that corresponds to the valid transform coefficient region by scanning the coefficient data related to the image in the K×L block that corresponds to the valid transform coefficient region in a predetermined scanning pattern.

10. The image processing apparatus of claim 9, wherein the predetermined scanning pattern includes a predetermined scanning direction.

11. The image processing apparatus of claim 10, wherein the predetermined scanning direction corresponds to a block shape of the K×L block.

12. The image processing apparatus of claim 8, wherein scanning of the coefficient data in the K×L block includes sequentially scanning a plurality of sub-blocks of the K×L block.

13. The image processing apparatus of claim 8, wherein the coefficient data related to the image in the K×L block comprises at least one of a luminance data or a chroma data.

14. A method of decoding performed by an image processing apparatus that is configured to decode coefficient data related to an image, the coefficient data related to the image arranged in an M×N block, where M and N are integers, and N is equal to or different from M, the method comprising:
based on information indicating a K×L block of the M×N block is to be processed, where the K×L block corresponds to a valid transform coefficient region, where K and L are integers, and L is equal to or different from K, where at least one of K or L is less than at least one M or N, decoding the coefficient data related to the image by:

skipping decoding of the coefficient data related to the image in portions of the M×N block that are outside of the K×L block, the portions of the M×N block that are outside of the K×L block corresponding to one or more invalid transform coefficient regions, and only decoding the coefficient data related to the image in the K×L block that corresponds to the valid transform coefficient region.

15. A non-transitory computer-readable medium for storing data associated with a data stream, the data stream comprising coefficient data related to an image, the coefficient data related to the image arranged in an M×N block, where M and N are integers, and N is equal to or different from M, the non-transitory computer-readable medium storing instructions for causing a processor to perform a method comprising:

based on information indicating a K×L block of the M×N block is to be processed, where the K×L block corresponds to a valid transform coefficient region, where K and L are integers, and L is equal to or different from K, where at least one of K or L is less than at least one M or N, encoding the coefficient data related to the image by:

skipping encoding of the coefficient data related to the image in portions of the M×N block that are outside of the K×L block, the portions of the M×N block that are outside of the K×L block corresponding to one or more invalid transform coefficient regions, and only encoding the coefficient data related to the image in the K×L block that corresponds to the valid transform coefficient region.

16. A non-transitory computer-readable medium for storing data associated with a data stream, the data stream comprising coefficient data related to an image, the coefficient data related to the image arranged in an M×N block, where M and N are integers, and N is equal to or different from M, the non-transitory computer-readable medium storing instructions for causing a processor to perform a method comprising:

based on information indicating a K×L block of the M×N block is to be processed, where the K×L block corresponds to a valid transform coefficient region, where K and L are integers, and L is equal to or different from K, where at least one of K or L is less than at least one M or N, decoding the coefficient data related to the image by:

skipping decoding of the coefficient data related to the image in portions of the M×N block that are outside of the K×L block, the portions of the M×N block that are outside of the K×L block corresponding to one or more invalid transform coefficient regions, and only decoding the coefficient data related to the image in the K×L block that corresponds to the valid transform coefficient region.

\* \* \* \* \*